(12) United States Patent
Hozumi et al.

(10) Patent No.: US 7,283,310 B2
(45) Date of Patent: Oct. 16, 2007

(54) ZOOM LENS, AND IMAGING SYSTEM INCORPORATING IT

(75) Inventors: Kouki Hozumi, Hachioji (JP); Masaru Morooka, Akishima (JP)

(73) Assignee: Olympus Corporation, Tokyo (JP)

( * ) Notice: Subject to any disclaimer, the term of this patent is extended or adjusted under 35 U.S.C. 154(b) by 153 days.

(21) Appl. No.: 11/114,039

(22) Filed: Apr. 26, 2005

(65) Prior Publication Data

US 2005/0243437 A1    Nov. 3, 2005

(30) Foreign Application Priority Data

| Apr. 30, 2004 | (JP) | ............................. 2004-135191 |
| Jun. 29, 2004 | (JP) | ............................. 2004-191006 |
| Jul. 8, 2004 | (JP) | ............................. 2004-201372 |
| Jul. 8, 2004 | (JP) | ............................. 2004-201373 |
| Jul. 8, 2004 | (JP) | ............................. 2004-201374 |

(51) Int. Cl.
    *G02B 15/14* (2006.01)

(52) U.S. Cl. ...................... 359/687; 359/684; 359/685; 359/715; 359/740; 359/774

(58) Field of Classification Search ........ 359/684–687, 359/715, 740, 774
    See application file for complete search history.

(56) References Cited

U.S. PATENT DOCUMENTS

| 6,456,441 | B2 | 9/2002 | Hoshi |
| 6,633,437 | B1 | 10/2003 | Hoshi et al. |
| 6,751,030 | B2 | 6/2004 | Saruwatari |
| 2003/0063395 | A1 | 4/2003 | Saruwatari |
| 2003/0197950 | A1 | 10/2003 | Eguchi |
| 2004/0056969 | A1 | 3/2004 | Hamano et al. |
| 2004/0136086 | A1* | 7/2004 | Ohtake ....................... 359/687 |

FOREIGN PATENT DOCUMENTS

| JP | 57-005012 | 1/1982 |
| JP | 2001-242379 | 9/2001 |
| JP | 2001-356269 | 12/2001 |

* cited by examiner

*Primary Examiner*—Evelyn A. Lester
(74) *Attorney, Agent, or Firm*—Kenyon & Kenyon LLP

(57) ABSTRACT

A zoom lens system includes a first group G1 of positive power, a second group G2 of negative power, a third group G3 of positive power and a fourth group G4 of positive power. Upon zooming, at least the first group G1, the second group G2 and the third group G3 move on an optical axis in such a way that, at a telephoto end with respect to a wide-angle end, the space between the first group G1 and the second group G2 and the third group G3 becomes narrow and the space between the third group G3 and the fourth group G4 becomes wide. The zoom lens system satisfies a condition that defines the ratio of the total length (length from the first surface of the lens system to an image plane) to the focal length of the zoom lens system at the wide-angle end.

39 Claims, 20 Drawing Sheets

ZOOM LENS, AND IMAGING SYSTEM INCORPORATING IT

This application claims benefit of Japanese Application No. 2004-135191 filed in Japan on Apr. 30, 2004, No. 2004-191006 filed in Japan on Jun. 29, 2004 and Nos. 2004-201372 to 2004-201374 filed in Japan on Jul. 8, 2004, the contents of which are incorporated by this reference.

BACKGROUND OF THE INVENTION

The present invention relates generally to a zoom lens system and an imaging system that incorporates it, and more particularly to a zoom lens system that has a zoom ratio of at least 4 fit for en electronic image pickup device such as a CCD and an imaging system that incorporates it.

In recent years, digital cameras have gained popularity in some categories from a business-application, multifunctional type to a portable low-end type. In view of the portable low-end type category in particular, a primary object of the invention is to provide a technology capable of achieving a video or digital camera that has a relatively high zoom ratio yet is more slimmed down with high image quality.

The chief bottleneck to reducing the depth dimension of cameras is the thickness of the surface nearest to the object side of an optical system, especially a zoom lens system, to an image pickup plane. Recently, the use of a so-called collapsible lens mount, wherein an optical system is unfolded from within a camera body at the time of taking and folded down into the camera body during carrying-along, has become the main current of the camera industry.

An image pickup device of reduced size will suffice for compactness and slimming-down. With the same number of pixels, however, it is required to make pixel pitch small; poor sensitivity must be compensated for by an optical system. The same also holds for the influence of diffraction. In other words, there is the need of an optical system having a decreased F-number. Among such optical systems known so far in the art, there is an optical system comprising, in order from its object side, a first lens group having positive refracting power, a second lens group having negative refracting power, a third lens group having positive refracting power and a fourth lens group having positive refracting power, four lens groups in all, wherein upon zooming the space between adjacent lenses varies. For instance, patent publication 1, 2, 3, 4, and 5 discloses a zoom lens system that is composed of a relatively small number of lenses with a zoom ratio of about 4 to 5, and so is fit for use with an electronic imaging system; however, there are some problems such as unsatisfactory compactness due to an increased total length. Patent publication 6, 7, 8, and 9 discloses a zoom lens system having a zoom ratio of about 3, and patent publication 10 discloses an optical system having a zoom ratio of about 3 and fit for use with silver-halide films. A problem with these optical systems is that the F-number is of as large as about 3.5 at the wide-angle end.

Patent Publication 1
JP(A) 2003-315676
Patent Publication 2
JP(A) 2003-43357
Patent Publication 3
JP(A) 2001-42215
Patent Publication 4
JP(A) 2004-12639
Patent Publication 5
JP(A) 2004-12638
Patent Publication 6
JP(A) 2001-356269
Patent Publication 7
JP(A) 2001-242379
Patent Publication 8
JP(A) 2001-194586
Patent Publication 9
JP(A) 2000-1881709
Patent Publication 10
JP(A) 57-5012

SUMMARY OF THE INVENTION

In view of such problems with the prior art, a main object of the invention is to provide a zoom lens that is compact, has a decreased F-number and can easily possess a high zoom ratio, and an imaging system that incorporates the same.

The present invention comprises 12 aspects.

According to a first aspect of the invention, there is provided a zoom lens, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens satisfies condition (1):

$$6.4 < L_W/f_W < 7.4 \tag{1}$$

where $L_W$ is a length of the zoom lens system at the wide-angle end, and $f_W$ is a focal length of the zoom lens system at the wide-angle end.

According to a second aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system has a zoom ratio of 4 or higher and satisfies condition (2):

$$5.8 < f_1/f_W < 8.0 \tag{2}$$

where $f_W$ is a focal length of the zoom lens system at the wide-angle end, and $f_1$ is a focal length of the first lens group.

According to a third aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies condition (3):

$$2 < D_{2W}/D_{3W} < 2.6 \qquad (3)$$

where $D_{2W}$ is the space between the second lens group and the third lens group at the wide-angle end, and $D_{3W}$ is the space between the third lens group and the fourth lens group at the wide-angle end.

According to a fourth aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies conditions (4)" and (5):

$$3.99 \leq (\beta_{2T}/\beta_{2W})*(\beta_{3T}/\beta_{3W})*(\beta_{4T}/\beta_{4W}) < 12 \qquad (4)"$$

$$1.8 < D_{2W}/f_W < 2.8 \qquad (5)$$

where $\beta_{2T}$, $\beta_{3T}$, and $\beta_{4T}$ is a magnification of the second lens group, the third lens group, and the fourth lens group, respectively, at the telephoto end; $\beta_{2W}$, $\beta_{3W}$, and $\beta_{4W}$ is a magnification of the second lens group, the third lens group, and the fourth lens group, respectively, at the wide-angle end; $f_W$ is a focal length of the zoom lens system at the wide-angle end; and $D_{2W}$ is the space between the second lens group and the third lens group at the wide-angle end.

According to a fifth aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative meniscus lens element, a negative meniscus lens element or a plano-concave negative lens element and a positive meniscus lens element; and the zoom lens system satisfies conditions (4) and (6):

$$3 < (\beta_{2T}/\beta_{2W})*(\beta_{3T}/\beta_{3W})*(\beta_{4T}/\beta_{4W}) < 12 \qquad (4)$$

$$1.1 < |f_2/f_W| < 1.8 \qquad (6)$$

where $f_W$ is a focal length of the zoom lens system at the wide-angle end; $f_2$ is a focal length of the second lens group; $\beta_{2T}$, $\beta_{3T}$, and $\beta_{4T}$ is a magnification of the second lens group, the third lens group, and the fourth lens group, respectively, at the telephoto end; and $\beta_{2W}$, $\beta_{3W}$, and $\beta_{4W}$ is a magnification of the second lens group, the third lens group, and the fourth lens group, respectively, at the wide-angle end.

According to a sixth aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; a vitreous material, of which the two negative lens elements in the second lens group are formed, has a refractive index of at least 1.81; and a vitreous material, of which the positive lens element in the second lens group is formed, has a refractive index of at least 1.9.

According to a seventh aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies conditions (4) and (7):

$$3 < (\beta_{2T}/\beta_{2W})*(\beta_{3T}/\beta_{3W})*(\beta_{4T}/\beta_{4W}) < 12 \qquad (4)$$

$$0.8 < (\beta_{2T}/\beta_{2W})/(\beta_{3T}/\beta_{3W}) < 1.1 \qquad (7)$$

where $\beta_{2T}$, $\beta_{3T}$, and $\beta_{4T}$ is a magnification of the second lens group, the third lens group, and the fourth lens group, respectively, at the telephoto end; and $\beta_{2W}$, $\beta_{3W}$, and $\beta_{4W}$ is a magnification of the second lens group, the third lens group, and the fourth lens group, respectively, at the wide-angle end.

According to an eighth aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies condition (8)':

$$0.9 < \Delta_{T3G}/f_W < 1.83 \qquad (8)'$$

where $\Delta_{T3G}$ is an amount of movement of the third lens group between the wide-angle end and the telephoto end.

According to a ninth aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies condition (9):

$$1.2 < f_3/f_W < 1.85 \qquad (9)$$

where $f_W$ is a focal length of the zoom lens system at the wide-angle end, and $f_3$ is a focal length of the third lens group.

According to a tenth aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; an aperture stop is interposed between the second lens group and the third lens group; and the zoom lens system satisfies condition (7):

$$0.8 < (\beta_{2T}/\beta_{2W})/(\beta_{3T}/\beta_{3W}) < 1.1 \qquad (7)$$

where $\beta_{2T}$, and $\beta_{3T}$ is a magnification of the second lens group, and the third lens group, respectively, at the telephoto end; and $\beta_{2W}$, and $\beta_{3W}$ is a magnification of the second lens group, and the third lens group, respectively, at the wide-angle end.

According to an eleventh aspect of the invention, there is provided a zoom lens system, comprising, in order from an object side thereof, a first lens group having positive refracting power, a second lens group having negative refracting power, a third lens group having positive refracting power and a fourth lens group having positive refracting power, wherein:

upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide;

the first lens group is composed of at most two lens elements;

the second lens group is composed of, in order from an object side thereof, a negative lens element, a negative lens element and a positive lens element, wherein said first negative lens element is a negative lens element having a large curvature on an image plane side, said second negative lens element is a negative meniscus lens element or a planoconcave negative lens element having a large curvature on an image plane side, and said positive lens element is a positive lens element having a large curvature on an object side; and the third lens group is composed of, in order from an object side thereof, a double-convex lens element, a positive meniscus lens element concave on an image plane side and a negative meniscus lens element concave on an image plane side, wherein said positive meniscus lens element and said negative meniscus lens element are cemented together into a cemented lens, and said double-convex lens element satisfies condition (12):

$$-6 < R_{31}/F_{31} < -1 \qquad (12)$$

where $F_{31}$ is a radius of curvature of an object-side surface of the double-convex lens L31 near the optical axis, and $R_{31}$ a radius of curvature of an image plane-side surface of the double-convex lens L31 near the optical axis.

According to a twelfth aspect of the invention, there is provided an imaging system comprising any one of the above zoom lens systems and an image pickup device located on an image plane thereof.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Figure 1A:
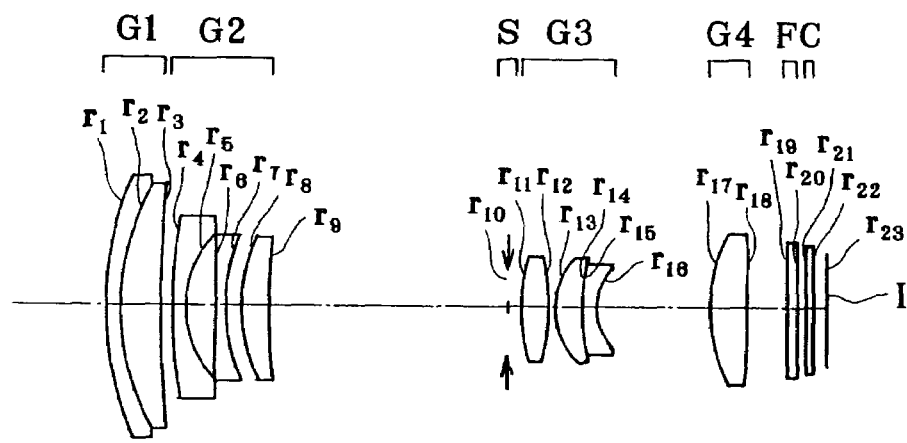
FIGS. 1A, 1B and 1C are illustrative in section at the wide-angle end, intermediate state, and telephoto end, respectively, of Example 1 of the zoom lens system according to the invention upon focusing on an infinite object point.

First of all, Groups 1, 2, 3 and 4 of the invention are explained in taken-apart forms.

The zoom lens system according to Group 1 of the invention (the first to eighth aspects) and the imaging system having it therein are now explained in taken-apart form.

The first zoom lens system according to Group 1 of the invention, provided to attain the above objects, comprises, in order from an object side thereof, a first lens group G1 having positive refracting power, a second lens group G2 having negative refracting power, a third lens group G3 having positive refracting power and a fourth lens group G4 having positive refracting power, characterized in that, upon zooming, at least the first lens group G1, the second lens group G2 and the third lens group G3 move on an optical axis in such a way that, at a telephoto end with respect to a wide-angle end of the zoom lens system, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lenses; the second lens group G2 is composed of, in order from an object side thereof, a negative lens L21, a negative lens L22 and a positive lens L23; and the zoom lens system satisfies condition (1):

$$6.4 < L_W/f_W < 7.4 \qquad (1)$$

where $L_W$ is the length of the zoom lens system at the wide-angle end, and $f_W$ is the focal length of the zoom lens system at the wide-angle end.

The requirement for, and the advantage of, the first zoom lens system is now explained.

As the lens groups are arranged in the refracting power order of positive, negative, positive and positive as viewed in order from the object side of the zoom lens system, it ensures that performance is maintainable even at a zoom ratio exceeding 4.

As, upon zooming, the space between the first lens group G1 and the second lens group G2 becomes wide, the space between the second lens group G2 and the third lens group G3 becomes narrow and the space between the third lens group G3 and the fourth lens group G4 becomes wide at the telephoto end with respect to the wide-angle end, it allows the task of zooming to be allocated to the second lens group G2 and the third lens group G3, achieving efficient zooming. Further, as the first lens group G1 is designed to move in addition to the second lens group G2 and the third lens group G3, higher zoom ratios are easily achievable with a compact optical system.

It is here desirable that the first lens group G1 be positioned on the object side at the telephoto end with respect to the wide-angle end. This is favorable for reducing the length of the zoom lens system at the wide-angle end and increasing the focal length of the zoom lens system at the telephoto end.

Alternatively, it is desirable that the second lens group G2 be nearest to the image side between the wide-angle end and the telephoto end. In other words, the second lens group G2 should preferably move toward the image side in a convex locus upon zooming from the wide-angle end to the telephoto end. This is favorable for high zoom ratios because, on the one hand, the second lens group G2 is permitted to take on the task of zooming on a wide-angle side and, on the other hand, the range of movement of the third lens group G3 is ensured on a telephoto side.

Alternatively, it is desired that the third lens group G3 move almost monotonously toward the object side upon zooming from the wide-angle end to the telephoto end. To put it another way, the third lens group G3 should preferably move only toward the object side during zooming from the wide-angle end to the telephoto end.

As all of the first lens group G1, the second lens group G2 and the third lens group G3 move as described above, the ability to form images is easily achievable even at high zoom ratios, because the third lens group G3, and the second lens group G2 takes a greater part in zooming in a wide-angle zone, and a telephoto zone, respectively.

As the first lens group G1 is composed of at most two lenses, it enables the lens diameter of the first lens group to be made small with the result that the thickness of the first lens group G1 to be reduced.

Preferably in view of total-length and cost reductions, the first lens group G1 should be composed of one positive lens.

Alternatively, the first lens group G1 should preferably be composed of, in order from its object side, one negative lens and one positive lens. This is effective for correction of chromatic aberrations, etc. at the first lens group G1.

Yet alternatively, the first lens group G1 should preferably be composed of a doublet consisting of one negative lens and one positive lens. This prevents reflections of light between the surfaces of two lenses, making ghost reductions easy.

As the second lens group G2 is composed of, in order from its object side, a negative lens L21, a negative lens L22 and a positive lens L23, it permits the thickness of the second lens group G2 to be reduced to ensure enough zooming space while achieving zoom ratios and maintaining power.

Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the consequence that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The second zoom lens system according to Group 1 of the invention is characterized in that the third lens group G3 in the first zoom lens system is composed of two positive lenses and one negative lens.

The requirement for, and the advantage of, the second zoom lens system constructed as recited above is now explained. According to the arrangement as recited above, the third lens group G3 can be thinned while having a converging action with well reduced aberrations.

The third zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lenses; the second lens group G2 is composed of, in order from an object side thereof, a negative lens L21, a negative lens L22 and a positive lens L23; and the zoom lens system satisfies condition (2):

$$5.8 < f_1/f_W < 8.0 \tag{2}$$

where $f_W$ is the focal length of the zoom lens system at the wide-angle end, and $f_1$ is the focal length of the first lens group.

The requirement for, and the advantage of, the third zoom lens system constructed as recited above is now explained.

For the third zoom lens system, the requirement and advantage described with reference to the first zoom lens system holds, except for the explanation of condition (1).

Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good enough image formation capability.

The lower limit to condition (2) could be set at 5.95, especially 6.05.

The upper limit to condition (2) could be set at 7.5, especially 7.0.

The fourth zoom lens system according to Group 1 of the invention is characterized in that the third zoom lens system satisfies condition (1):

$$6.4 < L_W/f_W < 7.4 \tag{1}$$

where $L_W$ is the total length of the zoom lens system at the wide-angle end, and $f_W$ is the focal length of the zoom lens system at the wide-angle end.

The requirement for, and the advantage of, the fourth zoom lens system constructed as recited above is now explained. Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the consequence that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The fifth zoom lens system according to Group 1 of the invention is characterized in that the third lens group G3 in the third or fourth zoom lens system is composed of two positive lenses and one negative lens.

For the fifth zoom lens system, too, the requirement and advantage referred to regarding the second zoom lens system hold.

The sixth zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lenses; the second lens group G2 is composed of, in order from its object side thereof, a negative lens L21, a negative lens L22 and a positive lens L23; and the zoom lens system satisfies condition (3):

$$2<D_{2W}/D_{3W}<2.6 \quad (3)$$

where $D_{2W}$ is the space between the second lens group and the third lens group at the wide-angle end, and $D_{3W}$ is the space between the third lens group and the fourth lens group at the wide-angle end.

The requirement for, and the advantage of, the sixth zoom lens system constructed as recited above is the same as referred to regarding the first zoom lens system, except for the explanation of condition (1).

Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 are nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to grow worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The seventh zoom lens system according to Group 1 of the invention is characterized in that the sixth zoom lens system satisfies condition (1):

$$6.4<L_W/f_W<7.4 \quad (1)$$

where $L_W$ is the total length of the zoom lens system at the wide-angle end, and $f_W$ is the focal length of the zoom lens system at the wide-angle end.

The requirement for, and the advantage of, the seventh zoom lens system constructed as recited above is now explained. Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the consequence that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The eighth zoom lens system according to Group 1 of the invention is characterized in that the third lens group G3 in the sixth or seventh zoom lens system is composed of two positive lenses and one negative lens.

For the eighth zoom lens system, too, the requirement and advantage stated for the second zoom lens system hold.

The ninth zoom lens system according to Group 1 of the invention is characterized in that any one of the sixth to eighth zoom lens systems satisfies condition (2):

$$5.8<f_1/f_W<8.0 \quad (2)$$

where $f_W$ is the focal length of the zoom lens system at the wide-angle end, and $f_1$ is the focal length of the first lens group.

The requirement for, and the advantage of, the ninth zoom lens system is now explained. Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good enough image formation capability.

The lower limit to condition (2) could be set at 5.95, especially 6.05.

The upper limit to condition (2) could be set at 7.5, especially 7.0.

The 10$^{th}$ zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lenses; the second lens group G2 is composed of, in order from it object side thereof, a negative lens L21, a negative lens L22 and a positive lens L23; and the zoom lens system satisfies conditions (4)" and (5):

$$3.99 \leq (\beta_{2T}/\beta_{2W})*(\beta_{3T}/\beta_{3W})*(\beta_{4T}/\beta_{4W})<12 \quad (4)''$$

$$1.8<D_{2W}/f_W<2.8 \quad (5)$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the 10$^{th}$ zoom lens system is now explained.

The requirement and advantage regarding the 10$^{th}$ zoom lens system are the same as those stated for the first zoom lens system, except for the explanation of condition (1).

Condition (4)" relates to a basic zoom ratio requirement. As the upper limit of 2.8 to condition (5) is exceeded yet with condition (4)" satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4)" while ensuring the ability to form images.

Instead of conditions (4)" and/or (5), the following conditions (4)' and/or (5)' having such numerical ranges as given below could be used.

$$3<(\beta_{2T}/\beta_{2W})*(\beta_{3T}/\beta_{3W})*(\beta_{4T}/\beta_{4W})<7 \tag{4}'$$

$$2.0<D_{2W}/f_W<2.8 \tag{5}'$$

The upper limit to condition (4) could be set at 7.0, especially 6.3.

The lower limit to condition (5) could be set at 2.2, especially 2.35.

The upper limit to condition (5) could be set at 2.75, especially 2.7.

The 11$^{th}$ zoom lens system according to Group 1 of the invention is characterized in that the 10$^{th}$ zoom lens system satisfies condition (1):

$$6.4<L_W/f_W<7.4 \tag{1}$$

where $L_W$ is the total length of the zoom lens system at the wide-angle end, and $f_W$ is the focal length of the zoom lens system at the wide-angle end.

The requirement for, and the advantage of, the 11$^{th}$ zoom lens system constructed as recited above is now explained. Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached and, consequently, the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The 12$^{th}$ zoom lens system according to Group 1 of the invention is characterized in that the third lens group G3 in the 10$^{th}$ or 11$^{th}$ zoom lens system is composed of two positive lenses and one negative lens.

For the 12$^{th}$ zoom lens system, too, the requirement and advantage stated for the second zoom lens system hold.

The 13$^{th}$ zoom lens system according to Group 1 of the invention is characterized in that any one of the 10$^{th}$ to 12$^{th}$ zoom lens systems satisfies condition (2):

$$5.8<f_1/f_W<8.0 \tag{2}$$

where $f_W$ is the focal length of the zoom lens system at the wide-angle end, and $f_1$ is the focal length of the first lens group.

The requirement for, and the advantage of, the 13$^{th}$ zoom lens system constructed as recited is now explained. Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good enough image formation capability.

The lower limit to condition (2) could be set at 5.95, especially 6.05.

The upper limit to condition (2) could be set at 7.5, especially 7.0.

The 14$^{th}$ zoom lens system according to Group 1 of the invention is characterized in that any one of the 10$^{th}$ to 13$^{th}$ zoom lens systems satisfies condition (3):

$$2<D_{2W}/D_{3W}<2.6 \tag{3}$$

where $D_{2W}$ is the space between the second lens group and the third lens group at the wide-angle end, and $D_{3W}$ is the space between the third lens group and the fourth lens group at the wide-angle end.

The requirement for, and the advantage of, the 14$^{th}$ zoom lens system constructed as recited above is now explained. Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 come nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to grow worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The 15$^{th}$ zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lens elements; the second lens group G2 is composed of, in order from its object side, a negative meniscus lens L21, a negative meniscus lens or a planoconcave negative lens L22 and a positive meniscus lens L23; and the zoom lens system satisfies conditions (4) and (6):

$$3 < (\beta_{2T}/\beta_{2W}) * (\beta_{3T}/\beta_{3W}) * (\beta_{4T}/\beta_{4W}) < 12 \quad (4)$$

$$1.1 < |f_2/f_W| < 1.8 \quad (6)$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

The requirement for, and the advantage of, the 15$^{th}$ zoom lens system constructed as recited above is now explained.

As the lens groups are arranged in the refracting power order of positive, negative, positive and positive as viewed in order from the object side of the zoom lens system, it ensures that performance is maintainable even at a zoom ratio exceeding 4.

As, upon zooming, the space between the first lens group G1 and the second lens group G2 becomes wide, the space between the second lens group G2 and the third lens group G3 becomes narrow and the space between the third lens group G3 and the fourth lens group G4 becomes wide at the telephoto end with respect to the wide-angle end, it allows the task of zooming to be allocated to the second lens group G2 and the third lens group G3, achieving efficient zooming. Further, as the first lens group G1 is designed to move in addition to the second lens group G2 and the third lens group G3, higher zoom ratios are easily achievable with a compact optical system.

It is here desirable that the first lens group G1 be positioned on the object side at the telephoto end with respect to the wide-angle end. This is favorable for reducing the total length of the zoom lens system at the wide-angle end, and increasing the focal length of the zoom lens system at the telephoto end as well.

Alternatively, it is desirable that the second lens group G2 be nearest to the image side between the wide-angle end and the telephoto end. In other words, the second lens group G2 should preferably move toward the image side in a convex locus upon zooming from the wide-angle end to the telephoto end. This is favorable for high zoom ratios because, on the one hand, the second lens group G2 is permitted to take on the task of zooming on a wide-angle side and, on the other hand, the range of movement of the third lens group G3 is ensured on a telephoto side.

Alternatively, it is desired that the third lens group G3 move almost monotonously toward the object side upon zooming from the wide-angle end to the telephoto end. To put it another way, the third lens group G3 should preferably move only toward the object side during zooming from the wide-angle end to the telephoto end.

As all of the first lens group G1, the second lens group G2 and the third lens group G3 move as described above, the ability to form images is easily achievable even at high zoom ratios, because the third lens group G3, and the second lens group G2 takes a greater part in zooming in a wide-angle zone, and a telephoto zone, respectively.

As the first lens group G1 is composed of at most two lenses, it enables the lens diameter of the first lens group to be made small with the result that the thickness of the first lens group G1 is reduced.

Preferably in view of total-length and cost reductions, the first lens group G1 should be composed of one positive lens.

Alternatively, the first lens group G1 should preferably be composed of, in order from its object side, one negative lens and one positive lens. This is effective for correction of chromatic aberrations, etc. at the first lens group G1.

Yet alternatively, the first lens group G1 should preferably be composed of a doublet consisting of one negative lens and one positive lens. This prevents reflections of light between the surfaces of two lenses, making ghost reductions easy.

As the second lens group G2 is composed of, in order from its object side, a negative meniscus lens L21, a negative meniscus lens or a planoconcave negative lens L22 and a positive meniscus lens L23, it permits higher-order aberrations to be precisely controlled, and performance to be easily ensured.

Condition (4) concerns a basic zoom ratio requirement. As the upper limit of 1.8 to condition (6) is exceeded yet with condition (4) satisfied, it is difficult to obtain a compact zoom lens system having a zoom ratio defined by condition (4). As the lower limit of 1.1 is not reached, it is difficult to obtain a compact zoom lens system having a desired power only by use of the negative meniscus lens or planoconcave negative lens.

The lower limit to condition (4) could be set at 3.3, especially 3.5.

The upper limit to condition (4) could be set at 7.0, especially 6.3.

The lower limit to condition (6) could be set at 1.3, especially 1.35.

The upper limit to condition (6) could be set at 1.7, especially 1.6.

The 16$^{th}$ zoom lens system according to Group 1 of the invention is characterized in that the 15$^{th}$ zoom lens system satisfies condition (1):

$$6.4 < L_W/f_W < 7.4 \quad (1)$$

where $L_W$ is the total length of the zoom lens system at the wide-angle end, and $f_W$ is the focal length of the zoom lens system at the wide-angle end.

The requirement for, and the advantage of, the 16$^{th}$ zoom lens system constructed as recited above is now explained. Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached and, consequently, the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The 17$^{th}$ zoom lens system according to Group 1 of the invention is characterized in that the third lens group G3 in the 15$^{th}$ or 16$^{th}$ zoom lens system is composed of two positive lenses and one negative lens.

The requirement for, and the advantage of, the 17$^{th}$ zoom lens system constructed as recited above is now explained. According to the arrangement as recited above, the third lens group G3 can be thinned while having a converging action with well reduced aberrations.

The 18$^{th}$ zoom lens system according to Group 1 of the invention is characterized in that any one of the 15$^{th}$ to 17$^{th}$ zoom lens systems satisfies condition (2):

$$5.8 < f_1/f_W < 8.0 \quad (2)$$

where $f_W$ is the focal length of the zoom lens system at the wide-angle end, and $f_1$ is the focal length of the first lens group.

The requirements for, and the advantages of, the 18$^{th}$ zoom lens system are now explained. Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good enough image formation capability.

The lower limit to condition (2) could be set at 5.95, especially 6.05.

The upper limit to condition (2) could be set at 7.5, especially 7.0.

The 19$^{th}$ zoom lens system according to Group 1 of the invention is characterized in that any one of the 15$^{th}$ to 18$^{th}$ zoom lens systems satisfies condition (3):

$$2 < D_{2W}/D_{3W} < 2.6 \quad (3)$$

where $D_{2W}$ is the space between the second lens group and the third lens group at the wide-angle end, and $D_{3W}$ is the space between the third lens group and the fourth lens group at the wide-angle end.

The requirement for, and the advantage of, the 19$^{th}$ zoom lens system constructed as recited above is now explained. Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 come nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to become worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The 20$^{th}$ zoom lens system according to Group 1 of the invention is characterized in that any one of the 15$^{th}$ to 19$^{th}$ zoom lens systems satisfies condition (5):

$$1.8 < D_{2W}/f_W < 2.8 \quad (5)$$

where $f_W$ is the focal length of the zoom lens system at the wide-angle end.

The requirement for, and the advantage of, the 20$^{th}$ zoom lens system constructed as recited above is now explained. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring the ability to form images.

Instead of conditions (4)' and/or (5)', the following conditions (4)' and/or (5)' having such numerical ranges as given below could be used.

$$3 < (\beta_{2T}/\beta_{2W})*(\beta_{3T}/\beta_{3W})*(\beta_{4T}/\beta_{4W}) < 7 \quad (4)$$

$$2.0 < D_{2W}/f_W < 2.8 \quad (5)'$$

The lower limit to condition (5) could be set at 2.2, especially 2.35.

The upper limit to condition (5) could be set at 2.75, especially 2.7.

The 21$^{st}$ zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lenses; the second lens group G2 is composed of, in order from its object side, a negative lens L21, a negative lens L22 and a positive lens L23; a vitreous material, of which the two negative lenses in the second lens group G2 are formed, has a refractive index of at least 1.81; and a vitreous material, of which the positive lens in the second lens group G2 is formed, has a refractive index of at least 1.9.

The requirement for, and the advantage of, the 21$^{st}$ zoom lens system constructed as recited above is now explained.

The requirement and advantage regarding the 21$^{st}$ zoom lens system are the same as those stated for the first zoom lens system, except for the explanation of condition (1).

As the vitreous material, of which the two negative lenses in the second lens group G2 are formed, has a refractive index of below 1.81 and the vitreous material, of which the positive lens in the second lens group G2, has a refractive index of below 1.9, it renders correction of chromatic aberrations difficult, and causes the Petzval sum to become large in the negative direction, resulting in increased field curvature.

The 22$^{nd}$ zoom lens system according to Group 1 of the invention is characterized in that the 21$^{st}$ zoom lens system satisfies condition (1):

$$6.4 < L_W/f_W < 7.4 \quad (1)$$

where $L_W$ is the total length of the zoom lens system at the wide-angle end, and $f_W$ is the focal length of the zoom lens system at the wide-angle end.

The requirement for, and the advantage of, the 22$^{nd}$ zoom lens system constructed as recited above is now explained. Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the consequence that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The 23$^{rd}$ zoom lens system according to Group 1 of the invention is characterized in that the third lens group G3 in the 21$^{st}$ or 22$^{nd}$ zoom lens system is composed of two positive lenses and one negative lens.

The requirement for, and the advantage of, the 23$^{rd}$ zoom lens system constructed as recited above is now explained. According to such construction, the third lens group G3 can be thinned while having a converging action with well reduced aberrations.

The 24$^{th}$ zoom lens system according to Group 1 of the invention is characterized in that any one of the 21$^{st}$ to 23$^{rd}$ zoom lens systems satisfies condition (2):

$$5.8 < f_1/f_W < 8.0 \quad (2)$$

where $f_W$ is the focal length of the zoom lens system at the wide-angle end, and $f_1$ is the focal length of the first lens group.

The requirement for, and the advantage of, the 24$^{th}$ zoom lens system constructed as recited above is now explained. Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good image formation capability.

The lower limit to condition (2) could be set at 5.95, especially 6.05.

The upper limit to condition (2) could be set at 7.5, especially 7.0.

The 25$^{th}$ zoom lens system according to Group 1 of the invention is characterized in that any one of the 21$^{st}$ to 24$^{th}$ zoom lens systems satisfies condition (3):

$$2 < D_{2W}/D_{3W} < 2.6 \quad (3)$$

where $D_{2W}$ is the space between the second lens group and the third lens group at the wide-angle end, and $D_{3W}$ is the space between the third lens group and the fourth lens group at the wide-angle end.

The requirement for, and the advantage of, the 19$^{th}$ zoom lens system constructed as recited above is now explained. Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 come nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to grow worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The 26$^{th}$ zoom lens system according to Group 1 of the invention is characterized in that any one of the 21$^{st}$ to 25$^{th}$ zoom lens systems satisfies conditions (4) and (5):

$$3 < (\beta_{2T}/\beta_{2W})*(\beta_{3T}/\beta_{3W})*(\beta_{4T}/\beta_{4W}) < 7 \quad (4)$$

$$1.8 < D_{2W}/f_W < 2.8 \quad (5)$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the 26$^{th}$ zoom lens system constructed as recited above is now explained. Condition (4) relates to a basic zoom ratio requirement. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring the ability to form images.

Instead of conditions (4) and/or (5), the following conditions (4)' and/or (5)' having such numerical ranges as given below could be used.

$$3 < (\beta_{2T}/\beta_{2W})*(\beta_{3T}/\beta_{3W})*(\beta_{4T}/\beta_{4W}) < 7 \quad (4)'$$

$$2.0 < D_{2W}/f_W < 2.8 \quad (5)'$$

The lower limit to condition (4) could be set at 3.3, especially 3.5.

The upper limit to condition (4) could be set at 7.0, especially 6.3.

The lower limit to condition (5) could be set at 2.2, especially 2.35.

The upper limit to condition (5) could be set at 2.75, especially 2.7.

The 28$^{th}$ zoom lens system according to Group 1 of the invention is characterized in that any one of the 21$^{st}$ to 26$^{th}$ zoom lens systems satisfies conditions (4) and (6):

$$3<(\beta_{2T}/\beta_{2W})*(\beta_{3T}/\beta_{3W})*(\beta_{4T}/\beta_{4W})<12 \quad (4)$$

$$1.1<|f_2/f_W|<1.8 \quad (6)$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

Referring to the requirement for and the advantage of the 27$^{th}$ zoom lens system, condition (4) concerns a basic zoom ratio requirement. As the upper limit of 1.8 to condition (6) is exceeded yet with condition (4) satisfied, it is difficult to obtain a compact zoom lens system having a zoom ratio defined by condition (4). As the lower limit of 1.1 is not reached, it is difficult to obtain a compact zoom lens system having a desired power only by use of the negative meniscus lens or planoconcave negative lens.

The lower limit to condition (4) could be set at 3.3, especially 3.5.

The upper limit to condition (4) could be set at 7.0, especially 6.3.

The lower limit to condition (6) could be set at 1.3, especially 1.35.

The upper limit to condition (6) could be set at 1.7, especially 1.6.

The 28$^{th}$ zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lenses; the second lens group G2 is composed of, in order from an object side thereof, a negative lens L21, a negative lens L22 and a positive lens L23; and the zoom lens system satisfies conditions (4) and (7):

$$3<(\beta_{2T}/\beta_{2W})*(\beta_{3T}/\beta_{3W})*(\beta_{4T}/\beta_{4W})<12 \quad (4)$$

$$0.8<(\beta_{2T}/\beta_{2W})/(\beta_{3T}/\beta_{3W})<1.1 \quad (7)$$

where $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

The requirement for, and the advantage of, the 28$^{th}$ zoom lens system constructed as recited above is now explained.

The requirement and advantage regarding the 28$^{th}$ zoom lens system are the same as those stated for the first zoom lens system, except for the explanation of condition (1).

Condition (4) concerns a basic zoom ratio requirement. As the upper limit of 1.1 to condition (7) is exceeded yet with condition (4) satisfied, the second lens group G2 must take on a heavier task of zooming, rendering the total length of the zoom lens system and the diameter of the front lens likely to increase. As the lower limit of 0.8 is not reached, there is an increase in the amount of movement of the third lens group G3 by zooming, which may otherwise cause an increase in F-number, and an increase in the amount of fluctuations in the angle of incidence of light on an image pickup device such as a CCD as well. Otherwise, the power of the third lens group G3 becomes large, causing the amount of aberrations to become too large to ensure the ability to form images.

The 29$^{th}$ zoom lens system according to Group 1 of the invention is characterized in that the 28$^{th}$ zoom lens system satisfies condition (1):

$$6.4<L_W/f_W<7.4 \quad (1)$$

where $L_W$ is the total length of the zoom lens system at the wide-angle end, and $f_W$ is the focal length of the zoom lens system at the wide-angle end.

The requirement for, and the advantage of, the 29$^{th}$ zoom lens system constructed as recited above is now explained. Condition (1) is provided to define the ratio at the wide-angle end of the total length (the length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the result that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The 30$^{th}$ zoom lens system according to Group 1 of the invention is characterized in that the third lens group G3 in the 28$^{th}$ or 29$^{th}$ zoom lens system is composed of two positive lenses and one negative lens.

The requirement for, and the advantage of, the 30$^{th}$ zoom lens system constructed as recited above is now explained. According to such construction, the third lens group G3 can be thinned while having a converging action with well reduced aberrations.

The 31$^{st}$ zoom lens system according to Group 1 of the invention is characterized in that any one of the 28$^{th}$ to 30$^{th}$ zoom lens systems satisfies condition (2):

$$5.8<f_1/f_W<8.0 \quad (2)$$

where $f_W$ is the focal length of the zoom lens system at the wide-angle end, and $f_1$ is the focal length of the first lens group.

The requirement for, and the advantage of, the 31$^{st}$ zoom lens system constructed as recited above is now explained. Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good enough image formation capability.

The lower limit to condition (2) could be set at 5.95, especially 6.05.

The upper limit to condition (2) could be set at 7.5, especially 7.0.

The 32$^{nd}$ zoom lens system according to Group 1 of the invention is characterized in that any one of the 28$^{th}$ to 31$^{st}$ zoom lens systems satisfies condition (3):

$$2 < D_{2W}/D_{3W} < 2.6 \tag{3}$$

where $D_{2W}$ is the space between the second lens group and the third lens group at the wide-angle end, and $D_{3W}$ is the space between the third lens group and the fourth lens group at the wide-angle end.

The requirement for, and the advantage of, the 32$^{nd}$ zoom lens system constructed as recited above is now explained. Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 come nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to become worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The 33$^{rd}$ zoom lens system according to Group 1 of the invention is characterized in that any one of the 28$^{th}$ to 32$^{nd}$ zoom lens systems satisfies conditions (4) and (5):

$$3 < (\beta_{2T}/\beta_{2W})*(\beta_{3T}/\beta_{3W})*(\beta_{4T}/\beta_{4W}) < 7 \tag{4}$$

$$1.8 < D_{2W}/f_W < 2.8 \tag{5}$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the 33$^{rd}$ zoom lens system constructed as recited above is now explained. Condition (4) relates to a basic zoom ratio requirement. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring the ability to form images.

Instead of conditions (4) and/or (5), the following conditions (4)' and/or (5)' having such numerical ranges as given below could be used.

$$3 < (\beta_{2T}/\beta_{2W})*(\beta_{3T}/\beta_{3W})*(\beta_{4T}/\beta_{4W}) < 7 \tag{4'}$$

$$2.0 < D_{2W}/f_W < 2.8 \tag{5'}$$

The lower limit to condition (4) could be set at 3.3, especially 3.5.

The upper limit to condition (4) could be set at 7.0, especially 6.3.

The lower limit to condition (5) could be set at 2.2, especially 2.35.

The upper limit to condition (5) could be set at 2.75, especially 2.7.

The 34$^{th}$ zoom lens system according to Group 1 of the invention is characterized in that any one of the 28$^{th}$ to 33$^{rd}$ zoom lens systems satisfies conditions (4) and (6):

$$3 < (\beta_{2T}/\beta_{2W})*(\beta_{3T}/\beta_{3W})*(\beta_{4T}/\beta_{4W}) < 12 \tag{4}$$

$$1.1 < |f_2/f_W| < 1.8 \tag{6}$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

Referring to the requirement and advantage regarding the 27$^{th}$ zoom lens system, condition (4) concerns a basic zoom ratio requirement. As the upper limit of 1.8 to condition (6) is exceeded yet with condition (4) satisfied, it is difficult to obtain a compact zoom lens system having a zoom ratio defined by condition (4). As the lower limit of 1.1 is not reached, it is difficult to obtain a compact zoom lens system having a desired power only by use of the negative meniscus lens or planoconcave negative lens.

The lower limit to condition (4) could be set at 3.3, especially 3.5.

The upper limit to condition (4) could be set at 7.0, especially 6.3.

The lower limit to condition (6) could be set at 1.3, especially 1.35.

The upper limit to condition (6) could be set at 1.7, especially 1.6.

The 35$^{th}$ zoom lens system according to Group 1 of the invention is characterized in that, in any one of the 28$^{th}$ to 34$^{th}$ zoom lens systems, the vitreous material, of which the two negative lenses in the second lens group G2 are formed, has a refractive index of at least 1.81 and the vitreous material, of which the positive lens in the second lens group G2 is formed, has a refractive index of at least 1.9.

The requirement for, and the advantage of, the 35$^{th}$ zoom lens system constructed as recited above is now explained. As the vitreous material, of which the two negative lenses in the second lens group G2 are formed, has a refractive index of below 1.81 and the vitreous material, of which the positive lens in the second lens group G2 is formed, has a refractive index of below 1.9, it causes the Petzval sum to become large in the negative direction, ending up with the inability to correct field curvature. It also causes the power of the second lens group G2 to become large, ending up with the inability to achieve size reductions. Further in consideration of a combination of vitreous material, correction of chromatic aberrations becomes difficult.

The 36$^{th}$ zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lens elements; the second lens group G2 is composed of, in order from it object side, a negative lens L21, a negative lens L22 and a positive lens L23; and the zoom lens system satisfies condition (8)':

$$0.9 < \Delta_{T3G}/f_W < 1.83 \tag{8}$$

where $\Delta_{T3G}$ is the amount of movement of the third lens group between the wide-angle end and the telephoto end.

The requirement for, and the advantage of, the 36$^{th}$ zoom lens system constructed as recited above is now explained.

The requirement and advantage regarding the 36$^{th}$ zoom lens system are the same as those stated for the first zoom lens system, except for the explanation of condition (1).

Exceeding the upper limit of 1.83 to condition (8)' is not preferable, because the total length of the zoom lens system becomes too long at the telephoto end, and falling short of the lower limit of 0.9 is not preferable because the zoom ratio of the zoom lens system at the third lens group G3 becomes low or it is difficult to ensure the ability to form images with a reduced number of lenses.

The 37$^{th}$ zoom lens system according to Group 1 of the invention is characterized in that the 36$^{th}$ zoom lens system satisfies condition (1):

$$6.4 < L_W/f_W < 7.4 \tag{1}$$

where $L_W$ is the total length of the zoom lens system at the wide-angle end, and $f_W$ is the focal length of the zoom lens system at the wide-angle end.

The requirement for, and the advantage of, the 37$^{th}$ zoom lens system constructed as recited above is now explained. Condition (1) is provided to define the ratio at the wide-angle end of the total length (the length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the result that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The 38$^{th}$ zoom lens system according to Group 1 of the invention is characterized in that the third lens group G3 in the 36$^{th}$ or 37$^{th}$ zoom lens system is composed of two positive lenses and one negative lens.

The requirement for, and the advantage of, the 38$^{th}$ zoom lens system constructed as recited above is now explained. According to such construction, the third lens group G3 can be thinned while having a converging action with well reduced aberrations.

The 39$^{th}$ zoom lens system according to Group 1 of the invention is characterized in that any one of the 36$^{th}$ to 38$^{th}$ zoom lens systems satisfies condition (2):

$$5.8 < f_1/f_W < 8.0 \tag{2}$$

where $f_W$ is the focal length of the zoom lens system at the wide-angle end, and $f_1$ is the focal length of the first lens group.

The requirement for, and the advantage of, the 39$^{th}$ zoom lens system constructed as recited above is now explained. Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good enough image formation capability.

The lower limit to condition (2) could be set at 5.95, especially 6.05.

The upper limit to condition (2) could be set at 7.5, especially 7.0.

The 40$^{th}$ zoom lens system according to Group 1 of the invention is characterized in that any one of the 36$^{th}$ to 39$^{th}$ zoom lens systems satisfies condition (3):

$$2 < D_{2W}/D_{3W} < 2.6 \tag{3}$$

where $D_{2W}$ is the space between the second lens group and the third lens group at the wide-angle end, and $D_{3W}$ is the space between the third lens group and the fourth lens group at the wide-angle end.

The requirement for, and the advantage of, the 40$^{th}$ zoom lens system constructed as recited above is now explained. Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 come nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to become worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The 41$^{st}$ zoom lens system according to Group 1 of the invention is characterized in that any one of the 36$^{th}$ to 40$^{th}$ zoom lens systems satisfies conditions (4) and (5):

$$3<(\beta_{2T}/\beta_{2W})*(\beta_{3T}/\beta_{3W})*(\beta_{4T}/\beta_{4W})<7 \quad (4)$$

$$1.8<D_{2W}/f_W<2.8 \quad (5)$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the 41$^{st}$ zoom lens system constructed as recited above is now explained. Condition (4) relates to a basic zoom ratio requirement. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring the ability to form images.

Instead of conditions (4) and/or (5), the following conditions (4)' and/or (5)' having such numerical ranges as given below could be used.

$$3<(\beta_{2T}/\beta_{2W})*(\beta_{3T}/\beta_{3W})*(\beta_{4T}/\beta_{4W})<7 \quad (4)$$

$$2.0<D_{2W}/f_W<2.8 \quad (5)'$$

The lower limit to condition (4) could be set at 3.3, especially 3.5.

The upper limit to condition (4) could be set at 7.0, especially 6.3.

The lower limit to condition (5) could be set at 2.2, especially 2.35.

The upper limit to condition (5) could be set at 2.75, especially 2.7.

The 42$^{nd}$ zoom lens system according to Group 1 of the invention is characterized in that any one of the 36$^{th}$ to 41$^{st}$ zoom lens systems satisfies conditions (4) and (6)

$$3<(\beta_{2T}/\beta_{2W})*(\beta_{3T}/\beta_{3W})*(\beta_{4T}/\beta_{4W})<12 \quad (4)$$

$$1.1<|f_2/f_W|<1.8 \quad (6)$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

Referring to the requirement and advantage regarding the 42$^{nd}$ zoom lens system, condition (4) concerns a basic zoom ratio requirement. As the upper limit of 1.8 to condition (6) is exceeded yet with condition (4) satisfied, it is difficult to obtain a compact zoom lens system having a zoom ratio defined by condition (4). As the lower limit of 1.1 is not reached, it is difficult to obtain a compact zoom lens system having a desired power only by use of the negative meniscus lens or planoconcave negative lens.

The lower limit to condition (4) could be set at 3.3, especially 3.5.

The upper limit to condition (4) could be set at 7.0, especially 6.3.

The lower limit to condition (6) could be set at 1.3, especially 1.35.

The upper limit to condition (6) could be set at 1.7, especially 1.6.

The 43$^{rd}$ zoom lens system according to Group 1 of the invention is characterized in that, in any one of the 36$^{th}$ to 42$^{nd}$ zoom lens systems, the vitreous material, of which the two negative lenses in the second lens group G2 are formed, has a refractive index of at least 1.81 and the vitreous material, of which the positive lens in the second lens group G2 is formed, has a refractive index of at least 1.9.

The requirement for, and the advantage of, the 43$^{rd}$ zoom lens system constructed as recited above is now explained. As the vitreous material, of which the two negative lenses in the second lens group G2 are formed, has a refractive index of below 1.81 and the vitreous material, of which the positive lens in the second lens group G2 is formed, has a refractive index of below 1.9, it causes the Petzval sum to become large in the negative direction, ending up with the inability to correct field curvature. It also causes the power of the second lens group G2 to become large, ending up with the inability to achieve size reductions. Further in consideration of a combination of vitreous material, correction of chromatic aberrations becomes difficult.

The 44$^{th}$ zoom lens system according to Group 1 of the invention is characterized in that any one of the 36$^{th}$ to 43$^{rd}$ zoom lens systems satisfies conditions (4) and (7):

$$3<(\beta_{2T}/\beta_{2W})*(\beta_{3T}/\beta_{3W})*(\beta_{4T}/\beta_{4W})<12 \quad (4)$$

$$0.8<(\beta_{2T}/\beta_{2W})/(\beta_{3T}/\beta_{3W})<1.1 \quad (7)$$

where $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

Referring to the requirement for, and the advantage of, the 44$^{th}$ zoom lens system constructed as recited above, condition (4) concerns a basic zoom ratio requirement. As the upper limit of 1.1 to condition (7) is exceeded yet with condition (4) satisfied, the second lens group G2 must take on a heavier task of zooming, rendering the total length of the zoom lens system and the diameter of the front lens likely to increase. As the lower limit of 0.8 is not reached, there is an increase in the amount of movement of the third lens group G3 by zooming, which may otherwise cause an increase in F-number, and an increase in the amount of fluctuations in the angle of incidence of light on an image pickup device such as a CCD as well. Otherwise, the power of the third lens group G3 becomes large, causing the amount of aberrations to become too large to ensure the ability to form images.

The 45$^{th}$ zoom lens system according to Group 1 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G3 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lens elements; the second lens group G2 is composed of, in order from its object side, a negative lens L21, a negative lens L22 and a positive lens L23; and the zoom lens system satisfies condition (9):

$$1.2 < f_3/f_W < 1.85 \qquad (9)$$

where $f_W$ is the focal length of the zoom lens system at the wide-angle end, and $f_3$ is the focal length of the third lens group.

The requirement for, and the advantage of, the 45$^{th}$ zoom lens system constructed as recited above is now explained.

The requirement and advantage regarding the 45$^{th}$ zoom lens system are the same as those stated for the first zoom lens, except for the explanation of condition (1).

Condition (9) is provided to specify the proper refracting power of the third lens group G3. As the upper limit of 1.85 to condition (9) is exceeded, it causes the zoom action at the third lens group G3 to become weak, ending up with an increase in the total length of the zoom lens system upon zooming toward the telephoto end. It also causes the amount of fluctuations in the position of an exit pupil to become large with the result that there is an increase in fluctuations of the angle of incidence of light on an image pickup device such as a CCD at an off-axis image plane position, which may otherwise have adverse influences on shading or the like. As the lower limit of 1.2 to condition (9) is not reached, the amount of aberrations produced will increase, rendering it difficult to obtain any good image formation capability, without increasing the number of lenses, which is detrimental to compactness.

The lower limit to condition (9) could be set at 1.4, especially 1.6.

The upper limit to condition (9) could be set at 1.83, especially 1.81.

The 46$^{th}$ zoom lens system according to Group 0.1 of the invention is characterized in that the 45$^{th}$ zoom lens system satisfies condition (1):

$$6.4 < L_W/f_W < 7.4 \qquad (1)$$

where $L_W$ is the total length of the zoom lens system at the wide-angle end, and $f_W$ is the focal length of the zoom lens system at the wide-angle end.

The requirement for, and the advantage of, the 46$^{th}$ zoom lens system constructed as recited above is now explained. Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the result that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

The 47$^{th}$ zoom lens system according to Group 1 of the invention is characterized in that the third lens group G3 in the 45$^{th}$ or 46$^{th}$ zoom lens system is composed of two positive lenses and one negative lens.

The requirement for, and the advantage of, the 47$^{th}$ zoom lens system constructed as recited above is now explained. According to such construction, the third lens group G3 can be thinned while having a converging action with well reduced aberrations.

The 48$^{th}$ zoom lens system according to Group 1 of the invention is characterized in that any one of the 45$^{th}$ to 47$^{th}$ zoom lens systems satisfies condition (2):

$$5.8 < f_1/f_W < 8.0 \qquad (2)$$

where $f_W$ is the focal length of the zoom lens system at the wide-angle end, and $f_1$ is the focal length of the first lens group.

The requirement for, and the advantage of, the 48$^{th}$ zoom lens system constructed as recited above is now explained. Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good enough image formation capability.

The lower limit to condition (2) could be set at 5.95, especially 6.05.

The upper limit to condition (2) could be set at 7.5, especially 7.0.

The 49$^{th}$ zoom lens system according to Group 1 of the invention is characterized in that any one of the 45$^{th}$ to 48$^{th}$ zoom lens systems satisfies condition (3):

$$2 < D_{2W}/D_{3W} < 2.6 \qquad (3)$$

where $D_{2W}$ is the space between the second lens group and the third lens group at the wide-angle end, and $D_{3W}$ is the space between the third lens group and the fourth lens group at the wide-angle end.

The requirement for, and the advantage of, the 49$^{th}$ zoom lens system constructed as recited above is now explained. Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 come nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to become worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The 50$^{th}$ zoom lens system according to Group 1 of the invention is characterized in that any one of the 45$^{th}$ to 49$^{th}$ zoom lens systems satisfies conditions (4) and (5):

$$3<(\beta_{2T}/\beta_{2W})*(\beta_{3T}/\beta_{3W})*(\beta_{4T}/\beta_{4W})<7 \quad (4)$$

$$1.8<D_{2W}/f_W<2.8 \quad (5)$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the 50$^{th}$ zoom lens system constructed as recited above is now explained. Condition (4) relates to a basic zoom ratio requirement. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring the ability to form images.

Instead of conditions (4) and/or (5), the following conditions (4)' and/or (5)' having such numerical ranges as given below could be used.

$$3<(\beta_{2T}/\beta_{2W})*(\beta_{3T}/\beta_{3W})*(\beta_{4T}/\beta_{4W})<7 \quad (4)''$$

$$2.0<D_{2W}/f_W<2.8 \quad (5)'$$

The lower limit to condition (4) could be set at 3.3, especially 3.5.

The upper limit to condition (4) could be set at 7.0, especially 6.3.

The lower limit to condition (5) could be set at 2.2, especially 2.35.

The upper limit to condition (5) could be set at 2.75, especially 2.7.

The 51$^{st}$ zoom lens system according to Group 1 of the invention is characterized in that any one of the 45$^{th}$ to 50$^{th}$ zoom lens systems satisfies conditions (4) and (6):

$$3<\beta_{2T}/\beta_{2W})*(\beta_{3T}/\beta_{3W})*(\beta_{4T}/\beta_{4W})<12 \quad (4)$$

$$1.1<|f_2/f_W|<1.8 \quad (6)$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

Referring to the requirement and advantage regarding the 51$^{st}$ zoom lens system, condition (4) concerns a basic zoom ratio requirement. As the upper limit of 1.8 to condition (6) is exceeded yet with condition (4) satisfied, it is difficult to obtain a compact zoom lens system having a zoom ratio defined by condition (4). As the lower limit of 1.1 is not reached, it is difficult to obtain a compact zoom lens system having a desired power only by use of the negative meniscus lens or planoconcave negative lens.

The lower limit to condition (4) could be set at 3.3, especially 3.5.

The upper limit to condition (4) could be set at 7.0, especially 6.3.

The lower limit to condition (6) could be set at 1.3, especially 1.35.

The upper limit to condition (6) could be set at 1.7, especially 1.6.

The 52$^{nd}$ zoom lens system according to Group 1 of the invention is characterized in that, in any one of the 45$^{th}$ to 51$^{st}$ zoom lens systems, the vitreous material, of which the two negative lenses in the second lens group G2 are formed, has a refractive index of at least 1.81 and the vitreous material, of which the positive lens in the second lens group G2 is formed, has a refractive index of at least 1.9.

The requirement for, and the advantage of, the 52$^{nd}$ zoom lens system constructed as recited above is now explained. As the vitreous material, of which the two negative lenses in the second lens group G2 are formed, has a refractive index of below 1.81 and the vitreous material, of which the positive lens in the second lens group G2 is formed, has a refractive index of below 1.9, it causes the Petzval sum to become large in the negative direction, ending up with the inability to correct field curvature. It also causes the power of the second lens group G2 to become large, ending up with the inability to achieve size reductions. Further in consideration of a combination of vitreous material, correction of chromatic aberrations becomes difficult.

The 53$^{rd}$ zoom lens system according to Group 1 of the invention is characterized in that any one of the 45$^{th}$ to 52$^{nd}$ zoom lens systems satisfies conditions (4) and (7):

$$3<(\beta_{2T}/\beta_{2W})*(\beta_{3T}/\beta_{3W})*(\beta_{4T}/\beta_{4W})<12 \quad (4)$$

$$0.8<\beta_{2T}/\beta_{2W})/(\beta_{3T}/\beta_{3W})<1.1 \quad (7)$$

where $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

Referring to the requirement for, and the advantage of, the 53$^{rd}$ zoom lens system constructed as recited above, condition (4) concerns a basic zoom ratio requirement. As the upper limit of 1.1 to condition (7) is exceeded yet with condition (4) satisfied, the second lens group G2 must take on a heavier task of zooming, rendering the total length of the zoom lens system and the diameter of the front lens likely to increase. As the lower limit of 0.8 is not reached, there is an increase in the amount of movement of the third lens group G3 by zooming, which may otherwise cause an increase in F-number, and an increase in the amount of fluctuations in the angle of incidence of light on an image pickup device such as a CCD as well. Otherwise, the power of the third lens group G3 becomes large, causing the amount of aberrations to become too large to ensure the ability to form images.

The 54$^{th}$ zoom lens system according to Group 1 of the invention is characterized in that any one of the 45$^{th}$ to 53$^{rd}$ zoom lens systems satisfies condition (8):

$$0.9<\Delta_{T3G}/f_W<3 \quad (8)$$

where $\Delta_{T3G}$ is the amount of movement of the third lens group between the wide-angle end and the telephoto end.

The requirement for, and the advantage of, the 54$^{th}$ zoom lens system constructed as recited above is now explained. Exceeding the upper limit of 3 to condition (8) is not preferable, because the total length of the zoom lens system becomes too long at the telephoto end, and falling short of the lower limit of 0.9 is not preferable because the zoom ratio of the zoom lens system at the third lens group G3 becomes low or it is difficult to ensure the ability to form images with a reduced number of lenses.

Preferably in Group 1 of the invention, the fourth lens group G4 should be composed of one lens in view of compactness requirements for driving mechanisms or the like, and focusing should be carried out with the fourth lens group G4. It is also preferable that the aperture stop is located on the object side of the third lens group G3 in such a way as to move together with the third lens group G3. Preferably, the third lens group G3 should be composed of, in order from its object side, a double-convex lens L31, a positive meniscus lens L32 concave on its image-plane side and a negative meniscus lens L33 concave on its image-plane side, wherein the positive meniscus lens L32 and the negative meniscus lens L33 should be cemented together into a doublet.

While Group 1 of the invention is preferably composed of four lens groups with compactness in mind, it is understood that a lens group of weak power may be added thereto, and to achieve a zoom lens system having much higher ratios, much higher performance and a great many other functions while enjoying the advantages of Group 1 of the invention, a lens group may be added to the image-plane side.

The present invention also provides an imaging system that incorporates any one of the above zoom lens systems as the zoom lens system according to Group 1 of the invention and an image pickup device located on its image side. Any of the above zoom lens systems has a high zoom ratio in compact form. Therefore, if such a zoom lens system is mounted on an imaging system as an imaging optical system, compactness and multi-functions are then achievable. It is here noted that the imaging system referred to herein includes, in addition to digital cameras, video cameras digital video units, and so on.

According to Group 1 of the invention, it is possible to obtain a compact zoom lens system that has a decreased F-number and a higher zoom ratio, and an imaging system that incorporates it. More specifically, it is possible to obtain a compact zoom lens system that comprises a reduced number of lenses, and has an F-number of as low as about 2.8 and a zoom ratio of as high as about 4 to 5 with better image formation capabilities, and an imaging system that incorporates the same.

The zoom lens system according to Group 2 of the invention (corresponding to the ninth aspect) and an imaging system that incorporates the same are now explained in taken-apart forms.

The first zoom lens system according to Group 2 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lenses; the second lens group G2 is composed of, in order from its object side, a negative lens L21, a negative lens L22 and a positive lens L23; and the zoom lens system satisfies condition (9):

$$1.2 < f_3/f_W < 1.85 \qquad (9)$$

where $f_W$ is the focal length of the zoom lens system at the wide-angle end, and $f_3$ is the focal length of the third lens group.

The requirement for, and the advantage of, the first zoom lens system is now explained.

As the lens groups are arranged in the refracting power order of positive, negative, positive and positive as viewed in order from the object side of the zoom lens system, it ensures that performance is maintainable even at a zoom ratio exceeding 4.

As, upon zooming, the space between the first lens group G1 and the second lens group G2 becomes wide, the space between the second lens group G2 and the third lens group G3 becomes narrow and the space between the third lens group G3 and the fourth lens group G4 becomes wide at the telephoto end with respect to the wide-angle end, it allows the task of zooming to be allocated to the second lens group G2 and the third lens group G3, achieving efficient zooming. Further, as the first lens group G1 is designed to move in addition to the second lens group G2 and the third lens group G3, higher zoom ratios are easily achievable with a compact optical system.

As the first lens group G1 is composed of at most two lenses, it enables the lens diameter of the first lens group to be made compact and, hence, the thickness of the first lens group G1 to be reduced.

As the second lens group G2 is composed of, in order from its object side, a negative lens L21, a negative lens L22 and a positive lens L23, it permits the thickness of the second lens group G2 to be reduced in the optical axis direction to ensure enough zooming space while achieving zoom ratios and maintaining power.

Condition (9) is provided to define the proper refracting power of the third lens group G3. As the upper limit of 1.85 to condition (9) is exceeded, it causes the zoom action at the third lens group G3 to become weak, leading to an increase in the total length of the zoom lens system upon zooming to the telephoto end. For instance, when an aperture stop is moved together with the third lens group G3, there is an increase in fluctuations of the angle of incidence of light on an image pickup device such as a CCD at an off-axis image plane position, which may otherwise have adverse influences on shading or the like. As the lower limit of 1.2 to condition (9) is not reached, the amount of aberrations produced will increase, rendering it difficult to obtain any good image formation capability, without increasing the number of lenses, which is detrimental to compactness. It will be difficult to obtain any enough back focus.

The lower limit to condition (9) could be set at 1.4, especially 1.6.

The upper limit to condition (9) could be set at 1.83, especially 1.81.

It is here desirable that the first lens group G1 be positioned on the object side at the telephoto end with respect to the wide-angle end. This is favorable for reducing the total length of the zoom lens system at the wide-angle end and increasing the focal length of the zoom lens system at the telephoto end.

Alternatively, it is desirable that the second lens group G2 be nearest to the image side between the wide-angle end and the telephoto end. In other words, the second lens group G2 should preferably move toward the image side in a convex locus upon zooming from the wide-angle end to the telephoto end. This is favorable for high zoom ratios because, on the one hand, the second lens group G2 is permitted to take on the task of zooming on a wide-angle side and, on the other hand, the range of movement of the third lens group G3 is ensured on a telephoto side.

Alternatively, it is desired that the third lens group G3 move almost monotonously toward the object side upon zooming from the wide-angle end to the telephoto end. To put it another way, the third lens group G3 should preferably move only toward the object side during zooming from the wide-angle end to the telephoto end.

As all of the first lens group G1, the second lens group G2 and the third lens group G3 move as described above, the ability to form images is easily achievable even at high zoom ratios, because the third lens group G3, and the second lens group G2 takes a heavier task of zooming in a wide-angle zone, and a telephoto zone, respectively.

Preferably in view of total-length and cost reductions, the first lens group G1 should be composed of one positive lens.

Alternatively, the first lens group G1 should preferably be composed of, in order from its object side, one negative lens and one positive lens. This provides effective correction of chromatic aberrations, etc. at the first lens group G1.

Yet alternatively, the first lens group G1 should preferably be composed of a doublet consisting of one negative lens and one positive lens. This prevents reflections of light between the surfaces of two lenses, making ghost reductions easy.

The second zoom lens system according to Group 2 of the invention is characterized in that the third lens group G3 in the first zoom lens system is composed of two positive lenses and one negative lens.

The requirement for, and the advantage of, the second zoom lens system is now explained. According to the arrangement as recited above, the third lens group G3 can be thinned while having a converging action with well reduced aberrations.

The third zoom lens system according to Group 2 of the invention is characterized in that the first or second zoom lens system satisfies condition (2):

$$5.8 < f_1/f_W < 8.0 \tag{2}$$

where $f_W$ is the focal length of the zoom lens system at the wide-angle end, and $f_1$ is the focal length of the first lens group.

The requirement for, and the advantage of, the third zoom lens system constructed as recited above is now explained.

Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good image formation capability.

The lower limit to condition (2) could be set at 5.95, especially 6.05.

The upper limit to condition (2) could be set at 7.5, especially 7.0.

The fourth zoom lens system according to Group 2 of the invention is characterized in that any one of the first to third zoom lens systems satisfies condition (3):

$$2 < D_{2W}/D_{3W} < 2.6 \tag{3}$$

where $D_{2W}$ is the space between the second lens group and the third lens group at the wide-angle end, and $D_{3W}$ is the space between the third lens group and the fourth lens group at the wide-angle end.

The requirement for, and the advantage of, the fourth zoom lens system constructed as recited above is now explained.

Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 are nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to become worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The fifth zoom lens system according to Group 2 of the invention is characterized in that any one of the first to fourth zoom lens systems satisfies conditions (4) and (5):

$$3 < (\beta_{2T}/\beta_{2W}) * (\beta_{3T}/\beta_{3W}) * (\beta_{4T}/\beta_{4W}) < 12 \tag{4}$$

$$1.8 < D_{2W}/f_W < 2.8 \tag{5}$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the fifth zoom lens system constructed as recited above is now explained.

Condition (4) relates to a basic zoom ratio requirement. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring image formation capability.

Instead of conditions (4) and/or (5), the following conditions (4)' and/or (5)' having such numerical ranges as given below could be applied.

$$3 < (\beta_{2T}/\beta_{2W}) * (\beta_{3T}/\beta_{3W}) * (\beta_{4T}/\beta_{4W}) < 7 \quad (4)'$$

$$2.0 < D_{2W}/f_W < 2.8 \quad (5)'$$

The lower limit to condition (4) could be set at 3.3, especially 3.5.

The upper limit to condition (4) could be set at 7.0, especially 6.3.

The lower limit to condition (5) could be set at 2.2, especially 2.35.

The upper limit to condition (5) could be set at 2.75, especially 2.7.

The sixth zoom lens system according to Group 2 of the invention is characterized in that any one of the first to fifth zoom lens systems satisfies condition (10):

$$0.8 < \Delta_{T1G}/\Delta_{T3G} < 1.3 \quad (10)$$

where $\Delta_{T1G}$ is the amount of movement of the first lens group between the wide-angle end and the telephoto end, and $\Delta_{T3G}$ is the amount of movement of the third lens group between the wide-angle end and the telephoto end.

The requirement for, and the advantage of, the sixth zoom lens constructed as recited above is now explained.

As the upper limit of 1.3 to condition (10) is exceeded, it causes the amount of movement of the first lens group G1 by zooming to become large, incurring a noticeable decrease in the quantity of rim rays at the telephoto end unless the diameter of the first lens group G1 is enlarged. As the lower limit of 0.8 is not reached, the third lens group G3 must take on a heavier task of zooming, leading to increased fluctuations in the full-aperture F-number; when the stop diameter remains fixed, the F-number at the telephoto end becomes large. Otherwise, with the full-aperture stop diameter varying with zooming, the mechanism involved becomes complicated or space efficiency grows worse. Further, as the effective diameter of the first lens group G1 is set at the wide-angle end, it is unfavorable for compactness, because the entrance pupil position becomes deep at the wide-angle end, and a peripheral part of the first lens group G1 is unavailable at the telephoto end.

The lower limit to condition (10) could be set at 0.85, especially 0.9.

The upper limit to condition (10) could be set at 1.25, especially 1.2.

The seventh zoom lens system according to Group 2 of the invention is characterized in that the sixth zoom lens system satisfies condition (11):

$$-0.20 < \Delta_{S1G}/\Delta_{S3G} < 0.8 \quad (11)$$

where $\Delta_{S1G}$ is the amount of movement of the first lens group between the wide-angle end and an intermediate focal length state, and $\Delta_{T3G}$ is the amount of movement of the third lens group between the wide-angle end and an intermediate focal length state, provided that the intermediate focal length is represented by a focal length $f_S = \sqrt{(f_W \cdot f_T)}$ where $f_W$ is the focal length of the zoom lens system at the wide-angle end and $f_T$ is the focal length of the zoom lens system at the telephoto end.

The requirement for, and the advantage of, the seventh zoom lens system constructed as recited above is now explained.

As the upper limit of 0.8 to condition (11) is exceeded, there is an increase in the lens diameter of the first lens group G1, because the entrance pupil position becomes deep in an intermediate zone with an increase in the height of incident light rays through the first lens group G1. As the lower limit of −0.20 is not reached, there is an increased load on the mechanism involved, because of too large an amount of movement of the first lens group G1 from the intermediate focal length to the telephoto end.

The lower limit to condition (11) could be set at −0.1, especially 0, or more specifically 0.1.

The upper limit to condition (11) could be set at 0.75, especially 0.7.

The eighth zoom lens system according to Group 2 of the invention is characterized in that in any one of the first to seventh zoom lens systems, the second lens group G2 is composed of, in order its object side, a negative meniscus lens L21, a negative meniscus lens or a plano-concave negative lens L22 and a positive meniscus lens L23, and the zoom lens system satisfies conditions (4) and (8):

$$3 < (\beta_{2T}/\beta_{2W}) * (\beta_{3T}/\beta_{3W}) * (\beta_{4T}/\beta_{4W}) < 12 \quad (4)$$

$$1.1 < |f_2/f_W| < 1.8 \quad (8)$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

The requirement for, and the advantage of, the eighth zoom lens system constructed as recited above is now explained.

As the second lens group G2 is composed of, in order from its object side, a negative meniscus lens L21, a negative meniscus lens or a planoconcave negative lens L22 and a positive meniscus lens L23, it permits higher-order aberrations to be precisely controlled, and performance to be easily ensured.

Condition (4) concerns a basic zoom ratio requirement. As the upper limit of 1.8 to condition (8) is exceeded yet with condition (4) satisfied, it is difficult to obtain a compact zoom lens system having a zoom ratio defined by condition (4). As the lower limit of 1.1 is not reached, it is difficult to obtain a compact zoom lens system having a desired power only by use of the negative meniscus lens or planoconcave negative lens.

The lower limit to condition (4) could be set at 3.3, especially 3.5.

The upper limit to condition (4) could be set at 7.0, especially 6.3.

The lower limit to condition (8) could be set at 1.3, especially 1.35.

The upper limit to condition (8) could be set at 1.7, especially 1.6.

The ninth zoom lens system according to Group 2 of the invention is characterized in that, in any one of the $1^{st}$ to $8^{th}$ zoom lens systems, the vitreous material, of which the two negative lenses in the second lens group G2 are formed, has a refractive index of at least 1.81 and the vitreous material, of which the positive lens in the second lens group G2 is formed, has a refractive index of at least 1.9.

The requirement for, and the advantage of, the ninth zoom lens system constructed as recited above is now explained. As the vitreous material, of which the two negative lenses in the second lens group G2 are formed, has a refractive index of below 1.81 and the vitreous material, of which the positive lens in the second lens group G2 is formed, has a refractive index of below 1.9, it causes the Petzval sum to become large in the negative direction, ending up with the inability to correct field curvature. It also causes the power of the second lens group G2 to become large, ending up with the inability to achieve size reductions. Further in consideration of a combination of vitreous material, correction of chromatic aberrations becomes difficult.

The 10$^{th}$ zoom lens system according to Group 2 of the invention is characterized in that any one of the 1$^{st}$ to 9$^{th}$ zoom lens systems satisfies condition (1):

$$6.4 < L_W/f_W < 7.4 \tag{1}$$

where $L_W$ is the total length of the zoom lens system at the wide-angle end, and $f_W$ is the focal length of the zoom lens system at the wide-angle end.

The requirement for, and the advantage of, the 10$^{th}$ zoom lens system constructed as recited above is now explained.

Condition (1) is provided to define the ratio at the wide-angle end of the total length (length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the result that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

Preferably in Group 2 of the invention, the fourth lens group G4 should be composed of one lens in view of compactness requirements for driving mechanisms or the like, and focusing should be carried out with the fourth lens group G4. It is also preferable that the aperture stop is located on the object side of the third lens group G3 in such a way as to move together with the third lens group G3. Preferably, the third lens group G3 should be composed of, in order from its object side, a double-convex lens L31, a positive meniscus lens L32 concave on its image-plane side and a negative meniscus lens L33 concave on its image-plane side, wherein the positive meniscus lens L32 and the negative meniscus lens L33 should be cemented together into a doublet.

While Group 2 of the invention is preferably composed of four lens groups with compactness in mind, it is understood that a lens group of weak power may be added thereto, and to achieve a zoom lens system having much higher ratios, much higher performance and a great many other functions while enjoying the advantages of Group 2 of the invention, a lens group may be added to the image-plane side.

The present invention also provides an imaging system that incorporates any one of the above zoom lens systems as the zoom lens system according to Group 2 of the invention and an image pickup device located on its image side. Any of the above zoom lens systems has a high zoom ratio in compact form. Therefore, if such a zoom lens system is mounted on an imaging system as an imaging optical system, compactness and multi-functions are then achievable. It is here noted that the imaging system referred to herein includes, in addition to digital cameras, video cameras digital video units, and so on.

According to Group 2 of the invention, it is possible to obtain a compact zoom lens system that has a decreased F-number and a higher zoom ratio, and an imaging system that incorporates it. More specifically, it is possible to obtain a compact zoom lens system that comprises a reduced number of lenses, and has an F-number of as low as about 2.8 and a zoom ratio of as high as about 4 to 5 with better image formation capabilities, and an imaging system that incorporates the same.

The zoom lens system according to Group 3 of the invention (corresponding to the 10$^{th}$ aspect) and an imaging system that incorporates the same are now explained in taken-apart forms.

The first zoom lens system according to Group 3 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein, upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide; the first lens group G1 is composed of at most two lens elements; the second lens group G2 is composed of, in order from its object side, a negative lens L21, a negative lens L22 and a positive lens L23; an aperture stop is interposed between the second lens group G2 and the third lens group G3; and the zoom lens system satisfies condition (7):

$$0.8 < (\beta_{2T}/\beta_{2W})/(\beta_{3T}/\beta_{3W}) < 1.1 \tag{7}$$

where $\beta_{2T}$, and $\beta_{3T}$ is the magnification of the second lens group, and the third lens group, respectively, at the telephoto end; and $\beta_{2W}$, and $\beta_{3W}$ is the magnification of the second lens group, and the third lens group, respectively, at the wide-angle end.

The requirement for, and the advantage of, the first zoom lens system constructed as above is now explained.

As the lens groups are arranged in the refracting power order of positive, negative, positive and positive as viewed in order from the object side of the zoom lens system, it ensures that performance is maintainable even at a zoom ratio exceeding 4.

As, upon zooming, the space between the first lens group G1 and the second lens group G2 becomes wide, the space between the second lens group G2 and the third lens group G3 becomes narrow and the space between the third lens group G3 and the fourth lens group G4 becomes wide at the telephoto end with respect to the wide-angle end, it allows the task of zooming to be allocated to the second lens group G2 and the third lens group G3, achieving efficient zooming. Further, as the first lens group G1 is designed to move in addition to the second lens group G2 and the third lens group G3, higher zoom ratios are easily achievable with a compact optical system.

It is here desirable that the first lens group G1 be positioned on the object side at the telephoto end with respect to the wide-angle end. This is favorable for reducing the total length of the zoom lens system at the wide-angle end and increasing the focal length of the zoom lens system at the telephoto end.

It is desirable that the second lens group G2 be nearest to the image side between the wide-angle end and the telephoto end. In other words, the second lens group G2 should preferably move toward the image side in a convex locus upon zooming from the wide-angle end to the telephoto end. This is favorable for high zoom ratios because, on the one hand, the second lens group G2 is permitted to take on the task of zooming on a wide-angle side and, on the other hand, the range of movement of the third lens group G3 is ensured on a telephoto side.

It is desired that the third lens group G3 move almost monotonously toward the object side upon zooming from the wide-angle end to the telephoto end. To put it another way, the third lens group G3 should preferably move only toward the object side during zooming from the wide-angle end to the telephoto end.

As the first lens group G1 is composed of at most two lenses, it enables the lens diameter of the first lens group to be made compact and, hence, the thickness of the first lens group G1 to be reduced.

Preferably in view of total-length and cost reductions, the first lens group G1 should be composed of one positive lens.

Alternatively, the first lens group G1 should preferably be composed of, in order from its object side, one negative lens and one positive lens. This is effective for correction of chromatic aberrations, etc. at the first lens group G1.

Yet alternatively, the first lens group G1 should preferably be composed of a doublet consisting of one negative lens and one positive lens. This prevents reflections of light between the surfaces of two lenses, making ghost reductions easy.

As the second lens group G2 is composed of, in order from its object side, a negative lens L21, a negative lens L22 and a positive lens L23, it permits the thickness of the second lens group G2 to be reduced to ensure enough zooming space while achieving zoom ratios and maintaining power.

As the aperture stop is interposed between the second lens group G2 and the third lens group G3, it allows the outside diameter of the first lens group G1 and the outside diameter of the fourth lens group G4 to be well balanced in compact form. In other words, the height of light rays in an off-axis light beam at the wide-angle end and the height of light ray in an off-axis light beam at the telephoto end are well balanced. This is also preferable for the angle of incidence of light on an image pickup device.

Preferably, the aperture stop should move together with the third lens group G3 in a one-piece fashion.

As the upper limit of 1.1 to condition (7) is exceeded, the second lens group G2 must take on a heavier task of zooming, rendering the total length of the zoom lens system and the diameter of the front lens likely to increase. As the lower limit of 0.8 is not reached, there is an increase in the amount of movement of the third lens group G3 by zooming, which may otherwise cause an increase in F-number, and an increase in the amount of fluctuations in the angle of incidence of light on an image pickup device such as a CCD as well. Otherwise, the power of the third lens group G3 becomes large, causing the amount of aberrations to become too large to ensure the ability to form images.

The second zoom lens system according to Group 3 of the invention is characterized in that the third lens group G3 in the first zoom lens system is composed of two positive lenses and one negative lens.

The requirement for, and the advantage of, the second zoom lens system is now explained. According to the arrangement as recited above, the third lens group G3 can be thinned while having a converging action with well reduced aberrations.

The third zoom lens system according to Group 3 of the invention is characterized in that the first or second zoom lens system satisfies condition (2):

$$5.8 < f_1/f_W < 8.0 \tag{2}$$

where $f_W$ is the focal length of the zoom lens system at the wide-angle end, and $f_1$ is the focal length of the first lens group.

The requirement for, and the advantage of, the third zoom lens system constructed as recited above is now explained.

Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good image formation capability.

The lower limit to condition (2) could be set at 5.95, especially 6.05.

The upper limit to condition (2) could be set at 7.5, especially 7.0.

The fourth zoom lens system according to Group 3 of the invention is characterized in that any one of the first to third zoom lens systems satisfies condition (3):

$$2 < D_{2W}/D_{3W} < 2.6 \tag{3}$$

where $D_{2W}$ is the space between the second lens group and the third lens group at the wide-angle end, and $D_{3W}$ is the space between the third lens group and the fourth lens group at the wide-angle end.

The requirement for, and the advantage of, the fourth zoom lens system constructed as recited above is now explained.

Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 are nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to grow worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The fifth zoom lens system according to Group 3 of the invention is characterized in that any one of the first to fourth zoom lens systems satisfies conditions (4) and (5):

$$3 < (\beta_{2T}/\beta_{2W})*(\beta_{3T}/\beta_{3W})*(\beta_{4T}/\beta_{4W}) < 12 \tag{4}$$

$$1.8 < D_{2W}/f_W < 2.8 \tag{5}$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the fifth zoom lens system constructed as recited above is now explained.

Condition (4) relates to a basic zoom ratio requirement. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring the ability to form images.

Instead of conditions (4) and/or (5), the following conditions (4)' and/or (5)' having such numerical ranges as given below could be applied.

$$3<(\beta_{2T}/\beta_{2W})*(\beta_{3T}/\beta_{3W})*(\beta_{4T}/\beta_{4W})<7 \quad (4)'$$

$$2.0<D_{2W}/f_W<2.8 \quad (5)'$$

The lower limit to condition (4) could be set at 3.3, especially 3.5.

The upper limit to condition (4) could be set at 7.0, especially 6.3.

The lower limit to condition (5) could be set at 2.2, especially 2.35.

The upper limit to condition (5) could be set at 2.75, especially 2.7.

The sixth zoom lens system according to Group 3 of the invention is characterized in that in any one of the first to fifth zoom lens systems, the second lens group G2 is composed of, in order its object side, a negative meniscus lens L21, a negative meniscus lens or a plano-concave negative lens L22 and a positive meniscus lens L23, and the zoom lens system satisfies conditions (4) and (6):

$$3<\beta_{2T}/\beta_{2W})*(\beta_{3T}/\beta_{3W})*(\beta_{4T}/\beta_{4W})<12 \quad (4).$$

$$1.1<|f_2/f_W|<1.8 \quad (6)$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

The requirement for, and the advantage of, the sixth zoom lens system constructed as recited above is now explained.

As the second lens group G2 is composed of, in order from its object side, a negative meniscus lens L21, a negative meniscus lens or a planoconcave negative lens L22 and a positive meniscus lens L23, it permits higher-order aberrations to be precisely controlled, and performance to be easily ensured.

Condition (4) concerns a basic zoom ratio requirement. As the upper limit of 1.8 to condition (6) is exceeded yet with condition (4) satisfied, it is difficult to obtain a compact zoom lens system having a zoom ratio defined by condition (4). As the lower limit of 1.1 is not reached, it is difficult to obtain a compact zoom lens system having a desired power only by use of the negative meniscus lens or planoconcave negative lens.

The lower limit to condition (4) could be set at 3.3, especially 3.5.

The upper limit to condition (4) could be set at 7.0, especially 6.3.

The lower limit to condition (6) could be set at 1.3, especially 1.35.

The upper limit to condition (6) could be set at 1.7, especially 1.6.

The seventh zoom lens system according to Group 3 of the invention is characterized in that, in any one of the $1^{st}$ to $6^{th}$ zoom lens systems, the vitreous material, of which the two negative lenses in the second lens group G2 are formed, has a refractive index of at least 1.81 and the vitreous material, of which the positive lens in the second lens group G2 is formed, has a refractive index of at least 1.9.

The requirement for, and the advantage of, the seventh zoom lens system constructed as recited above is now explained. As the vitreous material, of which the two negative lenses in the second lens group G2 are formed, has a refractive index of below 1.81 and the vitreous material, of which the positive lens in the second lens group G2 is formed, has a refractive index of below 1.9, it renders correction of chromatic aberrations difficult. It also causes field curvature to become large, because the Petzval sum becomes large in the negative direction.

The eighth zoom lens system according to Group 3 of the invention is characterized in that any one of the $1^{st}$ to $7^{th}$ zoom lens systems satisfies condition (8):

$$0.9<\Delta_{T3G}/f_W<3 \quad (8)$$

where $\Delta_{T3G}$ is the amount of movement of the third lens group between the wide-angle end and the telephoto end.

The requirement for, and the advantage of, the eighth zoom lens system constructed as recited above is now explained.

Exceeding the upper limit of 3 to condition (8) is not preferable because the total length of the zoom lens system at the telephoto end becomes too long, and falling short of the lower limit of 0.9 is not preferable because the zoom ratio the zoom lens system at the third lens group becomes low or it is difficult to obtain the ability to form images with a reduced number of lenses.

The ninth zoom lens system according to Group 3 of the invention is characterized in that any one of the $1^{st}$ to $8^{th}$ zoom lens systems satisfies condition (9):

$$1.2<f_3/f_W<1.85 \quad (9)$$

where $f_W$ is the focal length of the zoom lens system at the wide-angle end, and $f_3$ is the focal length of the third lens group.

The requirement for, and the advantage of, the ninth zoom lens system constructed as recited above is now explained.

Condition (9) is provided to define the proper refracting power of the third lens group G3. As the upper limit of 1.85 to condition (9) is exceeded, it causes the zoom action at the third lens group G3 to become weak, leading to an increase in the total length of the zoom lens system upon zooming to the telephoto end. For instance, when an aperture stop is moved together with the third lens group G3, there is an increase in fluctuations of the angle of incidence of light on an image pickup device such as a CCD at an off-axis image plane position, which may otherwise have adverse influences on shading or the like. As the lower limit of 1.2 to condition (9) is not reached, the amount of aberrations produced will increase, rendering it difficult to obtain any good image formation capability, without increasing the number of lenses, which is detrimental to compactness. It will be difficult to obtain any enough back focus.

The lower limit to condition (9) could be set at 1.4, especially 1.6.

The upper limit to condition (9) could be set at 1.83, especially 1.81.

The $10^{th}$ zoom lens system according to Group 3 of the invention is characterized in that any one of the $1^{st}$ to $9^{th}$ zoom lens systems satisfies condition (1):

$$6.4 < L_W/f_W < 7.4 \tag{1}$$

where $L_W$ is the total length of the zoom lens system at the wide-angle end, and $f_W$ is the focal length of the zoom lens system at the wide-angle end.

The requirement for, and the advantage of, the $10^{th}$ zoom lens system constructed as recited above is now explained. Condition (1) is provided to define the ratio at the wide-angle end of the total length (the length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the result that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

Preferably in Group 3 of the invention, the fourth lens group G4 should be composed of one lens in view of compactness requirements for driving mechanisms or the like, and focusing should be carried out with the fourth lens group G4. It is also preferable that the aperture stop is located on the object side of the third lens group G3 in such a way as to move together with the third lens group G3. Preferably, the third lens group G3 should be composed of, in order from its object side, a double-convex lens L31, a positive meniscus lens L32 concave on its image-plane side and a negative meniscus lens L33 concave on its image-plane side, wherein the positive meniscus lens L32 and the negative meniscus lens L33 should be cemented together into a doublet.

While Group 3 of the invention is preferably composed of four lens groups with compactness in mind, it is understood that a lens group of weak power may be added thereto, and to achieve a zoom lens system having much higher ratios, much higher performance and a great many other functions while enjoying the advantages of Group 3 of the invention, a lens group may be added to the image-plane side.

The present invention also provides an imaging system that incorporates any one of the above zoom lens systems as the zoom lens system according to Group 3 of the invention and an image pickup device located on its image side. Any of the above zoom lens systems has a high zoom ratio in compact form. Therefore, if such a zoom lens system is mounted on an imaging system as an imaging optical system, compactness and multi-functions are then achievable. It is here noted that the imaging system referred to herein includes, in addition to digital cameras, video camera digital video units, and so on.

According to Group 3 of the invention, it is possible to obtain a compact zoom lens system that has a decreased F-number and a higher zoom ratio, and an imaging system that incorporates it. More specifically, it is possible to obtain a compact zoom lens system that comprises a reduced number of lenses, and has an F-number of as low as about 2.8 and a zoom ratio of as high as about 4 to 5 with better image formation capabilities, and an imaging system that incorporates the same.

The zoom lens system according to Group 4 of the invention (corresponding to the $11^{th}$ aspect) and an imaging system that incorporates the same are now explained in taken-apart forms.

The first zoom lens system according to Group 4 of the invention is characterized by comprising, in order from an object side thereof, a first lens group G1 having positive refracting power, a second lens group G2 having negative refracting power, a third lens group G3 having positive refracting power and a fourth lens group G4 having positive refracting power, wherein:

upon zooming, at least the first lens group G1, the second lens group G2 and the third lens group G3 move on an optical axis in such a way that, at a telephoto end with respect to a wide-angle end, the space between the first lens group G1 and the second lens group G2 becomes wide, the space between the second lens group G2 and the third lens group G3 becomes narrow and the space between the third lens group G3 and the fourth lens group G4 becomes wide;

the first lens group G1 is composed of at most two lens elements;

the second lens group G2 is composed of, in order from its object side, a negative lens L21, a negative lens L22 and a positive lens L23, wherein said first negative lens L21 is a negative lens having a large curvature on its image plane side, said second negative lens L22 is a negative lens having a large curvature on its image plane side, and said positive lens L23 is a positive lens having a large curvature on its object side; and the third lens group G3 is composed of, in order from its object side, a double-convex lens L31, a positive meniscus lens L32 concave on its image plane side and a negative meniscus lens L33 concave on its image plane side, wherein said positive meniscus lens L32 and said negative meniscus lens L33 are cemented together into a cemented lens, and said double-convex lens L31 satisfies condition (12):

$$-6 < R_{31}/F_{31} < -1 \tag{12}$$

where $F_{31}$ is the radius of curvature of the object-side surface of the double-convex lens L31 near the optical axis, and $R_{31}$ is the radius of curvature of the image plane-side surface of the double-convex lens L31 near the optical axis.

The requirement for, and the advantage of, the first zoom lens system constructed as recited above is now explained.

As the lens groups are arranged in the refracting power order of positive, negative, positive and positive as viewed in order from the object side of the zoom lens system, it ensures that performance is maintainable even at a zoom ratio exceeding 4.

As, upon zooming, the space between the first lens group G1 and the second lens group G2 becomes wide, the space between the second lens group G2 and the third lens group G3 becomes narrow and the space between the third lens group G3 and the fourth lens group G4 becomes wide at the telephoto end with respect to the wide-angle end, it allows the task of zooming to be allocated to the second lens group G2 and the third lens group G3, achieving efficient zooming. Further, as the first lens group G1 is designed to move in addition to the second lens group G2 and the third lens group G3, higher zoom ratios are easily achievable with a compact optical system.

It is here desirable that the first lens group G1 be positioned on the object side at the telephoto end with respect to the wide-angle end. This is favorable for reducing the total length of the zoom lens system at the wide-angle end and increasing the focal length of the zoom lens system at the telephoto end.

Alternatively, it is desirable that the second lens group G2 be nearest to the image side between the wide-angle end and the telephoto end. In other words, the second lens group G2 should preferably move toward the image side in a convex locus upon zooming from the wide-angle end to the telephoto end. This is favorable for high zoom ratios because, on the one hand, the second lens group G2 is permitted to take on the task of zooming on a wide-angle side and, on the other hand, the range of movement of the third lens group G3 is ensured on a telephoto side.

Alternatively, it is desired that the third lens group G3 move almost monotonously toward the object side upon zooming from the wide-angle end to the telephoto end. To put it another way, the third lens group G3 should preferably move only toward the object side during zooming from the wide-angle end to the telephoto end.

As all of the first lens group G1, the second lens group G2 and the third lens group G3 move as described above, the ability to form images is easily achievable even at high zoom ratios, because the third lens group G3, and the second lens group G2 takes a greater part in zooming in a wide-angle zone, and a telephoto zone, respectively.

As the first lens group G1 is composed of at most two lenses, it enables the lens diameter of the first lens group to be made compact and, hence, the thickness of the first lens group G1 to be reduced.

Preferably in view of total-length and cost reductions, the first lens group G1 should be composed of one positive lens.

Alternatively, the first lens group G1 should preferably be composed of, in order from its object side, one negative lens and one positive lens. This is effective for correction of chromatic aberrations, etc. at the first lens group G1.

Yet alternatively, the first lens group G1 should preferably be composed of a doublet consisting of one negative lens and one positive lens. This prevents reflections of light between the surfaces of two lenses, making ghost reductions easy.

As the second lens group G2 is composed of, in order from its object side, a negative lens L21, a negative lens L22 and a positive lens L23, it permits the thickness of the second lens group G2 to be reduced to ensure enough zooming space while achieving zoom ratios and maintaining power.

As the negative lens L21 in the second lens group G2 is composed of a negative lens having a large curvature on its image plane side, the negative lens L22 of a negative lens having a large curvature on its image plane side and the positive lens L23 of a positive lens having a large curvature on its object side, it enables the principal points of the second lens group G2 to be positioned on the object side, so that the total length of the zoom lens system at the wide-angle end can be efficiently reduced.

To efficiently convert a light beam diverging through the second lens group G2 into a converging light beam, on the other hand, the third lens group G3 is composed of the double-convex lens L31 that satisfies condition (12) and a doublet consisting of the positive meniscus lens L32 that corrects mainly chromatic aberrations and controls off-axis aberrations as well, and is concave on its image plane side and the negative meniscus lens L33 concave on its image plane side, whereby the space and misalignments between the positive meniscus lens L32 and the negative meniscus lens L33 can be precisely managed. Also, as meniscus lenses are used as the positive lens L32 and negative lens L33, it enables aberrations to be well reduced with a decrease in the thickness of the doublet.

As the upper limit of −1 to condition (12) is exceeded, it is impossible to give any sufficient converging action to an incident light beam with the object-side surface of the double-convex lens L31 and, hence, reduce the outside diameter of the third lens group G3. Because of the amount of movement of the third lens group G3 during zooming being relatively large, and with a driving mechanism in mind, it is not preferable for the third lens group G3 to have a large outside diameter. Falling short of the lower limit of −6 is not preferable because the curvature of the object-side surface of the double-convex lens L31 becomes steep with too large aberrations.

The lower limit to condition (12) could be set at −4, especially −3.

The upper limit to condition (12) could be set at −2.5, especially −2.0.

The double-convex lens L31 should be composed of preferably an aspheric lens that is more preferably aspheric at both surfaces.

The second zoom lens system according to Group 4 of the invention is characterized in that the first zoom lens system satisfies condition (2):

$$5.8 < f_1/f_W < 8.0 \qquad (2)$$

where $f_W$ is the focal length of the zoom lens system at the wide-angle end, and $f_1$ is the focal length of the first lens group.

The requirement for, and the advantage of, the second zoom lens system constructed as recited above is now explained.

Condition (2) is provided to properly define the refracting power of the first lens group G1. As $f_1$ is larger than the upper limit of 8.0 to condition (2), it is difficult to perform zooming at the rear lens groups while maintaining compactness. As the lower limit of 5.8 is not reached, there is an increase in the amount of aberrations produced at the first lens group G1, which may otherwise render it difficult to obtain good image formation capability.

The lower limit to condition (2) could be set at 5.95, especially 6.05.

The upper limit to condition (2) could be set at 7.5, especially 7.0.

The third zoom lens system according to Group 4 of the invention is characterized in that any one of the first or second zoom lens system satisfies condition (3):

$$2 < D_{2W}/D_{3W} < 2.6 \qquad (3)$$

where $D_{2W}$ is the space between the second lens group and the third lens group at the wide-angle end, and $D_{3W}$ is the space between the third lens group and the fourth lens group at the wide-angle end.

The requirement for, and the advantage of, the third zoom lens system constructed as recited above is now explained.

Condition (3) is provided to define the proper space ratio between the second lens group G2 and the third lens group G3, and between the third lens group G3 and the fourth lens group G4. As the upper limit of 2.6 to condition (3) is exceeded, the first lens group G1 and the second lens group G2 are nearer to the object side at the wide-angle end, causing an increase in the height of off-axis light rays and in turn the lens diameter to tend to increase. Otherwise, when an aperture stop is moved together with the third lens group G3, the space between the second lens group G2 and the third lens group G3 becomes narrow, whereupon the exit angle of light with the image plane tends to become large, causing shading properties to become worse. As the lower limit of 2 to condition (3) is not reached, it causes the space between the second lens group G2 and the third lens group G3 to become narrow, rendering it difficult to ensure the space necessary for zooming.

The lower limit to condition (3) could be set at 2.05, especially 2.07.

The upper limit to condition (3) could be set at 2.55, especially 2.52.

The fourth zoom lens system according to Group 4 of the invention is characterized in that any one of the first to third zoom lens systems satisfies conditions (4) and (5):

$$3<(\beta_{2T}/\beta_{2W})*(\beta_{3T}/\beta_{3W})*(\beta_{4T}/\beta_{4W})<12 \quad (4)$$

$$1.8<D_{2W}/f_W<2.8 \quad (5)$$

where $\beta_{2T}$, $\beta_{3T}$, and $\beta_{4T}$ is the magnification of the second lens group, the third lens group, and the fourth lens group, respectively, at the telephoto end; $\beta_{2W}$, $\beta_{3W}$, and $\beta_{4W}$ is the magnification of the second lens group, the third lens group, and the fourth lens group, respectively, at the wide-angle end; $f_W$ is the focal length of the zoom lens system at the wide-angle end; and $D_{2W}$ is the space between the second lens group and the third lens group at the wide-angle end.

The requirement for, and the advantage of, the fourth zoom lens system constructed as recited above is now explained.

Condition (4) relates to a basic zoom ratio requirement. As the upper limit of 2.8 to condition (5) is exceeded yet with condition (4) satisfied, the first lens group G1 and the second lens group G2 come nearer to the object side at the wide-angle end, causing an increase in the height of off-axis light rays and in turn the lens diameter to tend to increase, or else the space between the second lens group G2 and the third lens group G3 becomes narrow, whereupon the exit angle of light with the image plane tends to become large, causing shading properties to become worse. As the lower limit of 1.8 to condition (5) is not reached, it is impossible to ensure the amount of change in the space between the second lens group G2 and the third lens group G3; it is difficult to satisfy condition (4) while ensuring the ability to form images.

Instead of conditions (4) and/or (5), the following conditions (4)' and/or (5)' having such numerical ranges as given below could be applied.

$$3<(\beta_{2T}/\beta_{2W})*(\beta_{3T}/\beta_{3W})*(\beta_{4T}/\beta_{4W})<7 \quad (4)'$$

$$2.0<D_{2W}/f_W<2.8 \quad (5)'$$

The lower limit to condition (4) could be set at 3.3, especially 3.5.

The upper limit to condition (4) could be set at 7.0, especially 6.3.

The lower limit to condition (5) could be set at 2.2, especially 2.35.

The upper limit to condition (5) could be set at 2.75, especially 2.7.

The fifth zoom lens system according to Group 4 of the invention is characterized in that, in any one of the $1^{st}$ to $4^{th}$ zoom lens systems, the vitreous material, of which the two negative lenses in the second lens group G2 are formed, has a refractive index of at least 1.81 and the vitreous material, of which the positive lens in the second lens group G2 is formed, has a refractive index of at least 1.9.

The requirement for, and the advantage of, the fifth zoom lens system constructed as recited above is now explained. As the vitreous material, of which the two negative lenses in the second lens group G2 are formed, has a refractive index of below 1.81 and the vitreous material, of which the positive lens in the second lens group G2 is formed, has a refractive index of below 1.9, it causes the Petzval sum to increase in the negative direction, ending up with the inability to correct field curvature. It also causes the power of the second lens group to become large, rendering size reductions impossible. Further in view of a combination of the vitreous materials, correction of chromatic aberrations is difficult.

The sixth zoom lens system according to Group 4 of the invention is characterized in that any one of the first to fifth zoom lens systems satisfies condition (10):

$$0.8<\Delta_{T1G}/\Delta_{T3G}<1.3 \quad (10)$$

where $\Delta_{T1G}$ is the amount of movement of the first lens group between the wide-angle end and the telephoto end, and $\Delta_{T3G}$ is the amount of movement of the third lens group between the wide-angle end and the telephoto end.

The requirement for, and the advantage of, the sixth zoom lens constructed as recited above is now explained.

As the upper limit of 1.3 to condition (10) is exceeded, it causes the amount of movement of the first lens group G1 by zooming to become large, incurring a noticeable decrease in the quantity of rim rays at the telephoto end unless the diameter of the first lens group G1 is enlarged. As the lower limit of 0.8 is not reached, the third lens group G3 must taken on a heavier task of zooming, leading to increased fluctuations in the full-aperture F-number; when the stop diameter remains fixed, the F-number at the telephoto end becomes large. Otherwise, with the full-aperture stop diameter varying with zooming, the mechanism involved becomes complicated or space efficiency grows worse. Further, as the effective diameter of the first lens group G1 is set at the wide-angle end, it is unfavorable for compactness, because the entrance pupil position becomes deep at the wide-angle end, and a peripheral part of the first lens group G1 is unavailable at the telephoto end.

The lower limit to condition (10) could be set at 0.85, especially 0.9.

The upper limit to condition (10) could be set at 1.25, especially 1.2.

The seventh zoom lens system according to Group 4 of the invention is characterized in that the sixth zoom lens system satisfies condition (11):

$$-0.20<\Delta_{S1G}/\Delta_{S3G}<0.8 \quad (11)$$

where $\Delta_{S1G}$ is the amount of movement of the first lens group between the wide-angle end and an intermediate focal length state, and $\Delta_{T3G}$ is the amount of movement of the third lens group between the wide-angle end and an intermediate focal length state, provided that the intermediate focal length is represented by a focal length $f_S=\sqrt{(f_W \cdot f_T)}$ where $f_W$ is the focal length of the zoom lens system at the wide-angle end and $f_T$ is the focal length of the zoom lens system at the telephoto end.

The requirement for, and the advantage of, the seventh zoom lens system constructed as recited above is now explained.

As the upper limit of 0.8 to condition (11) is exceeded, there is an increase in the lens diameter of the first lens group G1, because the entrance pupil position becomes deep in an intermediate zone with an increase in the height of incident light rays through the first lens group G1. As the lower limit of −0.20 is not reached, there is an increased load on the mechanism involved, because of too large an amount of movement of the first lens group G1 from the intermediate focal length to the telephoto end.

The lower limit to condition (11) could be set at −0.1, especially 0, or more specifically 0.1.

The upper limit to condition (11) could be set at 0.75, especially 0.7.

The eighth zoom lens system according to Group 4 of the invention is characterized in that any one of the first to seventh zoom lens systems satisfies conditions (4) and (8):

$$3<(\beta_{2T}/\beta_{2W})*(\beta_{3T}/\beta_{3W})*(\beta_{4T}/\beta_{4W})<12 \quad (4)$$

$$1.1<f_2/f_W|<1.8 \quad (6)$$

where $f_W$ is the focal length of the zoom lens system at the wide-angle end; $f_2$ is the focal length of the second lens group; $\beta_{2T}$, $\beta_{3T}$, and $\beta_{4T}$ is the magnification of the second lens group, the third lens group, and the fourth lens group, respectively, at the telephoto end; and $\beta_{2W}$, $\beta_{3W}$, and $\beta_{4W}$ is the magnification of the second lens group, the third lens group, and the fourth lens group, respectively, at the wide-angle end.

The requirement for, and the advantage of, the eighth zoom lens system constructed as recited above is now explained.

Condition (4) concerns a basic zoom ratio requirement. As the upper limit of 1.8 to condition (6) is exceeded yet with condition (4) satisfied, the second lens group G2 must take on a heavier task of zooming, rendering the total length and the diameter of the front lens likely to become large. As the lower limit of 1.1 is not reached, it causes the F-number at the telephoto end to become large due to too large an amount of movement of the third lens group G3 by zooming. It also causes increased fluctuations in the angle of incidence of light on an image pickup device such as a CCD. Otherwise, it causes the power of the third lens group G3 to become large, resulting in an increase in the amount of aberrations, which renders it difficult to ensure the ability to form images.

The lower limit to condition (4) could be set at 3.3, especially 3.5.

The upper limit to condition (4) could be set at 7.0, especially 6.3.

The lower limit to condition (6) could be set at 1.3, especially 1.35.

The upper limit to condition (6) could be set at 1.7, especially 1.6.

The ninth zoom lens system according to Group 4 of the invention is characterized in that any one of the $1^{st}$ to $8^{th}$ zoom lens systems satisfies condition (9):

$$1.2<f_3/f_W<1.85 \quad (9)$$

where $f_W$ is the focal length of the zoom lens system at the wide-angle end, and $f_3$ is the focal length of the third lens group.

The requirement for, and the advantage of, the ninth zoom lens system constructed as recited above is now explained.

Condition (9) is provided to define the proper refracting power of the third lens group G3. As the upper limit of 1.85 to condition (9) is exceeded, it causes the zoom action at the third lens group G3 to become weak, leading to an increase in the total length of the zoom lens system upon zooming to the telephoto end. For instance, when an aperture stop is moved together with the third lens group G3, there is an increase in fluctuations of the angle of incidence of light on an image pickup device such as a CCD at an off-axis image plane position, which may otherwise have adverse influences on shading or the like. As the lower limit of 1.2 to condition (9) is not reached, the amount of aberrations produced will increase, rendering it difficult to obtain any good image formation capability, without increasing the number of lenses, which is detrimental to compactness. It will be difficult to obtain any enough back focus.

The lower limit to condition (9) could be set at 1.4, especially 1.6.

The upper limit to condition (9) could be set at 1.83, especially 1.81.

The $10^{th}$ zoom lens system according to Group 4 of the invention is characterized in that any one of the $1^{st}$ to $9^{th}$ zoom lens systems satisfies condition (1):

$$6.4<L_W/f_W<7.4 \quad (1)$$

where $L_W$ is the total length of the zoom lens system at the wide-angle end, and $f_W$ is the focal length of the zoom lens system at the wide-angle end.

The requirement for, and the advantage of, the $10^{th}$ zoom lens system constructed as recited above is now explained. Condition (1) is provided to define the ratio at the wide-angle end of the total length (the length from the first surface of the lens system to the image plane) to the focal length of the zoom lens system. As the upper limit of 7.4 to condition (1) is exceeded, there is an increase in the total length at the wide-angle end, which may otherwise render the lens unit bulkier, and there is an increase in the height of light rays through the first lens group G1, which may otherwise lead to a lens diameter increase. As the lower limit of 6.4 is not reached with the result that the space between the second lens group G2 and the third lens group G3 is narrow, it is impossible to ensure the space necessary for zooming.

The lower limit to condition (1) could be set at 6.55, especially 6.5.

The upper limit to condition (1) could be set at 7.2, especially 7.0.

Preferably in Group 4 of the invention, the fourth lens group G4 should be composed of one lens in view of compactness requirements for driving mechanisms or the like, and focusing should be carried out with the fourth lens group G4. It is also preferable that the aperture stop is located on the object side of the third lens group G3 in such a way as to move together with the third lens group G3 in a one-piece fashion.

While Group 4 of the invention is preferably composed of four lens groups with compactness in mind, it is understood that a lens group of weak power may be added thereto, and to achieve a zoom lens system having much higher ratios, much higher performance and a great many other functions while enjoying the advantages of the third group of the invention, a lens group may be added to the image-plane side.

The present invention also provides an imaging system that incorporates any one of the above zoom lens systems as the zoom lens system according to Group 4 of the invention and an image pickup device located on its image side. Any of the above zoom lens systems has a high zoom ratio in compact form. Therefore, if such a zoom lens system is mounted on an imaging system as an imaging optical system, compactness and multi-functions are then achievable. It is here noted that the imaging system referred to herein includes, in addition to digital cameras, video camera digital video units, and so on.

According to Group 4 of the invention, it is possible to obtain a compact zoom lens system that has a decreased F-number and a higher zoom ratio, and an imaging system that incorporates it. More specifically, it is possible to obtain a compact zoom lens system that comprises a reduced number of lenses, and has an F-number of as low as about 2.8 and a zoom ratio of as high as about 4 to 5 with better image formation capabilities, and an imaging system that incorporates the same.

Figure 1B:
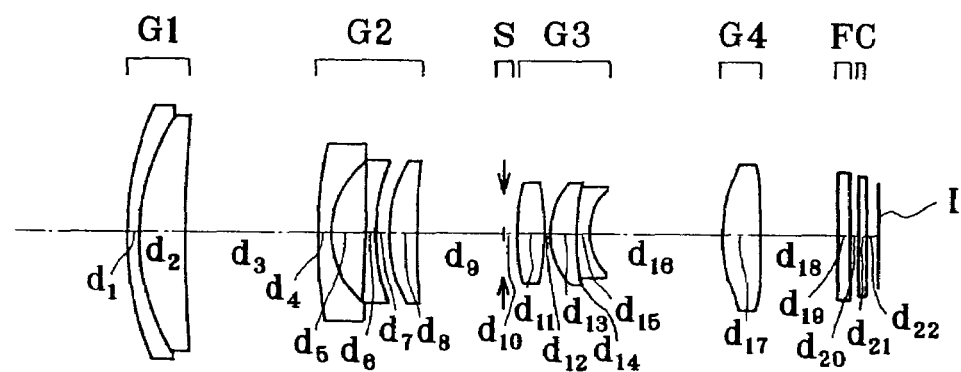
Figure 1C:
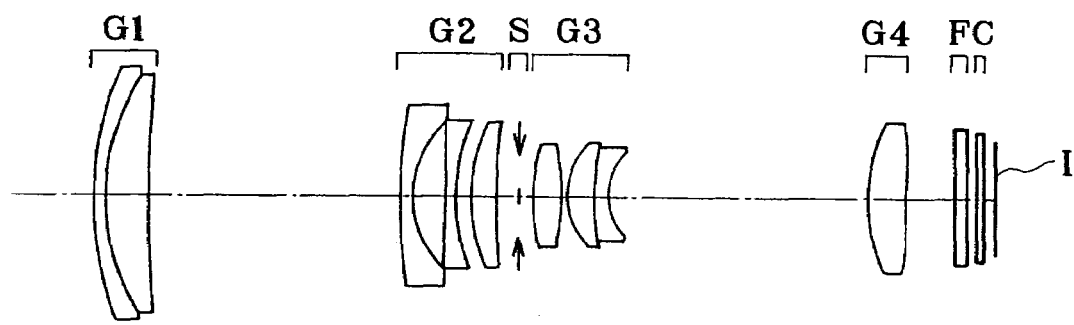

The zoom lens system of the invention is now explained with reference to Examples 1-9. FIGS. 1A, 1B and 1C are illustrative in section at the wide-angle end, intermediate state, and telephoto end, respectively, of Example 1 of the zoom lens system according to the invention upon focusing on an infinite object point. FIGS. 2A, 2B and 2C to FIGS. 9A, 9B and 9C are views similar to FIGS. 1A, 1B and 1C for Examples 2 to 9 of the zoom lens system according to the invention. In these figures, G1 stands for the first lens group, G2 the second lens group, S an aperture stop, G3 the third lens group, G4 the fourth lens group, F a plane-parallel plate that forms a low-pass filter with an IR cut coating applied on it, C a plane-parallel plate for the cover glass of an electronic image pickup device, and I an image plane. It is here noted that the cover glass CG could be provided thereon with a wavelength-limiting multilayer coating, or a low-pass filter function.

As shown in FIGS. 1A, 1B and 1C, Example 1 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system in a convex locus, and is positioned nearer to the image side at the telephoto end than at the wide-angle end. The aperture stop S and the third lens group G3 move monotonously toward the object side in one-piece form, and the fourth lens group G4 moves toward the object side in a convex locus, and is positioned nearer to the object side at the telephoto end than at the wide-angle end.

The first lens group G1 is composed of, in order from its object side, a doublet consisting of a negative meniscus lens convex on its object side and a positive meniscus lens convex o its object side. The second lens group G2 is composed of, in order from its object side, a negative meniscus lens convex on its object side, a plano-concave negative lens and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one double-convex positive lens.

Four aspheric surfaces are used; two at both surfaces of the double-convex positive lens in the third lens group G3 and two at both surfaces of the double-convex positive lens in the fourth lens group G4.

Figure 2A:
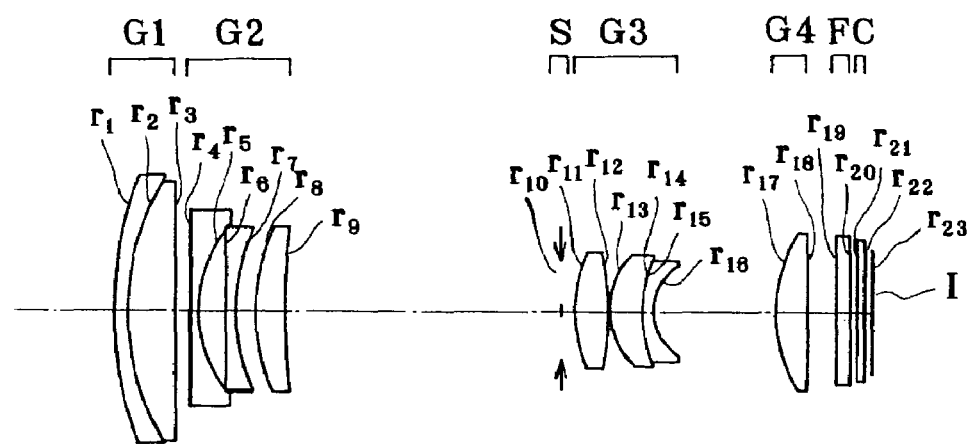
FIGS. 2A, 2B and 2C are views similar to FIGS. 1A, 1B and 1C for Example 2 of the zoom lens system according to the invention.
Figure 2B:
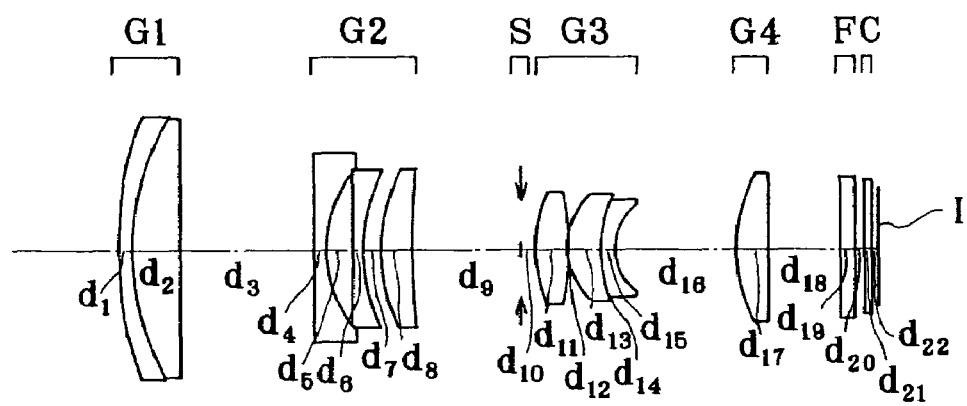
Figure 2C:
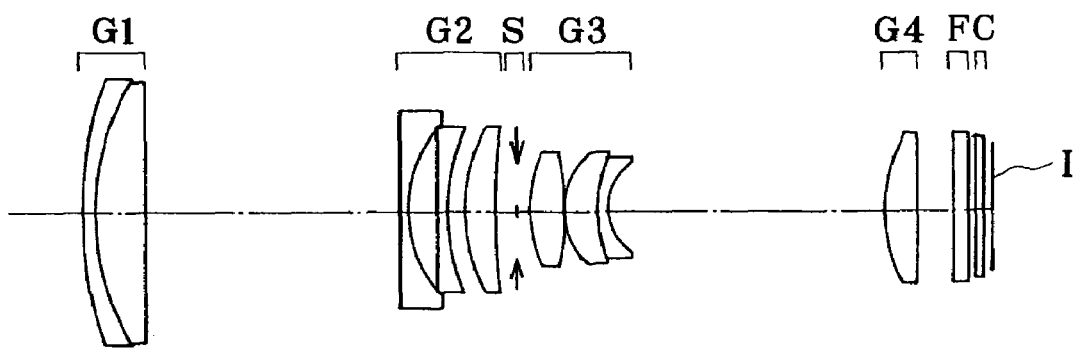

As shown in FIGS. 2A, 2B and 2C, Example 2 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system in a convex locus, and is positioned nearer to the image side at the telephoto end than at the wide-angle end. The aperture stop S and the third lens group G3 move monotonously toward the object side in one-piece form, and the fourth lens group G4 moves toward the object side in a convex locus, and is positioned nearer to the object side at the telephoto end than at the wide-angle end.

The first lens group G1 is composed of, in order from its object side, a doublet consisting of a negative meniscus lens convex on its object side and a double-convex positive lens. The second lens group G2 is composed of, in order from its object side, two negative meniscus lenses each convex on its object side and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one double-convex positive lens.

Two aspheric surfaces are used at both surfaces of the double-convex positive lens in the third lens group G3.

Figure 3A:
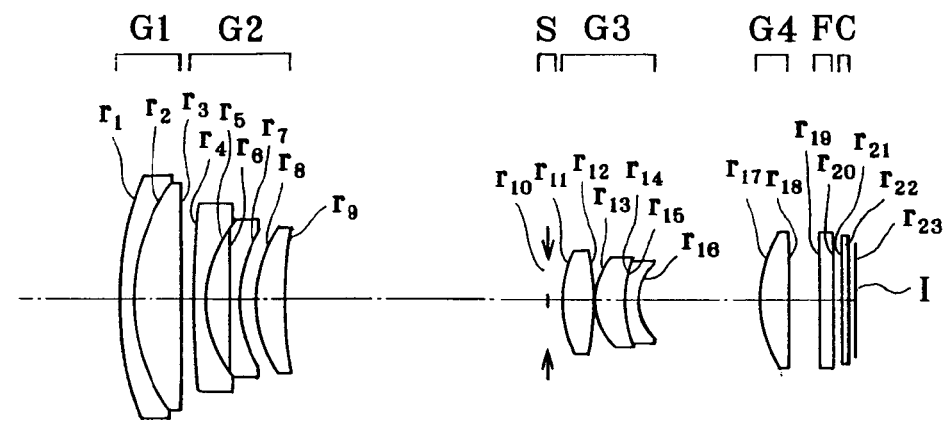
FIGS. 3A, 3B and 3C are views similar to FIGS. 1A, 1B and 1C for Example 3 of the zoom lens system according to the invention.
Figure 3B:
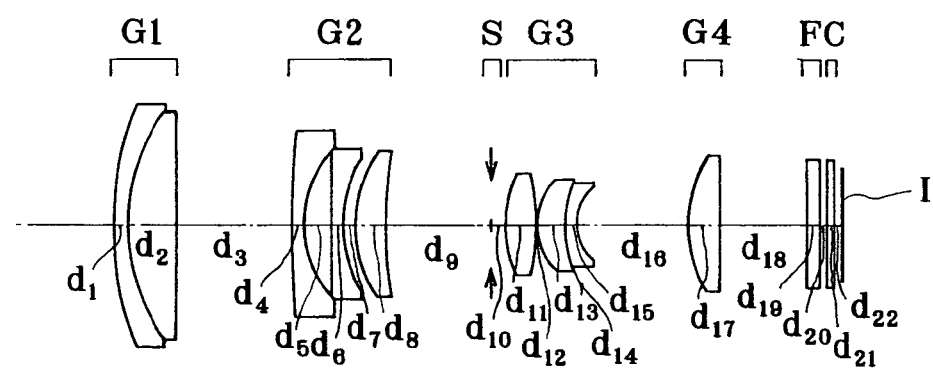
Figure 3C:
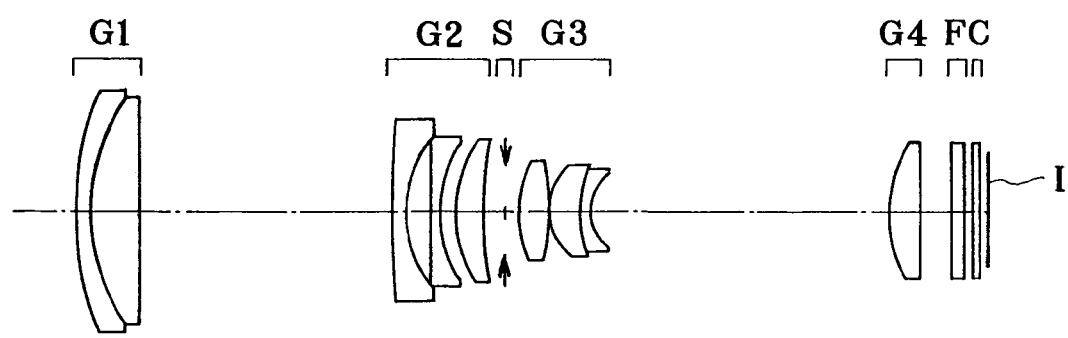

As shown in FIGS. 3A, 3B and 3C, Example 3 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system in a convex locus, and is positioned nearer to the image side at the telephoto end than at the wide-angle end. The aperture stop S and the third lens group G3 move monotonously toward the object side in one-piece form, and the fourth lens group G4 moves toward the object side in a convex locus, and is positioned nearer to the object side at the telephoto end than at the wide-angle end.

The first lens group G1 is composed of, in order from its object side, a doublet consisting of a negative meniscus lens convex on its object side and a double-convex positive lens. The second lens group G2 is composed of, in order from its object side, two negative meniscus lenses each convex on its object side and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one double-convex positive lens.

Two aspheric surfaces are used at both surfaces of the double-convex positive lens in the third lens group G3.

Figure 4A:
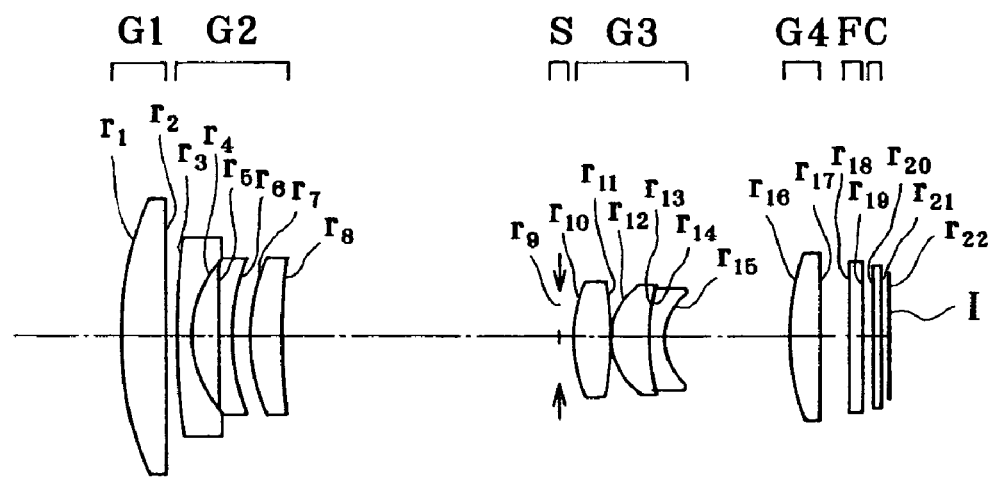
FIGS. 4A, 4B and 4C are views similar to FIGS. 1A, 1B and 1C for Example 4 of the zoom lens system according to the invention.
Figure 4B:
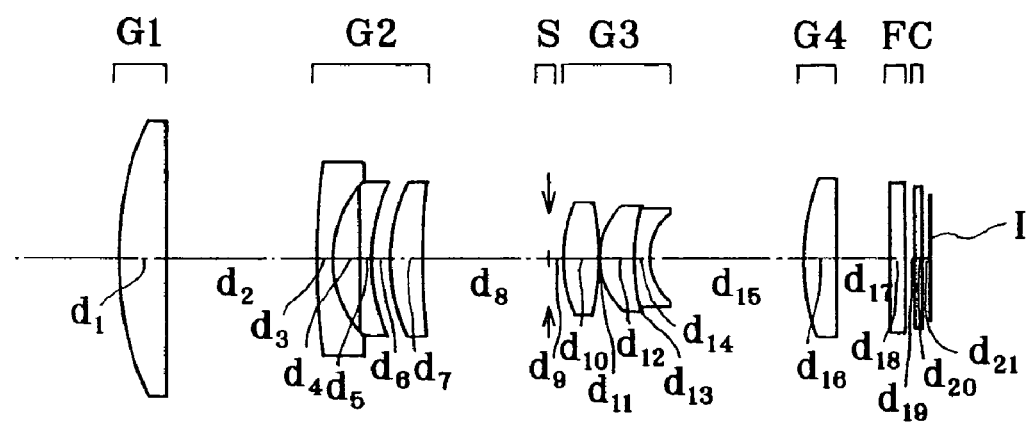
Figure 4C:
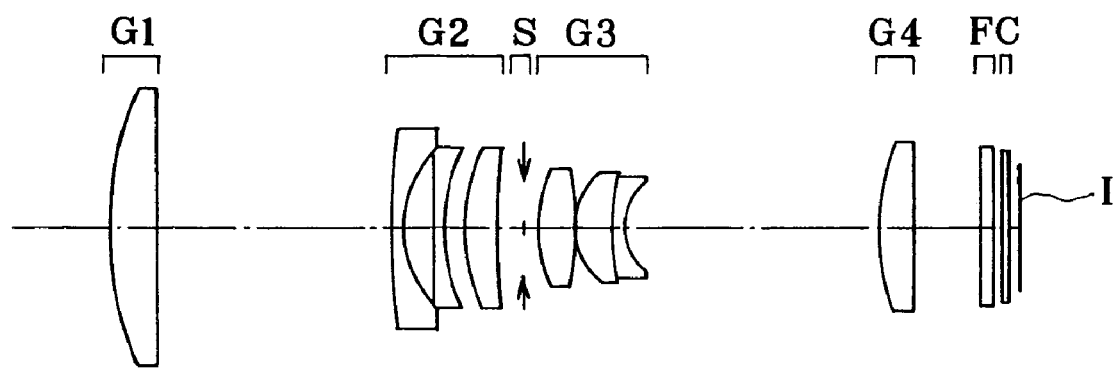

As shown in FIGS. 4A, 4B and 4C, Example 4 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system in a convex locus, and is positioned nearer to the image side at the telephoto end than at the wide-angle end. The aperture stop S and the third lens group G3 move monotonously toward the object side in one-piece form, and the fourth lens group G4 moves toward the object side while the space between it and the third lens group G4 becomes wide.

The first lens group G1 is composed of one double-convex positive lens. The second lens group G2 is composed of, in order from its object side, two negative meniscus lenses each convex on its object side and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one double-convex positive lens.

Three aspheric surfaces are used; two at both surfaces of the double-convex positive lens in the third lens group G3 and one at the object-side surface of the double-convex positive lens in the fourth lens group G4.

Figure 5A:
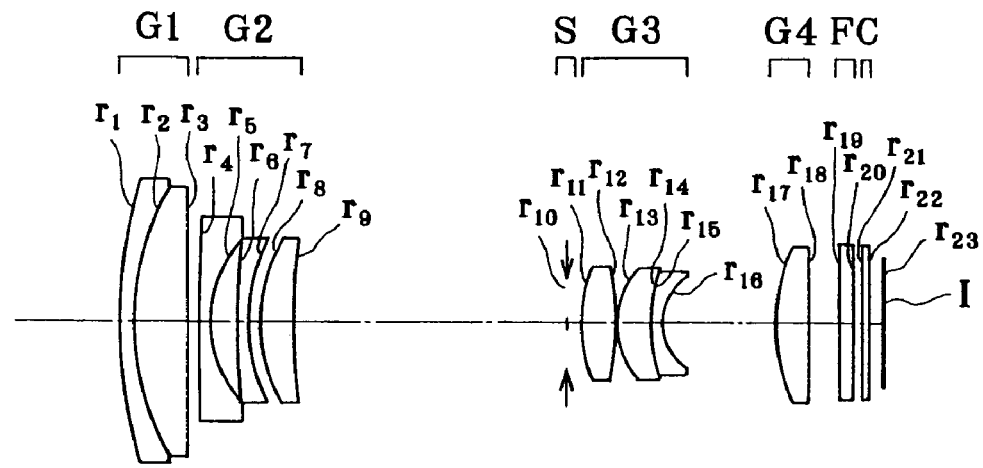
FIGS. 5A, 5B and 5C are views similar to FIGS. 1A, 1B and 1C for Example 5 of the zoom lens system according to the invention.
Figure 5B:
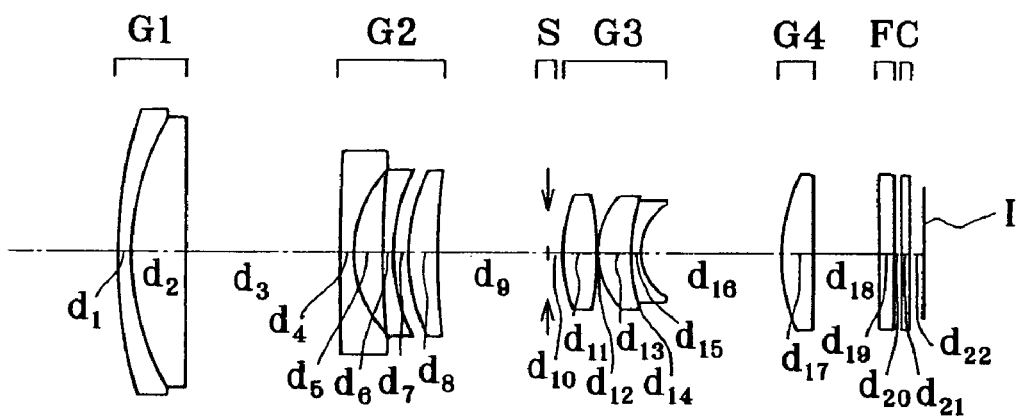
Figure 5C:
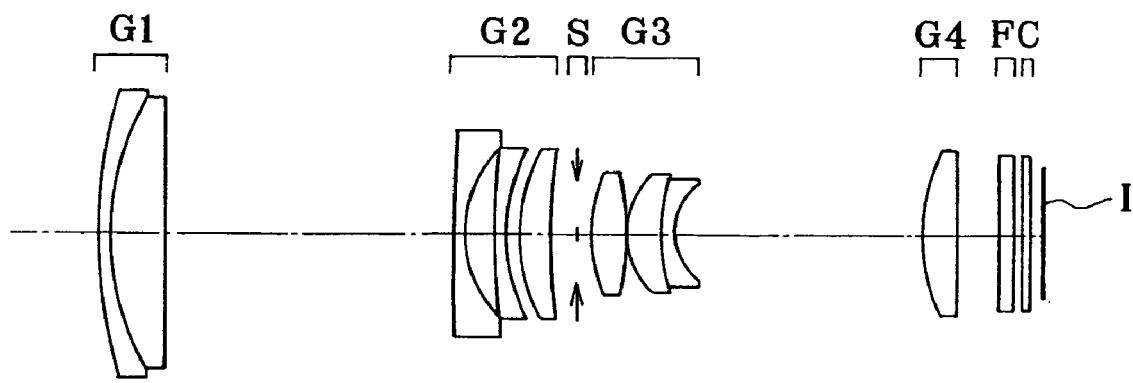

As shown in FIGS. 5A, 5B and 5C, Example 5 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system in a convex locus, and is positioned nearer to the image side at the telephoto end than at the wide-angle end. The aperture stop S and the third lens group G3 move monotonously toward the object side in one-piece form, and the fourth lens group G4 moves toward the object side in a convex locus, and is ositioned nearer to the object side at the telephoto end han at the wide-angle end.

The first lens group G1 is composed of, in order from its object side, a doublet consisting of a negative meniscus lens convex on its object side and a double-convex positive lens. The second lens group G2 is composed of, in order from its object side, two negative meniscus lenses each convex on its object side and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one double-convex positive lens.

Figure 6A:
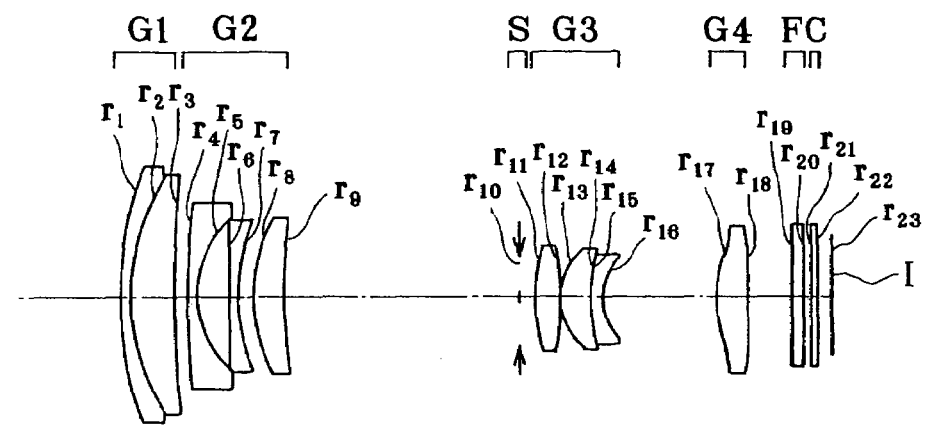
FIGS. 6A, 6B and 6C are views similar to FIGS. 1A, 1B and 1C for Example 6 of the zoom lens system according to the invention.
Figure 6B:
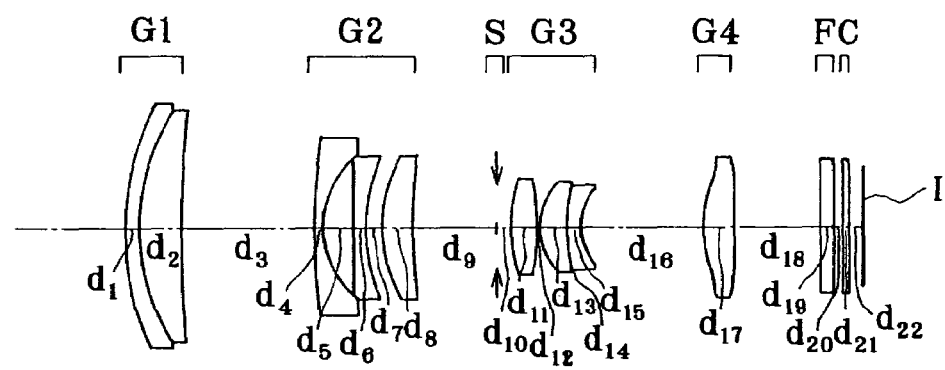
Figure 6C:
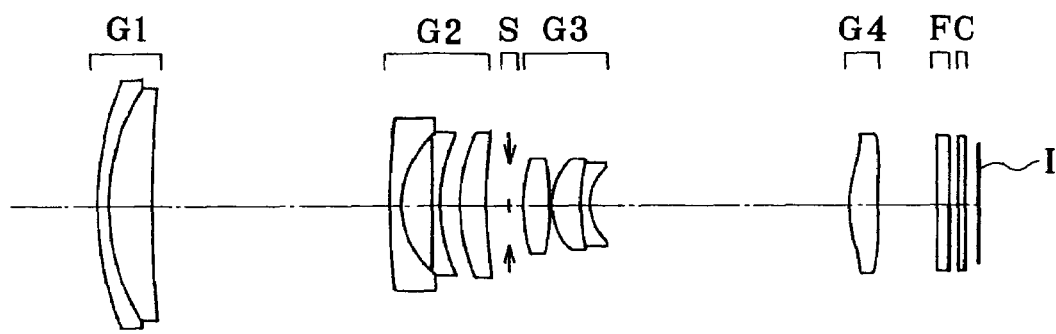

As shown in FIGS. 6A, 6B and 6C, Example 6 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system in a convex locus, and is positioned nearer to the image side at the telephoto end than at the wide-angle end. The aperture stop S and the third lens group G3 move monotonously toward the object side in one-piece form, and the fourth lens group G4 moves toward the object side in a convex locus, and is positioned nearer to the object side at the telephoto end than at the wide-angle end.

The first lens group G1 is composed of, in order from its object side, a doublet consisting of a negative meniscus lens convex on its object side and a positive meniscus lens convex on its object side. The second lens group G2 is composed of, in order from its object side, a negative meniscus lens convex on its object side, a plano-concave negative lens and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one positive meniscus lens convex on its object side.

Four aspheric surfaces are used; two at both surfaces of the double-convex positive lens in the third lens group G3 and two at both surfaces of the positive meniscus lens in the fourth lens group G4.

Figure 7A:
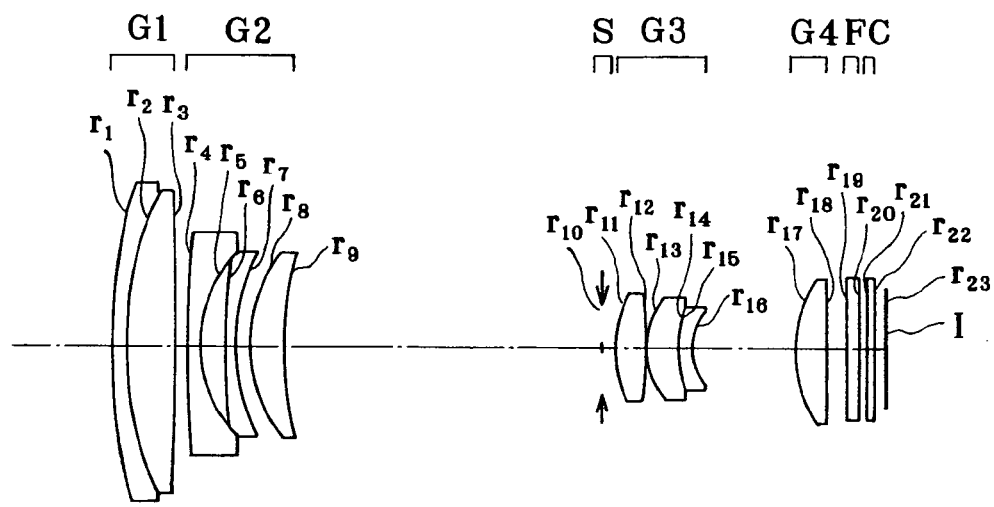
FIGS. 7A, 7B and 7C are views similar to FIGS. 1A, 1B and 1C for Example 7 of the zoom lens system according to the invention.
Figure 7B:
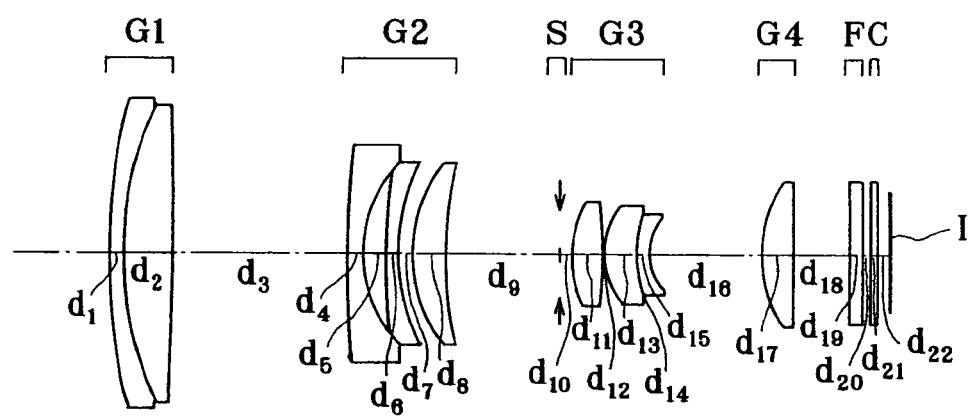
Figure 7C:
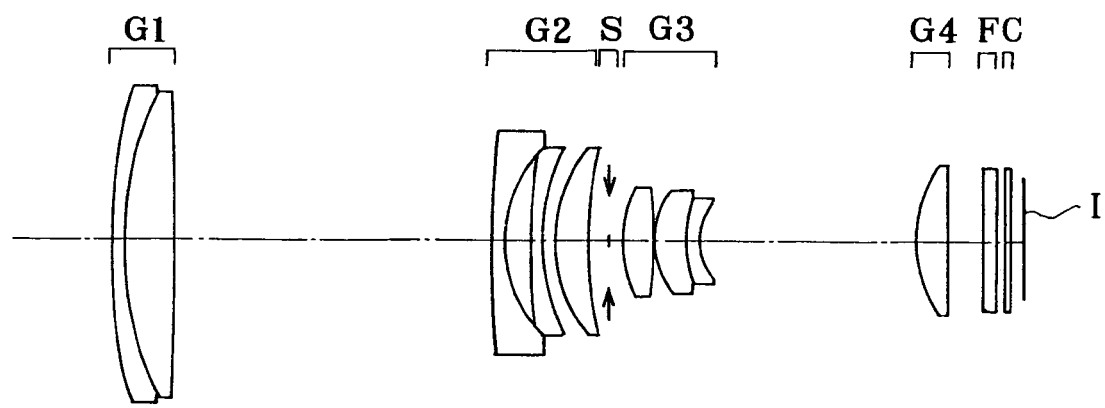

As shown in FIGS. 7A, 7B and 7C, Example 7 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system. The aperture stop S and the third lens group G3 move monotonously toward the object side in one-piece form, and the fourth lens group G4 moves toward the object side in a convex locus, and is positioned nearer to the object side at the telephoto end than at the wide-angle end.

The first lens group G1 is composed of, in order from its object side, a doublet consisting of a negative meniscus lens convex on its object side and a double-convex positive lens. The second lens group G2 is composed of, in order from its object side, two negative meniscus lenses each convex on its object side and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one positive meniscus lens convex on its object side.

Two aspheric surfaces are used at both surfaces of the double-convex positive lens in the third lens group G3.

Figure 8A:
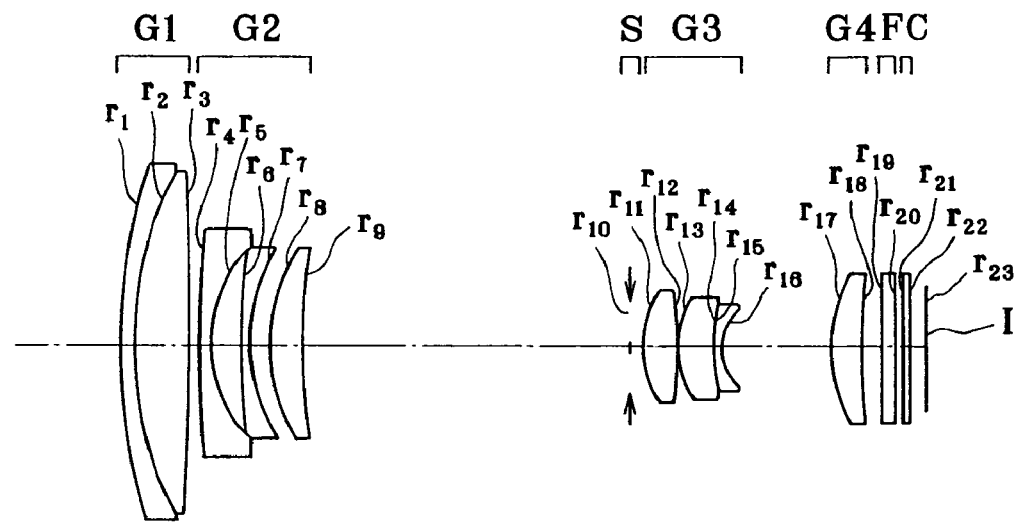
FIGS. 8A, 8B and 8C are views similar to FIGS. 1A, 1B and 1C for Example 8 of the zoom lens system according to the invention.
Figure 8B:
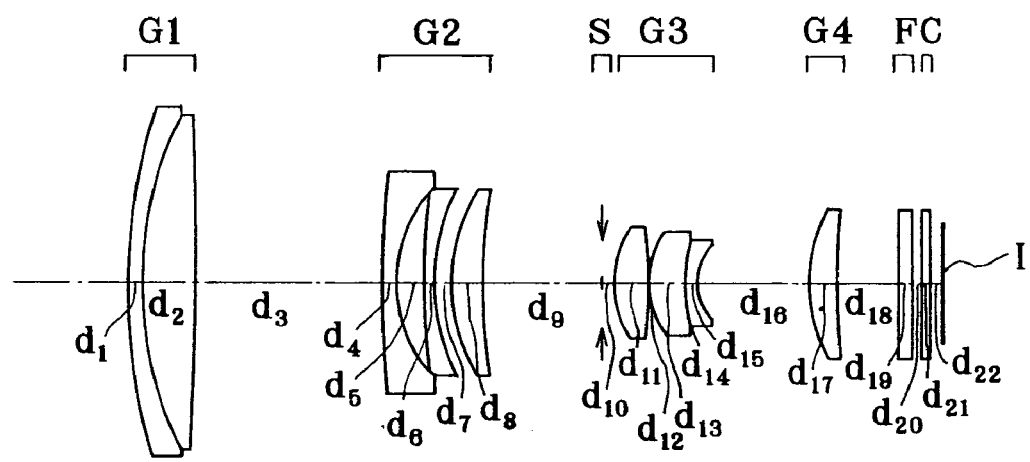
Figure 8C:
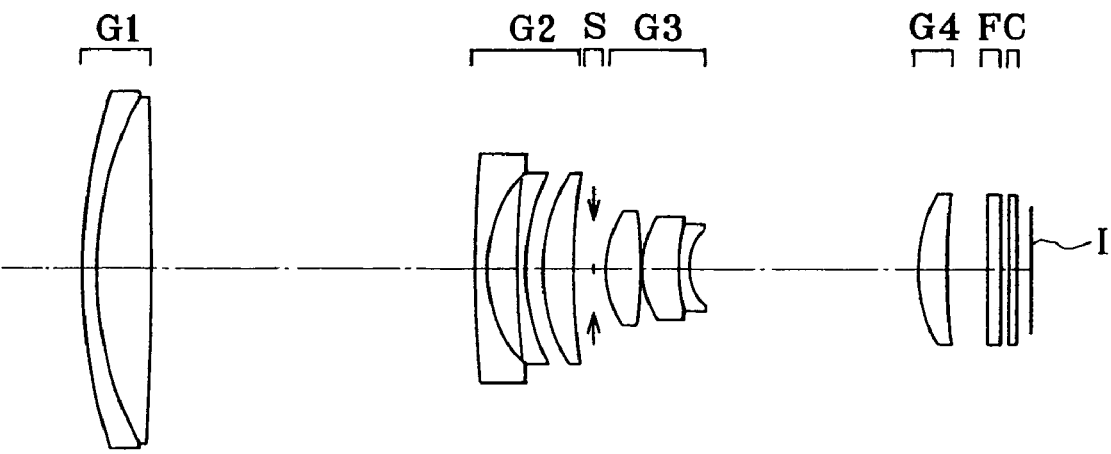

As shown in FIGS. 8A, 8B and 8C, Example 8 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system. The aperture stop S and the third lens group G3 move monotonously toward the object side in one-piece form, and the fourth lens group G4 moves toward the object side in a convex locus, and positioned nearer to the object side at the telephoto end than at the wide-angle end.

The first lens group G1 is composed of, in order from its object side, a doublet consisting of a negative meniscus lens convex on its object side and a double-convex positive lens. The second lens group G2 is composed of, in order from its object side, two negative meniscus lenses each convex on its object side and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one positive meniscus lens convex on its object side.

Two aspheric surfaces are used at both surfaces of the double-convex positive lens in the third lens group G3.

Figure 9A:
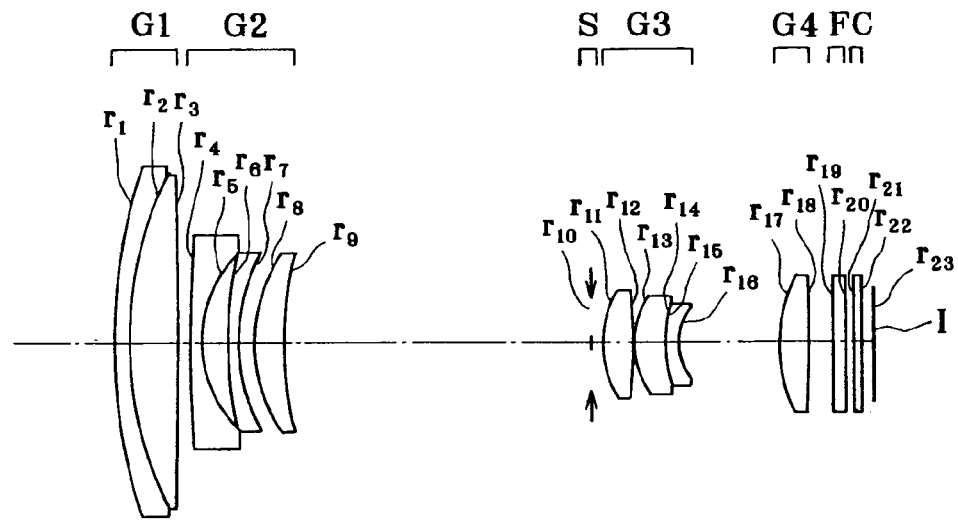
FIGS. 9A, 9B and 9C are views similar to FIGS. 1A, 1B and 1C for Example 9 of the zoom lens system according to the invention.
Figure 9B:
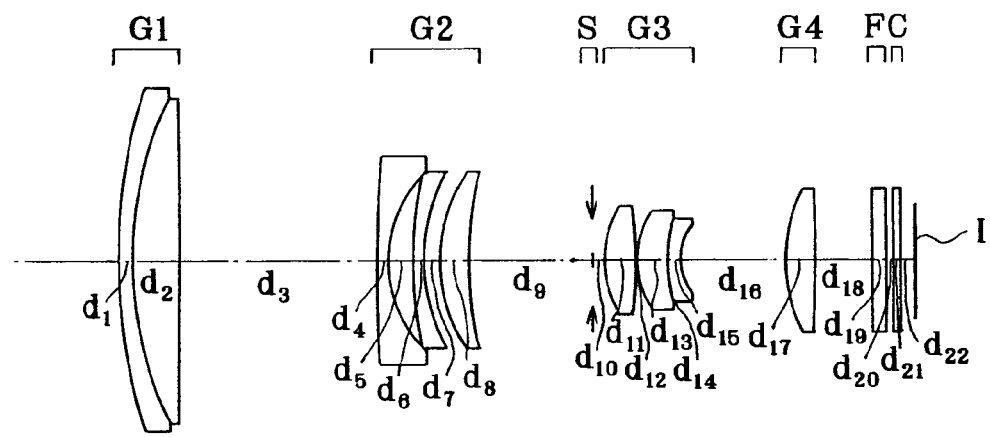
Figure 9C:
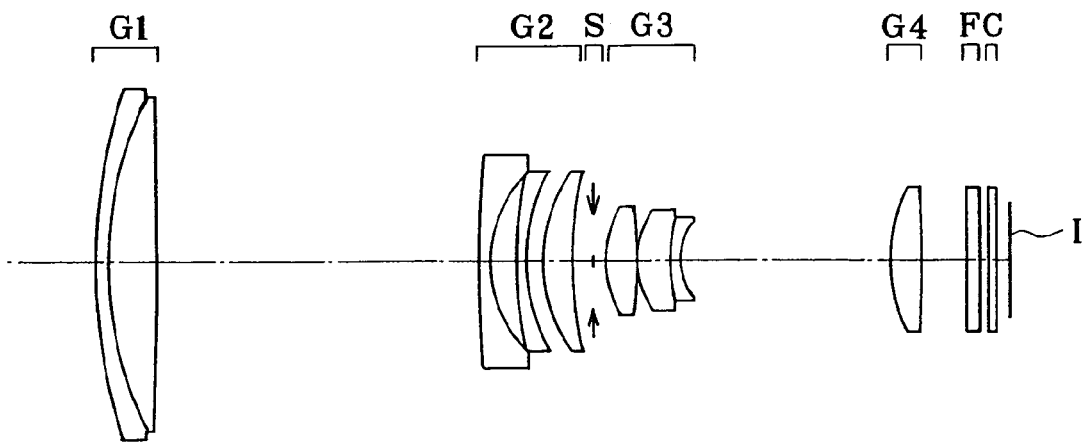
Figure 10A:
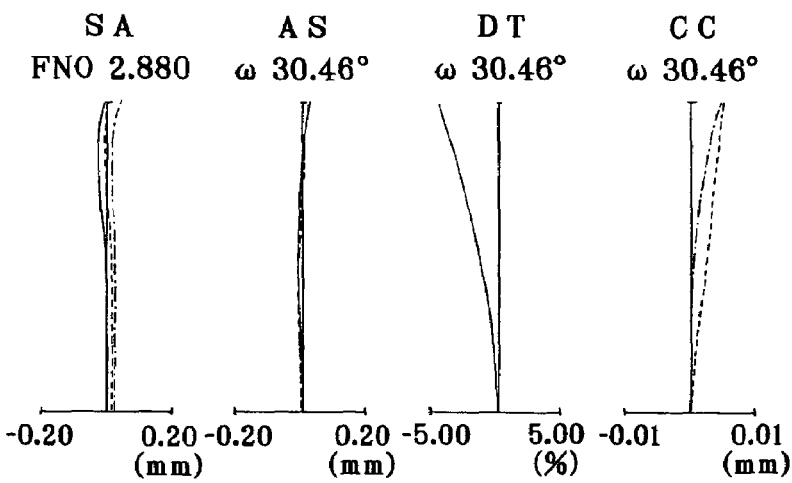
FIGS. 10A, 10B and 10C are aberration diagrams at the wide-angle end, intermediate state and telephoto end, respectively, of Example 1 upon focusing on an infinite object point.
Figure 10B:
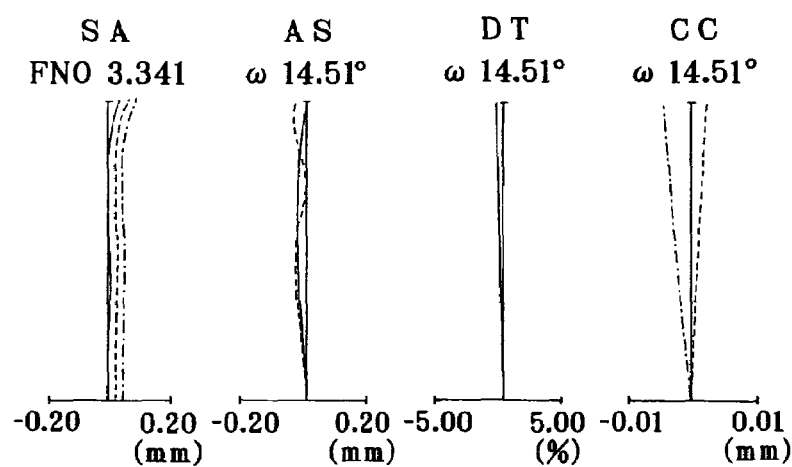
Figure 10C:
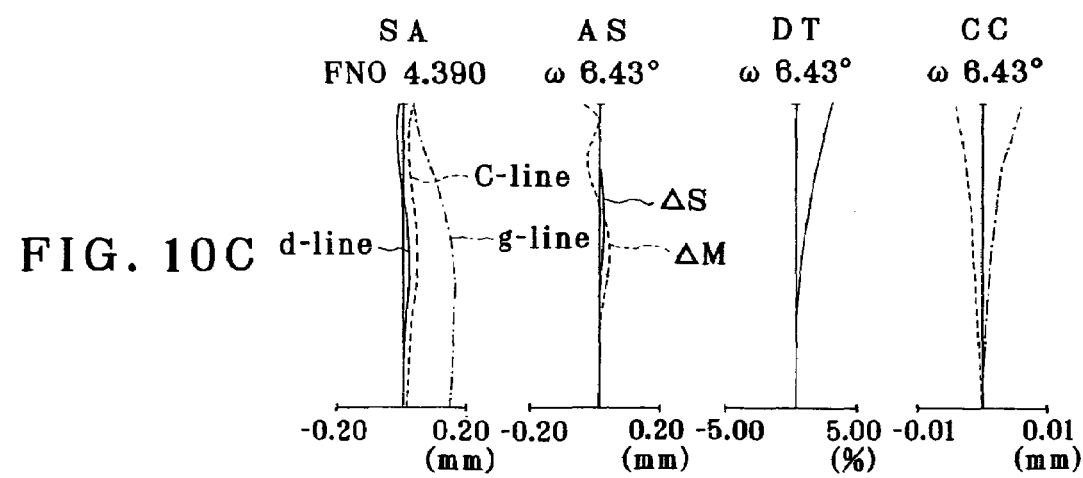
Figure 11A:
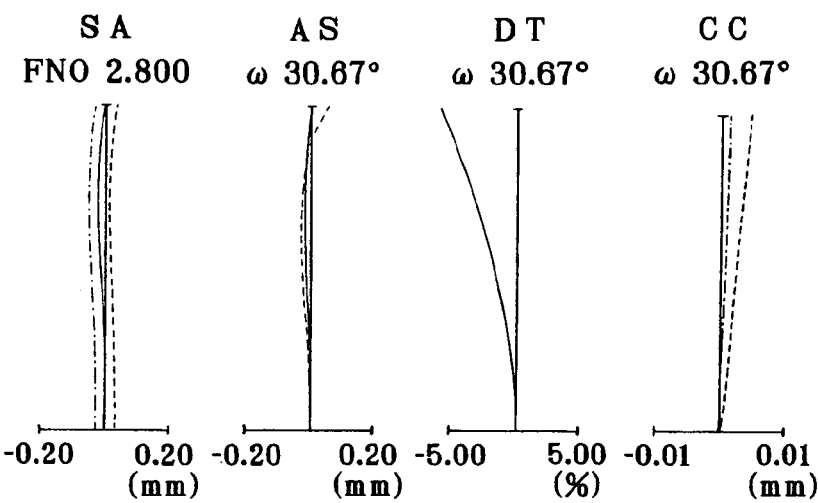
FIGS. 11A, 11B and 11C are aberration diagrams similar to FIGS. 10A, 10B and 1° C. for Example 2.
Figure 11B:
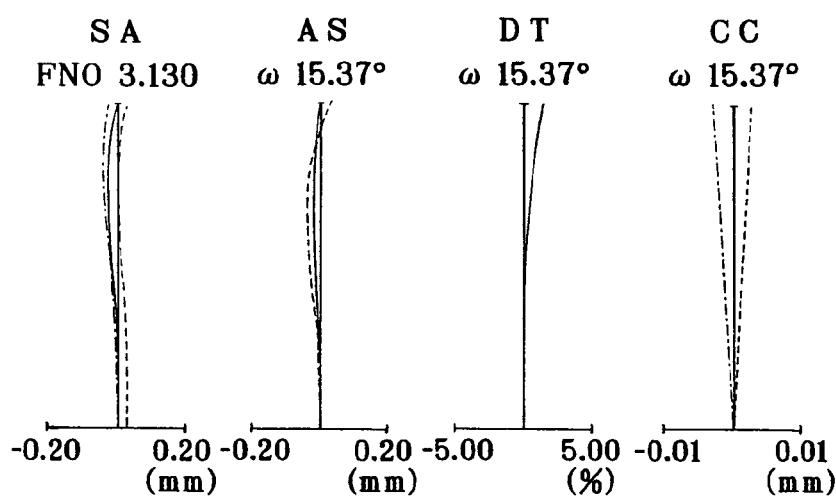
Figure 11C:
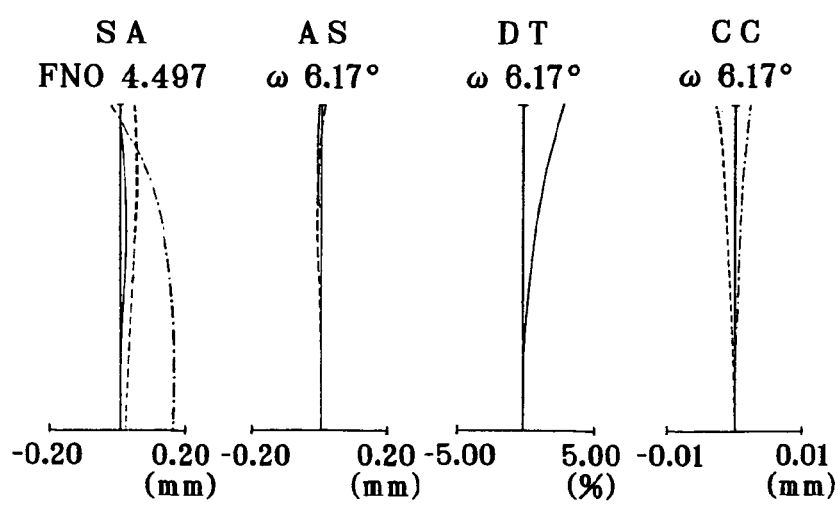
Figure 12A:
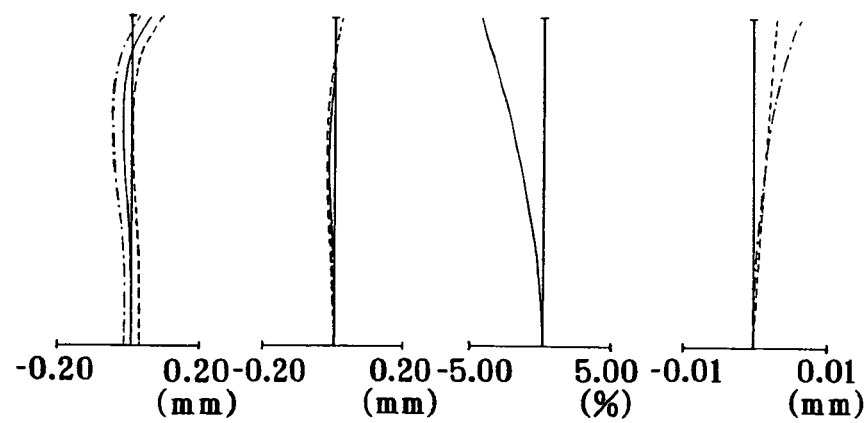
FIGS. 12A, 12B and 12C are aberration diagrams similar to FIGS. 10A, 10B and 1° C. for Example 3.
Figure 12B:
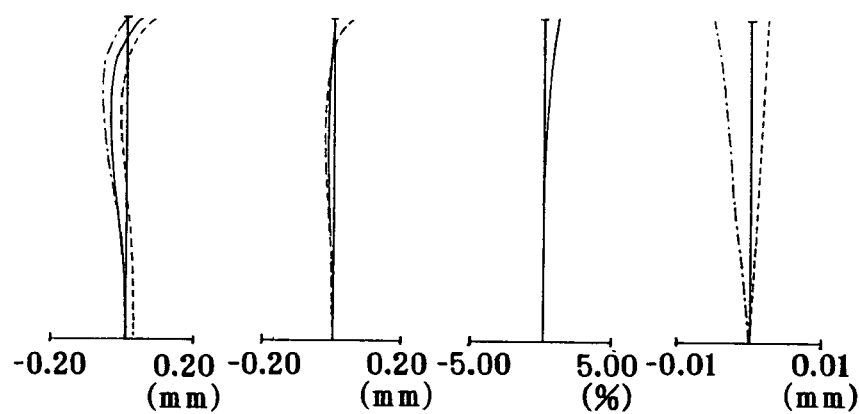
Figure 12C:
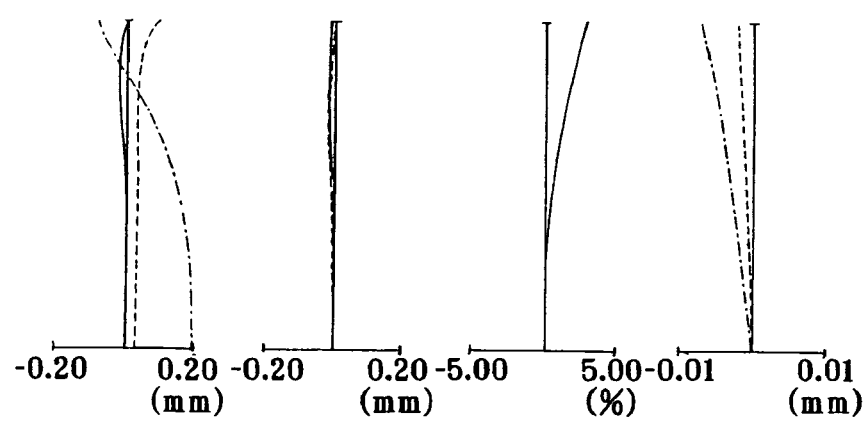
Figure 13A:
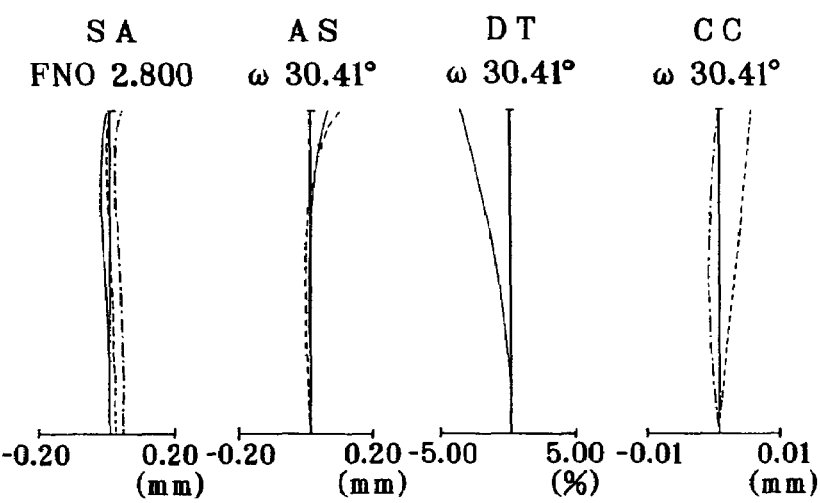
FIGS. 13A, 13B and 13C are aberration diagrams similar to FIGS. 10A, 10B and 1° C. for Example 4.
Figure 13B:
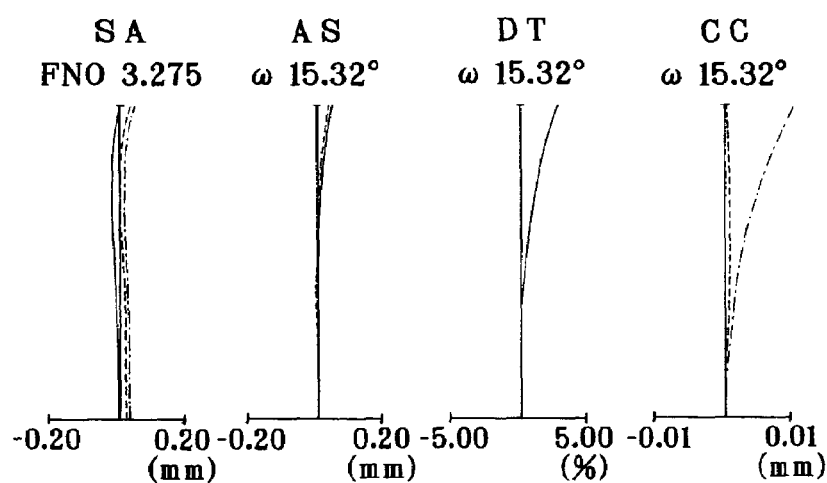
Figure 13C:
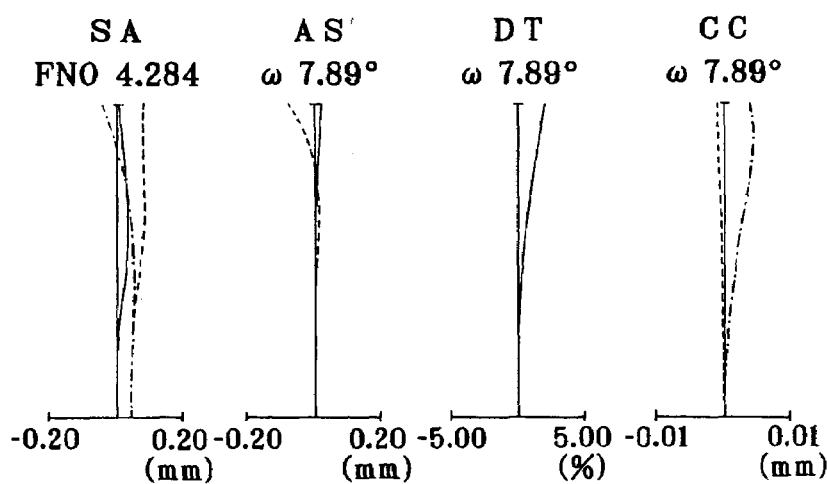
Figure 14A:
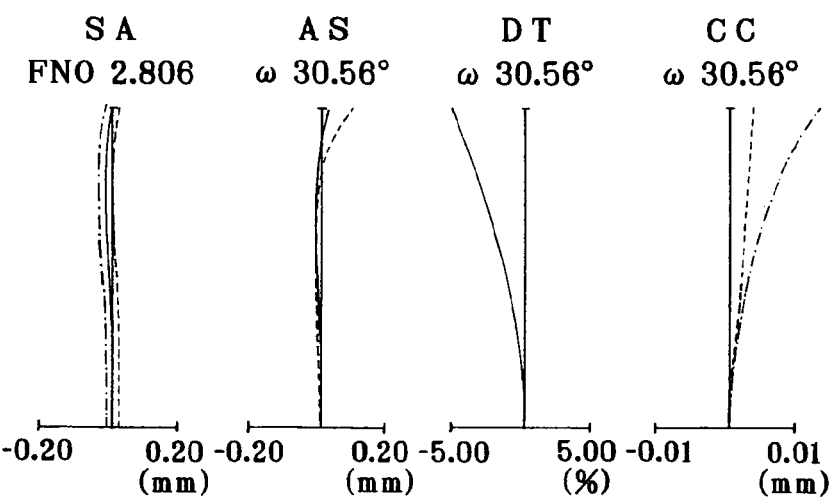
FIGS. 14A, 14B and 14C are aberration diagrams similar to FIGS. 10A, 10B and 1° C. for Example 5.
Figure 14B:
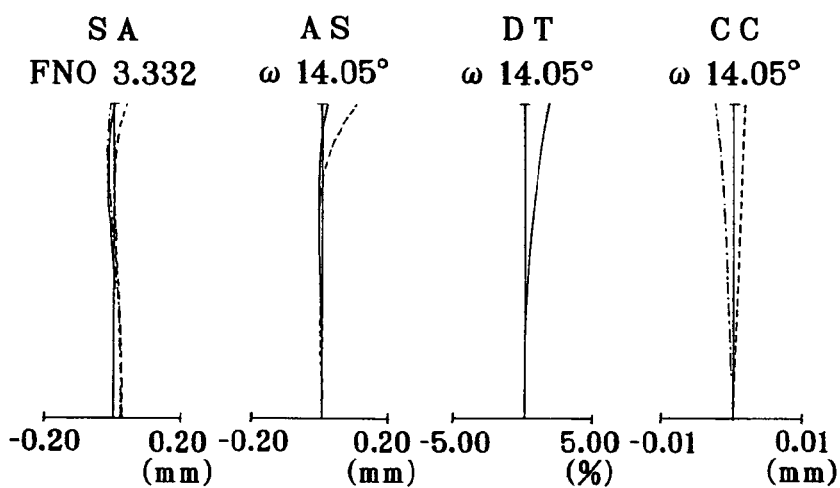
Figure 14C:
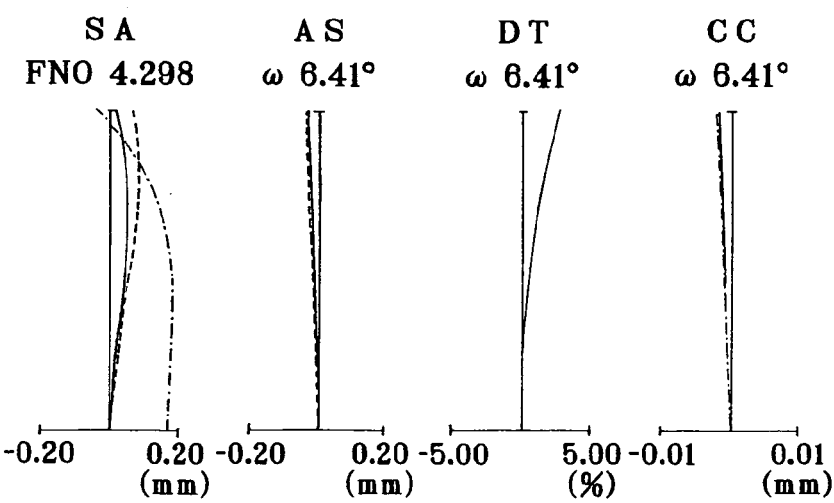
Figure 15A:
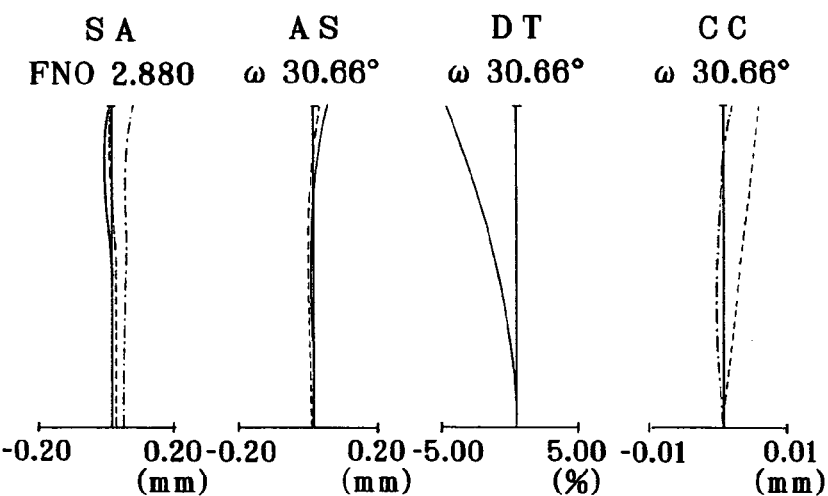
FIGS. 15A, 15B and 15C are aberration diagrams similar to FIGS. 10A, 10B and 1° C. for Example 6.
Figure 15B:
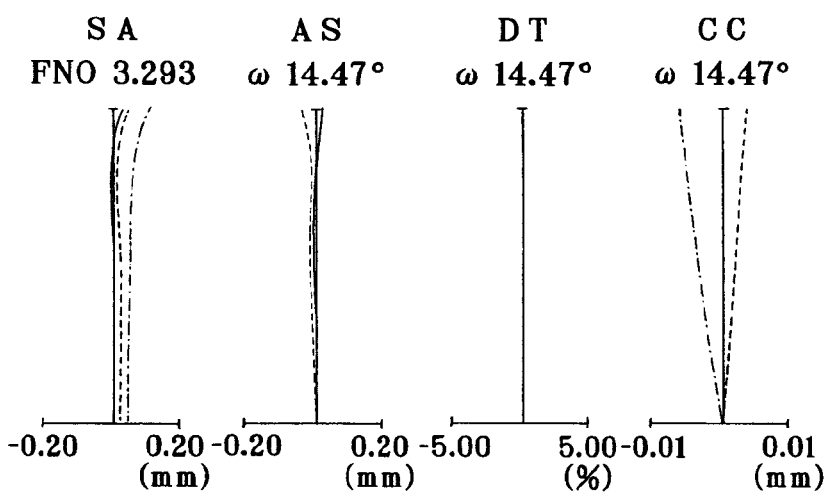
Figure 15C:
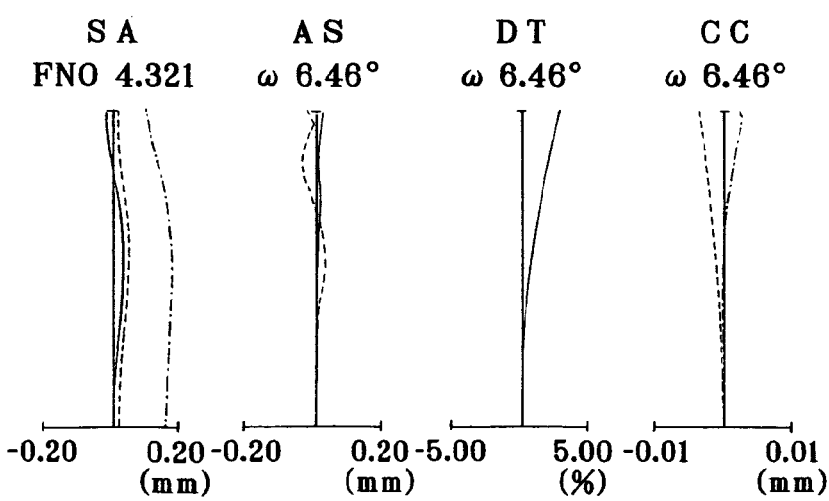
Figure 16A:
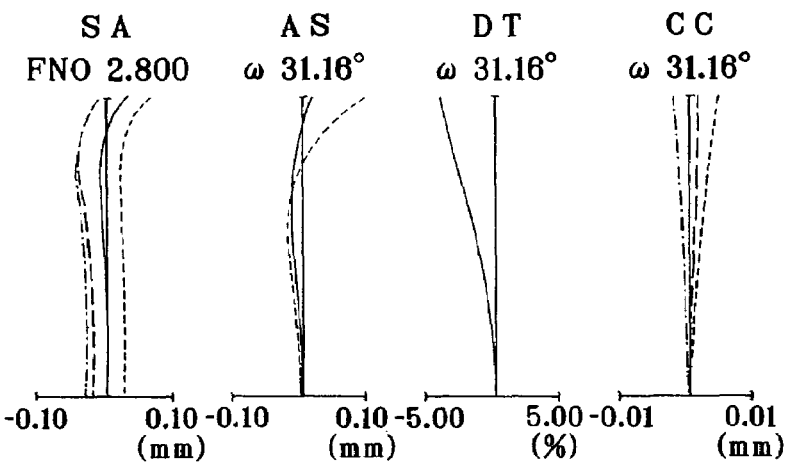
FIGS. 16A, 16B and 16C are aberration diagrams similar to FIGS. 10A, 10B and 1° C. for Example 7.
Figure 16B:
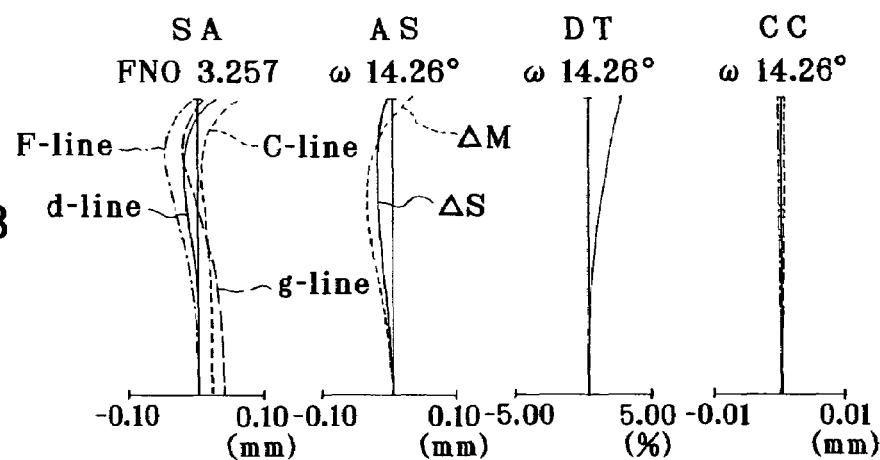
Figure 16C:
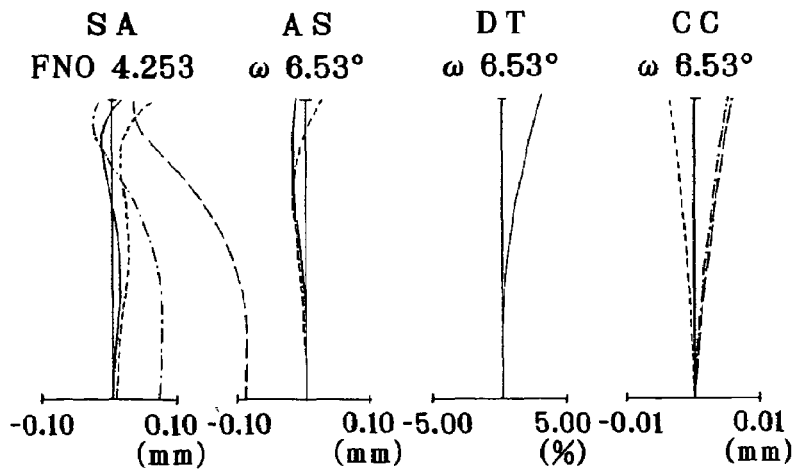
Figure 17A:
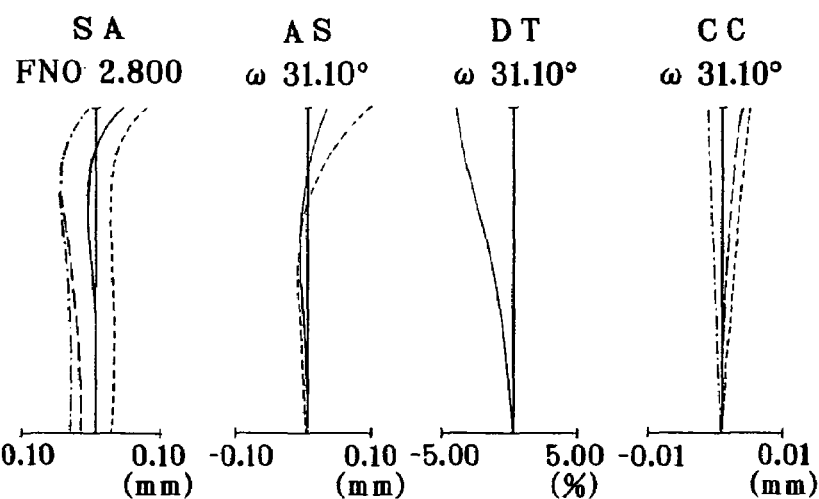
FIGS. 17A, 17B and 17C are aberration diagrams similar to FIGS. 10A, 10B and 10C for Example 8.
Figure 17B:
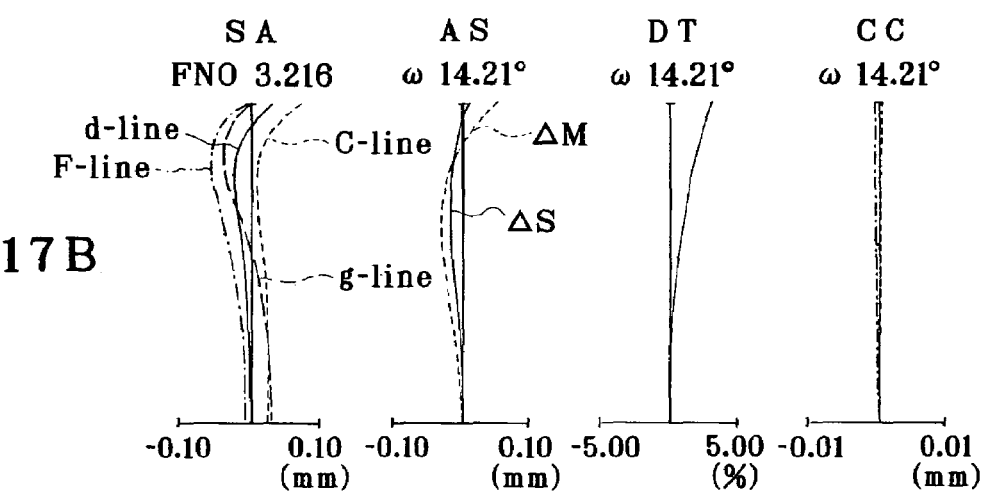
Figure 17C:
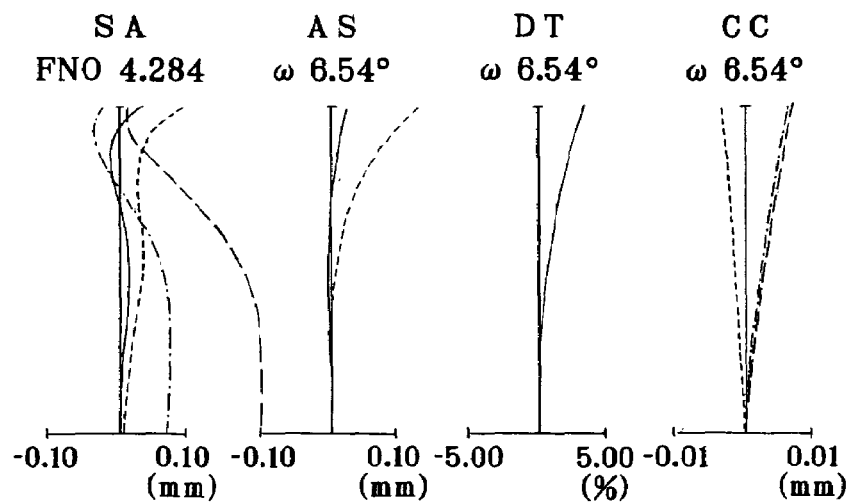
Figure 18A:
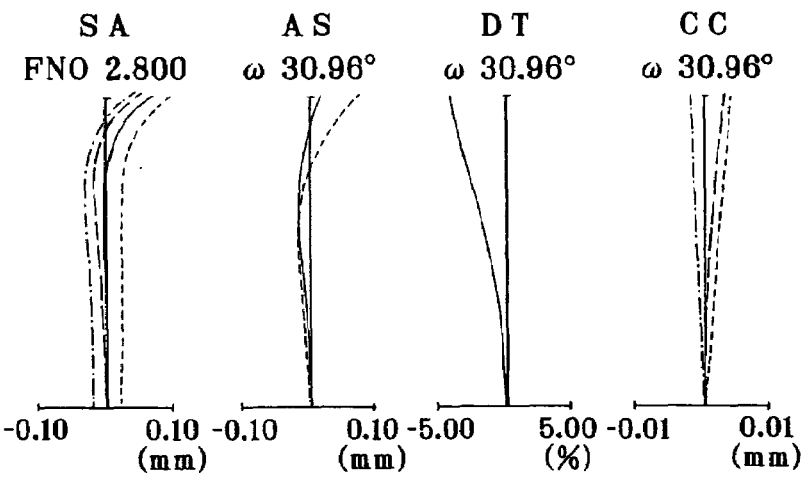
FIGS. 18A, 18B and 18C are aberration diagrams similar to FIGS. 10A, 10B and 10C for Example 9.
Figure 18B:
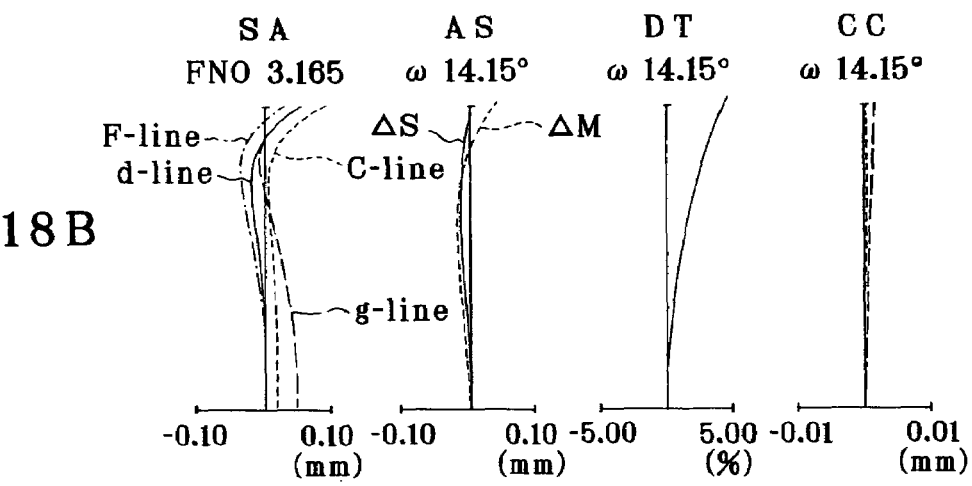
Figure 18C:
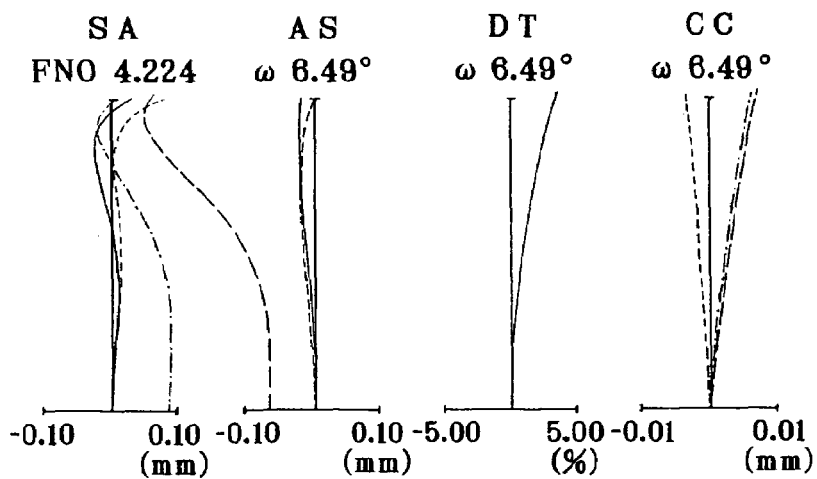

As shown in FIGS. 9A, 9B and 9C, Example 9 is directed to a zoom lens system composed of, in order from its object side, a first lens group G1 having positive refracting power, a second lens group G2 having negative refracting power, an aperture stop S, a third lens group G3 having positive refracting power and a fourth lens group G4 having positive refracting power. Upon zooming from the wide-angle end to the telephoto end of the zoom lens system, the first lens group G1 moves toward the object side, and the second lens group G2 moves toward the image side of the zoom lens system. The aperture stop S and the third lens group G3 move monotonously toward the object side in one-piece form, and the fourth lens group G4 moves toward the object side in a convex locus, and is positioned nearer to the object side at the telephoto end than at the wide-angle end.

The first lens group G1 is composed of, in order from its object side, a doublet consisting of a negative meniscus lens convex on its object side and a double-convex positive lens. The second lens group G2 is composed of, in order from its object side, two negative meniscus lenses each convex on its object side and a positive meniscus lens convex on its object side. The third lens group G3 is composed of, in order from its object side, a double-convex positive lens and a doublet consisting of a positive meniscus lens convex on its object side and a negative meniscus lens convex on its object side. The fourth lens group G4 is composed of one double-convex positive lens.

Two aspheric surfaces are used at both surfaces of the double-convex positive lens in the third lens group G3.

In what follows, data on each of the above examples are given. Symbols used hereinafter but not hereinbefore have the following meanings.

f: the focal length of the zoom lens system,
$F_{NO}$: F-number,
ω: a half angle of view,
WE: the wide-angle end,
ST: an intermediate state,
TE: the telephoto end,
$r_1, r_2, \ldots$: the radius of curvature of each lens surface,
$d_1, d_2, \ldots$: the space between adjacent lens surfaces,
$n_{d1}, n_{d2}, \ldots$: the d-line refractive index of each lens, and
$\nu_{d1}, \nu_{d2}, \ldots$: the Abbe constant of each lens.

Here let x represent an optical axis wherein the direction of propagation of light is positive and y represent a direction orthogonal to the optical axis. Then, aspheric shape is given by $$x = (y^2/r)/[1+\{1-(K+1)(y/r)^2\}^{1/2}] + A_4 y^4 + A_6 y^6 + A_8 y^8 + A_{10} y^{10} + A_{12} y^{12} + A_{14} y^{14}$$

where r is a paraxial radius of curvature, K is a conical coefficient, and $A_4$, $A_6$, $A_8$, $A_{10}$, $A_{12}$, and $A_{14}$ is the $4^{th}$, $8^{th}$, $10^{th}$, $12^{th}$, and $14^{th}$ aspheric coefficient, respectively.

EXAMPLE 1

| | | | |
|---|---|---|---|
| $r_1 = 26.052$ | $d_1 = 1.00$ | $n_{d1} = 1.84666$ | $\nu_{d1} = 23.78$ |
| $r_2 = 18.749$ | $d_2 = 3.20$ | $n_{d2} = 1.71300$ | $\nu_{d2} = 53.87$ |
| $r_3 = 129.413$ | $d_3 = $ (Variable) | | |
| $r_4 = 44.225$ | $d_4 = 0.90$ | $n_{d3} = 1.88300$ | $\nu_{d3} = 40.76$ |
| $r_5 = 8.187$ | $d_5 = 2.50$ | | |
| $r_6 = \infty$ | $d_6 = 0.85$ | $n_{d4} = 1.88300$ | $\nu_{d4} = 40.76$ |
| $r_7 = 15.273$ | $d_7 = 1.09$ | | |
| $r_8 = 13.756$ | $d_8 = 2.00$ | $n_{d5} = 1.92286$ | $\nu_{d5} = 20.88$ |
| $r_9 = 56.639$ | $d_9 = $ (Variable) | | |
| $r_{10} = \infty$ (Stop) | $d_{10} = 1.00$ | | |
| $r_{11} = 13.960$ (Aspheric) | $d_{11} = 2.00$ | $n_{d6} = 1.74330$ | $\nu_{d6} = 49.33$ |
| $r_{12} = -35.983$ (Aspheric) | $d_{12} = 0.50$ | | |
| $r_{13} = 6.486$ | $d_{13} = 2.25$ | $n_{d7} = 1.69680$ | $\nu_{d7} = 55.53$ |
| $r_{14} = 21.204$ | $d_{14} = 0.01$ | $n_{d8} = 1.56384$ | $\nu_{d8} = 60.67$ |
| $r_{15} = 21.204$ | $d_{15} = 0.80$ | $n_{d9} = 1.84666$ | $\nu_{d9} = 23.78$ |
| $r_{16} = 4.830$ | $d_{16} = $ (Variable) | | |
| $r_{17} = 11.548$ (Aspheric) | $d_{17} = 2.74$ | $n_{d10} = 1.52542$ | $\nu_{d10} = 55.78$ |
| $r_{18} = 218.908$ (Aspheric) | $d_{18} = $ (Variable) | | |
| $r_{19} = \infty$ | $d_{19} = 0.95$ | $n_{d11} = 1.54771$ | $\nu_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $\nu_{d12} = 64.14$ |
| $r_{22} = \infty$ | $d_{22} = 1.00$ | | |
| $r_{23} = \infty$ | | | |

Aspherical Coefficients

11th surface $K = -0.392$
$A_4 = -5.42519 \times 10^{-5}$
$A_6 = -7.99687 \times 10^{-6}$ -continued $A_8 = 6.60675 \times 10^{-7}$
$A_{10} = -1.95317 \times 10^{-8}$ 12th surface $K = 0.000$
$A_4 = 4.18583 \times 10^{-6}$
$A_6 = -9.94224 \times 10^{-6}$
$A_8 = 8.61195 \times 10^{-7}$
$A_{10} = -2.49912 \times 10^{-8}$ 17th surface $K = 0.000$
$A_4 = -2.11365 \times 10^{-4}$
$A_6 = -2.70713 \times 10^{-6}$
$A_8 = 3.48360 \times 10^{-7}$
$A_{10} = -1.13679 \times 10^{-8}$
$A_{12} = -1.43708 \times 10^{-10}$
$A_{14} = 6.12273 \times 10^{-12}$ 18th surface $K = 0.000$
$A_4 = -2.44874 \times 10^{-4}$
$A_6 = 6.46769 \times 10^{-6}$
$A_8 = -2.13764 \times 10^{-7}$
$A_{10} = -7.27999 \times 10^{-11}$
$A_{12} = 3.72890 \times 10^{-11}$
$A_{14} = -6.98251 \times 10^{-13}$

ズームデータ(∞)

|  | WE | ST | TE |
|---|---|---|---|
| f (mm) | 8.026 | 17.475 | 38.830 |
| $F_{NO}$ | 2.88 | 3.34 | 4.39 |
| ω (°) | 30.46 | 14.51 | 6.43 |
| $d_3$ | 0.80 | 10.39 | 19.17 |
| $d_9$ | 18.16 | 6.64 | 1.67 |
| $d_{16}$ | 8.63 | 10.11 | 19.99 |
| $d_{18}$ | 2.68 | 5.70 | 3.48 |

EXAMPLE 2

| $r_1 = 29.488$ | $d_1 = 1.00$ | $n_{d1} = 1.84666$ | $v_{d1} = 23.78$ |
|---|---|---|---|
| $r_2 = 19.156$ | $d_2 = 3.60$ | $n_{d2} = 1.67790$ | $v_{d2} = 50.72$ |
| $r_3 = -390894.267$ | $d_3$ = (Variable) | | |
| $r_4 = 177.797$ | $d_4 = 0.85$ | $n_{d3} = 1.88300$ | $v_{d3} = 40.76$ |
| $r_5 = 9.237$ | $d_5 = 2.00$ | | |
| $r_6 = 2214.408$ | $d_6 = 0.80$ | $n_{d4} = 1.72916$ | $v_{d4} = 54.68$ |
| $r_7 = 14.895$ | $d_7 = 1.20$ | | |
| $r_8 = 13.788$ | $d_8 = 2.20$ | $n_{d5} = 1.84666$ | $v_{d5} = 23.78$ |
| $r_9 = 60.326$ | $d_9$ = (Variable) | | |
| $r_{10} = \infty$ (Stop) | $d_{10} = 1.00$ | | |
| $r_{11} = 10.975$ (Aspheric) | $d_{11} = 2.30$ | $n_{d6} = 1.69350$ | $v_{d6} = 53.20$ |
| $r_{12} = -33.341$ (Aspheric) | $d_{12} = 0.10$ | | |
| $r_{13} = 5.712$ | $d_{13} = 2.50$ | $n_{d7} = 1.49700$ | $v_{d7} = 81.54$ |
| $r_{14} = 10.692$ | $d_{14} = 0.01$ | $n_{d8} = 1.56384$ | $v_{d8} = 60.67$ |
| $r_{15} = 10.692$ | $d_{15} = 0.80$ | $n_{d9} = 1.84666$ | $v_{d9} = 23.78$ |
| $r_{16} = 4.300$ | $d_{16}$ = (Variable) | | |
| $r_{17} = 11.921$ | $d_{17} = 2.20$ | $n_{d10} = 1.48749$ | $v_{d10} = 70.23$ |
| $r_{18} = -10407.303$ | $d_{18}$ = (Variable) | | |
| $r_{19} = \infty$ | $d_{19} = 0.95$ | $n_{d11} = 1.54771$ | $v_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $v_{d12} = 64.14$ |
| $r_{22} = \infty$ | $d_{22} = 0.60$ | | |
| $r_{23} = \infty$ | | | |

Aspherical Coefficients

11th surface $K = -1.149$
$A_4 = -1.22308 \times 10^{-8}$
$A_6 = 8.10316 \times 10^{-9}$
$A_8 = -5.55681 \times 10^{-9}$ -continued 12th surface K = −10.109
$A_4 = 3.71688 \times 10^{-11}$
$A_6 = 2.51887 \times 10^{-7}$

ズームデータ(∞)

|  | WE | ST | TE |
|---|---|---|---|
| f (mm) | 7.843 | 15.841 | 39.635 |
| $F_{NO}$ | 2.80 | 3.13 | 4.50 |
| ω (°) | 30.67 | 15.37 | 6.17 |
| $d_3$ | 0.80 | 9.57 | 18.65 |
| $d_9$ | 20.01 | 8.14 | 1.50 |
| $d_{16}$ | 8.69 | 8.91 | 20.02 |
| $d_{18}$ | 1.98 | 5.16 | 2.67 |

EXAMPLE 3

| | | | |
|---|---|---|---|
| $r_1 = 26.986$ | $d_1 = 1.00$ | $n_{d1} = 1.84666$ | $v_{d1} = 23.78$ |
| $r_2 = 16.515$ | $d_2 = 3.80$ | $n_{d2} = 1.67003$ | $v_{d2} = 47.23$ |
| $r_3 = -244257.033$ | $d_3$ = (Variable) | | |
| $r_4 = 112.654$ | $d_4 = 0.85$ | $n_{d3} = 1.88300$ | $v_{d3} = 40.76$ |
| $r_5 = 9.347$ | $d_5 = 2.00$ | | |
| $r_6 = 18401.111$ | $d_6 = 0.80$ | $n_{d4} = 1.72916$ | $v_{d4} = 54.68$ |
| $r_7 = 11.494$ | $d_7 = 1.20$ | | |
| $r_8 = 12.358$ | $d_8 = 2.20$ | $n_{d5} = 1.84666$ | $v_{d5} = 23.78$ |
| $r_9 = 53.415$ | $d_9$ = (Variable) | | |
| $r_{10} = \infty$ (Stop) | $d_{10} = 1.00$ | | |
| $r_{11} = 9.677$ (Aspheric) | $d_{11} = 2.30$ | $n_{d6} = 1.58313$ | $v_{d6} = 59.46$ |
| $r_{12} = -25.547$ (Aspheric) | $d_{12} = 0.10$ | | |
| $r_{13} = 5.680$ | $d_{13} = 2.30$ | $n_{d7} = 1.49700$ | $v_{d7} = 81.54$ |
| $r_{14} = 8.984$ | $d_{14} = 0.01$ | $n_{d8} = 1.56384$ | $v_{d8} = 60.67$ |
| $r_{15} = 8.984$ | $d_{15} = 0.80$ | $n_{d9} = 1.84666$ | $v_{d9} = 23.78$ |
| $r_{16} = 4.272$ | $d_{16}$ = (Variable) | | |
| $r_{17} = 12.940$ | $d_{17} = 2.20$ | $n_{d10} = 1.49700$ | $v_{d10} = 81.54$ |
| $r_{18} = -23190.917$ | $d_{18}$ = (Variable) | | |
| $r_{19} = \infty$ | $d_{19} = 0.95$ | $n_{d11} = 1.54771$ | $v_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $v_{d12} = 64.14$ |
| $r_{22} = \infty$ | $d_{22} = 0.59$ | | |
| $r_{23} = \infty$ | | | |

Aspherical Coefficients

11th surface

K = −1.239
$A_4 = -6.46005 \times 10^{-9}$
$A_6 = 1.85826 \times 10^{-8}$
$A_8 = -2.59108 \times 10^{-8}$ 12th surface K = −4.428
$A_4 = 2.79009 \times 10^{-10}$
$A_6 = 3.14257 \times 10^{-7}$

ズームデータ(∞)

|  | WE | ST | TE |
|---|---|---|---|
| f (mm) | 7.853 | 15.765 | 45.985 |
| $F_{NO}$ | 2.80 | 3.18 | 4.84 |
| ω (°) | 30.47 | 15.46 | 5.32 |
| $d_3$ | 0.80 | 8.80 | 19.39 |
| $d_9$ | 20.04 | 8.14 | 1.50 |
| $d_{16}$ | 9.33 | 8.60 | 22.68 |
| $d_{18}$ | 2.21 | 6.37 | 2.35 |

EXAMPLE 4

| | | | |
|---|---|---|---|
| $r_1 = 25.729$ | $d_1 = 3.30$ | $n_{d1} = 1.48749$ | $\nu_{d1} = 70.23$ |
| $r_2 = -195211.986$ | $d_2 = $ (Variable) | | |
| $r_3 = 62.315$ | $d_3 = 0.85$ | $n_{d2} = 1.88300$ | $\nu_{d2} = 40.76$ |
| $r_4 = 8.171$ | $d_4 = 2.00$ | | |
| $r_5 = 11064.958$ | $d_5 = 0.80$ | $n_{d3} = 1.72916$ | $\nu_{d3} = 54.68$ |
| $r_6 = 16.294$ | $d_6 = 1.15$ | | |
| $r_7 = 13.261$ | $d_7 = 2.20$ | $n_{d4} = 1.84666$ | $\nu_{d4} = 23.78$ |
| $r_8 = 54.781$ | $d_8 = $ (Variable) | | |
| $r_9 = \infty$ (Stop) | $d_9 = 1.00$ | | |
| $r_{10} = 11.449$ (Aspheric) | $d_{10} = 2.40$ | $n_{d5} = 1.69350$ | $\nu_{d5} = 53.20$ |
| $r_{11} = -24.146$ (Aspheric) | $d_{11} = 0.10$ | | |
| $r_{12} = 5.500$ | $d_{12} = 2.60$ | $n_{d6} = 1.48749$ | $\nu_{d6} = 70.23$ |
| $r_{13} = 18.893$ | $d_{13} = 0.01$ | $n_{d7} = 1.56384$ | $\nu_{d7} = 60.67$ |
| $r_{14} = 18.893$ | $d_{14} = 0.80$ | $n_{d8} = 1.84666$ | $\nu_{d8} = 23.78$ |
| $r_{15} = 4.313$ | $d_{15} = $ (Variable) | | |
| $r_{16} = 19.027$ (Aspheric) | $d_{16} = 2.20$ | $n_{d9} = 1.84666$ | $\nu_{d9} = 23.78$ |
| $r_{17} = -12117.666$ | $d_{17} = $ (Variable) | | |
| $r_{18} = \infty$ | $d_{18} = 0.95$ | $n_{d10} = 1.54771$ | $\nu_{d10} = 62.84$ |
| $r_{19} = \infty$ | $d_{19} = 0.60$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.59$ | | |
| $r_{22} = \infty$ | | | |

Aspherical Coefficients

10th surface $K = -1.005$
$A_4 = 3.59202 \times 10^{-9}$
$A_6 = 1.69640 \times 10^{-8}$
$A_8 = -1.84829 \times 10^{-8}$ 11th surface $K = -8.581$
$A_4 = -2.03082 \times 10^{-11}$
$A_6 = 4.48326 \times 10^{-10}$ 16th surface $K = 0.002$
$A_4 = -3.12266 \times 10^{-10}$
$A_6 = 1.67936 \times 10^{-8}$
$A_8 = 9.76314 \times 10^{-9}$ ズームデータ($\infty$)

| | WE | ST | TE |
|---|---|---|---|
| f (mm) | 7.823 | 15.672 | 31.181 |
| $F_{NO}$ | 2.80 | 3.28 | 4.28 |
| $\omega$ (°) | 30.41 | 15.32 | 7.89 |
| $d_2$ | 0.80 | 10.32 | 16.18 |
| $d_8$ | 19.10 | 8.70 | 1.81 |
| $d_{15}$ | 8.45 | 10.63 | 17.69 |
| $d_{17}$ | 1.94 | 3.58 | 4.37 |

EXAMPLE 5

| | | | |
|---|---|---|---|
| $r_1 = 33.302$ | $d_1 = 1.00$ | $n_{d1} = 1.84666$ | $\nu_{d1} = 23.78$ |
| $r_2 = 19.902$ | $d_2 = 3.60$ | $n_{d2} = 1.71700$ | $\nu_{d2} = 47.92$ |
| $r_3 = -10505.082$ | $d_3 = $ (Variable) | | |
| $r_4 = 197.422$ | $d_4 = 0.85$ | $n_{d3} = 1.81600$ | $\nu_{d3} = 46.62$ |
| $r_5 = 8.612$ | $d_5 = 2.00$ | | |
| $r_6 = 65.254$ | $d_6 = 0.80$ | $n_{d4} = 1.90366$ | $\nu_{d4} = 31.31$ |
| $r_7 = 13.669$ | $d_7 = 0.80$ | | |
| $r_8 = 12.087$ | $d_8 = 2.20$ | $n_{d5} = 1.92286$ | $\nu_{d5} = 20.88$ |
| $r_9 = 43.061$ | $d_9 = $ (Variable) | | |
| $r_{10} = \infty$ (Stop) | $d_{10} = 1.00$ | | |
| $r_{11} = 10.627$ (Aspheric) | $d_{11} = 2.30$ | $n_{d6} = 1.69350$ | $\nu_{d6} = 53.20$ |
| $r_{12} = -33.162$ (Aspheric) | $d_{12} = 0.10$ | | |
| $r_{13} = 5.800$ | $d_{13} = 2.50$ | $n_{d7} = 1.49700$ | $\nu_{d7} = 81.54$ |
| $r_{14} = 11.640$ | $d_{14} = 0.01$ | $n_{d8} = 1.56384$ | $\nu_{d8} = 60.67$ |

-continued

| | | | |
|---|---|---|---|
| $r_{15} = 11.640$ | $d_{15} = 0.80$ | $n_{d9} = 1.84666$ | $\nu_{d9} = 23.78$ |
| $r_{16} = 4.350$ | $d_{16} = $ (Variable) | | |
| $r_{17} = 12.332$ (Aspheric) | $d_{17} = 2.30$ | $n_{d10} = 1.52542$ | $\nu_{d10} = 55.78$ |
| $r_{18} = -260808.000$ | $d_{18} = $ (Variable) | | |
| $r_{19} = \infty$ | $d_{19} = 0.95$ | $n_{d11} = 1.54771$ | $\nu_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $\nu_{d12} = 64.14$ |
| $r_{22} = \infty$ | $d_{22} = 1.00$ | | |
| $r_{23} = \infty$ | | | |

Aspherical Coefficients

11th surface $K = -0.806$
$A_4 = -1.99973 \times 10^{-9}$
$A_6 = 1.19364 \times 10^{-8}$
$A_8 = -3.01523 \times 10^{-8}$ 12th surface $K = -22.194$
$A_4 = -1.02289 \times 10^{-11}$
$A_6 = 1.12572 \times 10^{-8}$
$A_8 = -1.88817 \times 10^{-9}$ 17th surface $K = 0.000$
$A_4 = -4.79706 \times 10^{-13}$
$A_6 = 8.43506 \times 10^{-14}$
$A_8 = -2.26626 \times 10^{-12}$
$A_{10} = 1.27028 \times 10^{-10}$ ズームデータ($\infty$)

| | WE | ST | TE |
|---|---|---|---|
| f (mm) | 7.964 | 17.453 | 38.463 |
| $F_{NO}$ | 2.81 | 3.33 | 4.30 |
| $\omega$ (°) | 30.56 | 14.05 | 6.41 |
| $d_3$ | 0.80 | 11.18 | 20.49 |
| $d_9$ | 19.10 | 7.68 | 1.80 |
| $d_{16}$ | 7.64 | 9.77 | 17.57 |
| $d_{18}$ | 2.18 | 4.37 | 2.83 |

EXAMPLE 6

| | | | |
|---|---|---|---|
| $r_1 = 26.272$ | $d_1 = 1.00$ | $n_{d1} = 1.84666$ | $\nu_{d1} = 23.78$ |
| $r_2 = 18.575$ | $d_2 = 3.40$ | $n_{d2} = 1.74100$ | $\nu_{d2} = 52.64$ |
| $r_3 = 130.489$ | $d_3 = $ (Variable) | | |
| $r_4 = 57.666$ | $d_4 = 0.90$ | $n_{d3} = 1.88300$ | $\nu_{d3} = 40.76$ |
| $r_5 = 8.282$ | $d_5 = 2.40$ | | |
| $r_6 = \infty$ | $d_6 = 0.85$ | $n_{d4} = 1.88300$ | $\nu_{d4} = 40.76$ |
| $r_7 = 15.434$ | $d_7 = 0.99$ | | |
| $r_8 = 13.647$ | $d_8 = 2.30$ | $n_{d5} = 1.92286$ | $\nu_{d5} = 20.88$ |
| $r_9 = 60.518$ | $d_9 = $ (Variable) | | |
| $r_{10} = \infty$ (Stop) | $d_{10} = 1.00$ | | |
| $r_{11} = 14.164$ (Aspheric) | $d_{11} = 2.00$ | $n_{d6} = 1.74330$ | $\nu_{d6} = 49.33$ |
| $r_{12} = -33.166$ (Aspheric) | $d_{12} = 0.20$ | | |
| $r_{13} = 5.685$ | $d_{13} = 2.20$ | $n_{d7} = 1.58913$ | $\nu_{d7} = 61.14$ |
| $r_{14} = 16.732$ | $d_{14} = 0.01$ | $n_{d8} = 1.56384$ | $\nu_{d8} = 60.67$ |
| $r_{15} = 16.732$ | $d_{15} = 0.80$ | $n_{d9} = 1.84666$ | $\nu_{d9} = 23.78$ |
| $r_{16} = 4.631$ | $d_{16} = $ (Variable) | | |
| $r_{17} = 15.194$ | $d_{17} = 2.00$ | $n_{d10} = 1.74330$ | $\nu_{d10} = 49.33$ |
| $r_{18} = 149.038$ (Aspheric) | $d_{18} = $ (Variable) | | |
| $r_{19} = \infty$ | $d_{19} = 0.95$ | $n_{d11} = 1.54771$ | $\nu_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $\nu_{d12} = 64.14$ |
| $r_{22} = \infty$ | $d_{22} = 1.00$ | | |
| $r_{23} = \infty$ | | | |

Aspherical Coefficients

11th surface $K = 1.826$

-continued $A_4 = -1.43848 \times 10^{-4}$
$A_6 = 3.29825 \times 10^{-7}$
$A_8 = 1.52442 \times 10^{-7}$
12th surface $K = 0.000$
$A_4 = 3.01488 \times 10^{-5}$
$A_6 = 8.15030 \times 10^{-7}$
$A_8 = 2.16546 \times 10^{-7}$
18th surface $K = 0.000$
$A_4 = 3.59845 \times 10^{-5}$
$A_6 = -1.74722 \times 10^{-5}$
$A_8 = 7.23073 \times 10^{-7}$
$A_{10} = -1.56839 \times 10^{-8}$
ズームデータ($\infty$)

|  | WE | ST | TE |
|---|---|---|---|
| f (mm) | 8.048 | 17.491 | 38.757 |
| $F_{NO}$ | 2.88 | 3.29 | 4.32 |
| ω (°) | 30.66 | 14.47 | 6.46 |
| $d_3$ | 0.80 | 10.10 | 18.34 |
| $d_9$ | 18.15 | 6.59 | 1.71 |
| $d_{16}$ | 8.62 | 9.60 | 19.76 |
| $d_{18}$ | 3.58 | 6.73 | 4.40 |

EXAMPLE 7

| | | | |
|---|---|---|---|
| $r_1 = 45.547$ | $d_1 = 1.00$ | $n_{d1} = 1.84666$ | $v_{d1} = 23.78$ |
| $r_2 = 28.125$ | $d_2 = 3.74$ | $n_{d2} = 1.74100$ | $v_{d2} = 52.64$ |
| $r_3 = -515.323$ | $d_3$ = (Variable) | | |
| $r_4 = 113.058$ | $d_4 = 0.85$ | $n_{d3} = 1.88300$ | $v_{d3} = 40.76$ |
| $r_5 = 9.726$ | $d_5 = 2.10$ | | |
| $r_6 = 49.992$ | $d_6 = 0.80$ | $n_{d4} = 1.72916$ | $v_{d4} = 54.68$ |
| $r_7 = 15.477$ | $d_7 = 1.20$ | | |
| $r_8 = 12.924$ | $d_8 = 2.20$ | $n_{d5} = 1.84666$ | $v_{d5} = 23.78$ |
| $r_9 = 31.975$ | $d_9$ = (Variable) | | |
| $r_{10} = \infty$ (Stop) | $d_{10} = 1.00$ | | |
| $r_{11} = 8.720$ (Aspheric) | $d_{11} = 2.30$ | $n_{d6} = 1.69350$ | $v_{d6} = 53.20$ |
| $r_{12} = -50.924$ (Aspheric) | $d_{12} = 0.10$ | | |
| $r_{13} = 6.499$ | $d_{13} = 2.50$ | $n_{d7} = 1.49700$ | $v_{d7} = 81.54$ |
| $r_{14} = 12.219$ | $d_{14} = 0.01$ | $n_{d8} = 1.56384$ | $v_{d8} = 60.67$ |
| $r_{15} = 12.219$ | $d_{15} = 0.80$ | $n_{d9} = 1.84666$ | $v_{d9} = 23.78$ |
| $r_{16} = 4.300$ | $d_{16}$ = (Variable) | | |
| $r_{17} = 10.928$ | $d_{17} = 2.20$ | $n_{d10} = 1.48749$ | $v_{d10} = 70.23$ |
| $r_{18} = 112.609$ | $d_{18}$ = (Variable) | | |
| $r_{19} = \infty$ | $d_{19} = 0.95$ | $n_{d11} = 1.54771$ | $v_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $v_{d12} = 64.14$ |
| $r_{22} = \infty$ | $d_{22} = 1.00$ | | |
| $r_{23} = \infty$ | | | |

Aspherical Coefficients

11th surface $K = -1.7632$
$A_4 = 2.0904 \times 10^{-4}$
$A_6 = 1.3037 \times 10^{-6}$
$A_8 = -2.7669 \times 10^{-8}$
12th surface $K = -11.2945$
$A_4 = 7.5754 \times 10^{-5}$
$A_6 = 1.3305 \times 10^{-6}$
ズームデータ($\infty$)

|  | WE | ST | TE |
|---|---|---|---|
| f (mm) | 7.62 | 16.9 | 37.27 |
| $F_{NO}$ | 2.8 | 3.3 | 4.3 |

-continued

| | | | |
|---|---|---|---|
| ω (°) | 31.6 | 14.26 | 6.53 |
| $d_3$ | 0.80 | 11.18 | 20.49 |
| $d_9$ | 23.60 | 8.55 | 1.5 |
| $d_{16}$ | 7.70 | 8.62 | 16.37 |
| $d_{18}$ | 1.37 | 4.07 | 2.53 |

EXAMPLE 8

| | | | |
|---|---|---|---|
| $r_1 = 44.684$ | $d_1 = 1.00$ | $n_{d1} = 1.84666$ | $v_{d1} = 23.78$ |
| $r_2 = 27.973$ | $d_2 = 3.74$ | $n_{d2} = 1.74100$ | $v_{d2} = 52.64$ |
| $r_3 = -643.282$ | $d_3$ = (Variable) | | |
| $r_4 = 119.597$ | $d_4 = 0.85$ | $n_{d3} = 1.88300$ | $v_{d3} = 40.76$ |
| $r_5 = 9.920$ | $d_5 = 2.10$ | | |
| $r_6 = 53.716$ | $d_6 = 0.83$ | $n_{d4} = 1.78800$ | $v_{d4} = 47.37$ |
| $r_7 = 14.713$ | $d_7 = 1.20$ | | |
| $r_8 = 13.156$ | $d_8 = 2.20$ | $n_{d5} = 1.84666$ | $v_{d5} = 23.78$ |
| $r_9 = 39.828$ | $d_9$ = (Variable) | | |
| $r_{10} = \infty$ (Stop) | $d_{10} = 1.00$ | | |
| $r_{11} = 8.405$ (Aspheric) | $d_{11} = 2.30$ | $n_{d6} = 1.69350$ | $v_{d6} = 53.20$ |
| $r_{12} = -49.248$ (Aspheric) | $d_{12} = 0.10$ | | |
| $r_{13} = 6.781$ | $d_{13} = 2.50$ | $n_{d7} = 1.49700$ | $v_{d7} = 81.54$ |
| $r_{14} = 12.794$ | $d_{14} = 0.01$ | $n_{d8} = 1.56384$ | $v_{d8} = 60.67$ |
| $r_{15} = 12.794$ | $d_{15} = 0.80$ | $n_{d9} = 1.84666$ | $v_{d9} = 23.78$ |
| $r_{16} = 4.300$ | $d_{16}$ = (Variable) | | |
| $r_{17} = 11.359$ | $d_{17} = 2.24$ | $n_{d10} = 1.51633$ | $v_{d10} = 64.14$ |
| $r_{18} = 94.7262$ | $d_{18}$ = (Variable) | | |
| $r_{19} = \infty$ | $d_{19} = 0.95$ | $n_{d11} = 1.54771$ | $v_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $v_{d12} = 64.14$ |
| $r_{22} = \infty$ | $d_{22} = 0.99$ | | |
| $r_{23} = \infty$ | | | |

Aspherical Coefficients

11th surface $K = -1.9589$
$A_4 = 2.6247 \times 10^{-4}$
$A_6 = 7.9242 \times 10^{-7}$
$A_8 = -1.6930 \times 10^{-8}$ 12th surface $K = -7.3788$
$A_4 = 7.1656 \times 10^{-5}$
$A_6 = 1.6614 \times 10^{-6}$

ズームデータ(∞)

| | WE | ST | TE |
|---|---|---|---|
| f (mm) | 7.61 | 16.9 | 37.26 |
| $F_{NO}$ | 2.8 | 3.2 | 4.3 |
| ω (°) | 31.10 | 14.21 | 6.54 |
| $d_3$ | 0.80 | 13.35 | 23.09 |
| $d_9$ | 23.67 | 8.63 | 1.5 |
| $d_{16}$ | 7.91 | 8.36 | 16.64 |
| $d_{18}$ | 1.17 | 4.09 | 2.54 |

EXAMPLE 9

| | | | |
|---|---|---|---|
| $r_1 = 46.354$ | $d_1 = 1.00$ | $n_{d1} = 1.84666$ | $v_{d1} = 23.78$ |
| $r_2 = 29.847$ | $d_2 = 3.71$ | $n_{d2} = 1.72916$ | $v_{d2} = 54.68$ |
| $r_3 = -435.042$ | $d_3$ = (Variable) | | |
| $r_4 = 132.877$ | $d_4 = 0.85$ | $n_{d3} = 1.88300$ | $v_{d3} = 40.76$ |
| $r_5 = 9.672$ | $d_5 = 2.00$ | | |
| $r_6 = 44.500$ | $d_6 = 0.80$ | $n_{d4} = 1.72916$ | $v_{d4} = 54.68$ |
| $r_7 = 15.195$ | $d_7 = 1.20$ | | |

-continued

| | | | |
|---|---|---|---|
| $r_8 = 12.581$ | $d_8 = 2.20$ | $n_{d5} = 1.84666$ | $v_{d5} = 23.78$ |
| $r_9 = 30.232$ | $d_9$ = (Variable) | | |
| $r_{10} = \infty$ (Stop) | $d_{10} = 1.00$ | | |
| $r_{11} = 8.374$ (Aspheric) | $d_{11} = 2.30$ | $n_{d6} = 1.69350$ | $v_{d6} = 53.20$ |
| $r_{12} = -50.760$ (Aspheric) | $d_{12} = 0.10$ | | |
| $r_{13} = 6.725$ | $d_{13} = 2.50$ | $n_{d7} = 1.49700$ | $v_{d7} = 81.54$ |
| $r_{14} = 13.421$ | $d_{14} = 0.01$ | $n_{d8} = 1.56384$ | $v_{d8} = 60.67$ |
| $r_{15} = 13.421$ | $d_{15} = 0.80$ | $n_{d9} = 1.84666$ | $v_{d9} = 23.78$ |
| $r_{16} = 4.300$ | $d_{16}$ = (Variable) | | |
| $r_{17} = 13.192$ | $d_{17} = 2.25$ | $n_{d10} = 1.51823$ | $v_{d10} = 58.90$ |
| $r_{18} = -135.470$ | $d_{18}$ = (Variable) | | |
| $r_{19} = \infty$ | $d_{19} = 0.95$ | $n_{d11} = 1.54771$ | $v_{d11} = 62.84$ |
| $r_{20} = \infty$ | $d_{20} = 0.60$ | | |
| $r_{21} = \infty$ | $d_{21} = 0.50$ | $n_{d12} = 1.51633$ | $v_{d12} = 64.14$ |
| $r_{22} = \infty$ | $d_{22} = 0.94$ | | |
| $r_{23} = \infty$ | | | |

Aspherical Coefficients

11th surface $K = -1.4817$
$A_4 = 1.7947 \times 10^{-4}$
$A_6 = 2.4308 \times 10^{-6}$
$A_8 = -2.1403 \times 10^{-8}$ 12th surface $K = -16.8224$
$A_4 = 8.3493 \times 10^{-5}$
$A_6 = 2.4324 \times 10^{-6}$ ズームデータ($\infty$)

| | WE | ST | TE |
|---|---|---|---|
| f (mm) | 7.68 | 17.00 | 37.44 |
| $F_{NO}$ | 2.80 | 3.16 | 4.22 |
| $\omega$ (°) | 30.96 | 14.15 | 6.49 |
| $d_3$ | 0.80 | 14.60 | 24.11 |
| $d_9$ | 23.29 | 9.33 | 1.50 |
| $d_{16}$ | 7.67 | 8.18 | 16.13 |
| $d_{18}$ | 1.56 | 4.11 | 3.27 |

FIGS. 10A, 10B and 10C to FIGS. 18A, 18B and 18C are aberration diagrams for Examples 1 to 9 at the wide-angle ends, intermediate states and telephoto ends upon focusing on an infinite object point. In these aberration diagrams, SA, AS, DT, and CC is indicative of spherical aberrations, astigmatisms, distortions, and chromatic aberrations of magnification, respectively.

Given below are the values, exclusive of an absolute value symbol, of conditions (1) to (12) in Examples 1-6. It is here understood that condition (4) includes condition (4)" and condition (8) includes condition (8)".

| Conditions | Example 1 | Example 2 | Example 3 | Example 4 | Example 5 |
|---|---|---|---|---|---|
| 1 | 6.75 | 6.97 | 7.08 | 6.69 | 6.66 |
| 2 | 6.12 | 6.36 | 6.10 | 6.75 | 6.59 |
| 3 | 2.10 | 2.30 | 2.15 | 2.26 | 2.50 |
| 4 | 4.84 | 5.05 | 5.86 | 3.99 | 4.83 |
| 5 | 2.39 | 2.68 | 2.68 | 2.57 | 2.52 |
| 6 | -1.42 | -1.51 | -1.41 | -1.57 | -1.53 |
| 7 | 0.96 | 0.82 | 0.90 | 0.62 | 0.94 |
| 8 | 1.52 | 1.53 | 1.72 | 1.49 | 1.33 |
| 9 | 1.81 | 1.77 | 1.78 | 1.74 | 1.72 |
| 10 | 1.15 | 0.95 | 1.00 | 0.84 | 1.22 |
| 11 | 0.57 | 0.09 | -0.13 | 0.77 | 0.76 |
| 12 | -2.58 | -3.04 | -2.64 | -2.11 | -3.12 |

| Conditions | Example 6 | Example 7 | Example 8 | Example 9 |
|---|---|---|---|---|
| 1 | 6.74 | 7.52 | 7.54 | 7.43 |
| 2 | 5.82 | 8.08 | 8.05 | 8.16 |
| 3 | 2.10 | 3.19 | 3.1 | 3.16 |
| 4 | 4.82 | 4.89 | 4.89 | 4.88 |
| 5 | 2.38 | 3.23 | 3.24 | 3.16 |
| 6 | -1.39 | 1.86 | 0.78 | 1.84 |
| 7 | 1.01 | 0.82 | 0.78 | 0.79 |
| 8 | 1.49 | 1.29 | 1.33 | 1.32 |
| 9 | 1.82 | 1.86 | 1.86 | 1.847 |
| 10 | 1.09 | 1.06 | 1.11 | 1.15 |
| 11 | 0.45 | 0.17 | 0.26 | 0.97 |
| 12 | -2.34 | -5.84 | -5.8 | -6.06 |

In Examples 1-9, the fourth lens group G4 is moved toward the object side of the zoom lens system for focusing.

Such zoom lens systems as described above may be used with a taking system for taking an object image by forming the object image through a zoom lens system and receiving it at a CCD or other image pickup device, especially with digital cameras, video cameras, or the like, as exemplified below.

Figure 19:
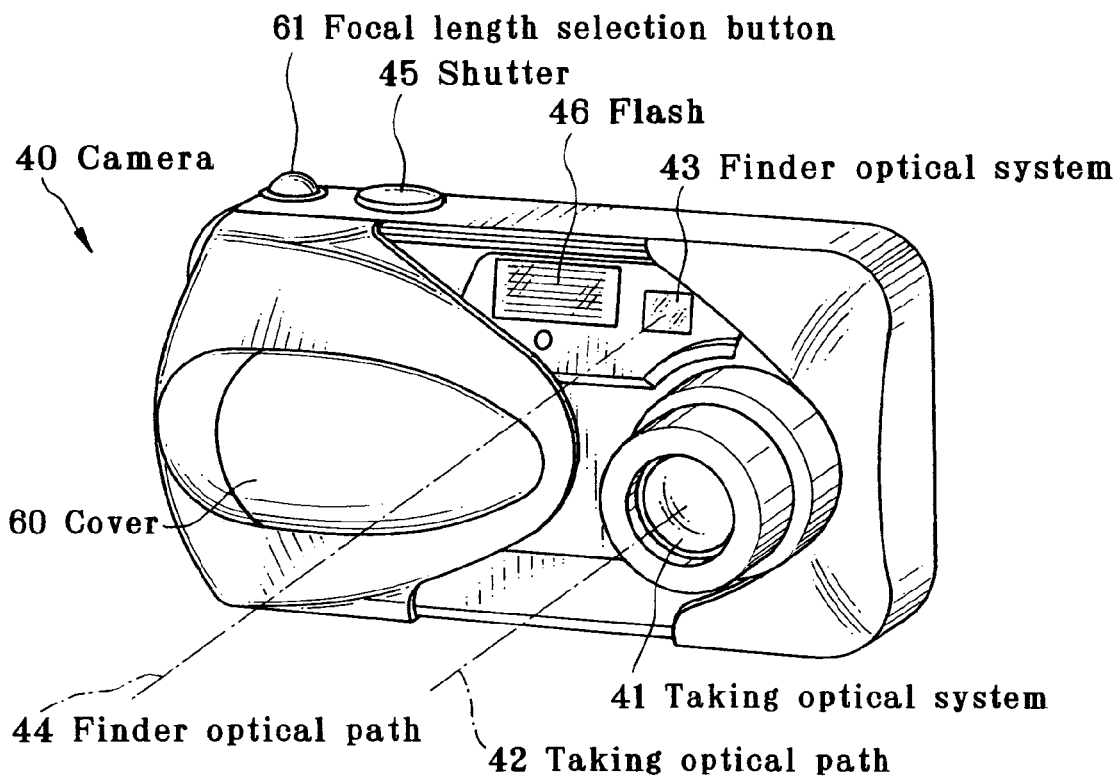
FIG. 19 is a front perspective view illustrative of the appearance of a digital camera in which the zoom lens system of the invention is built.
Figure 20:
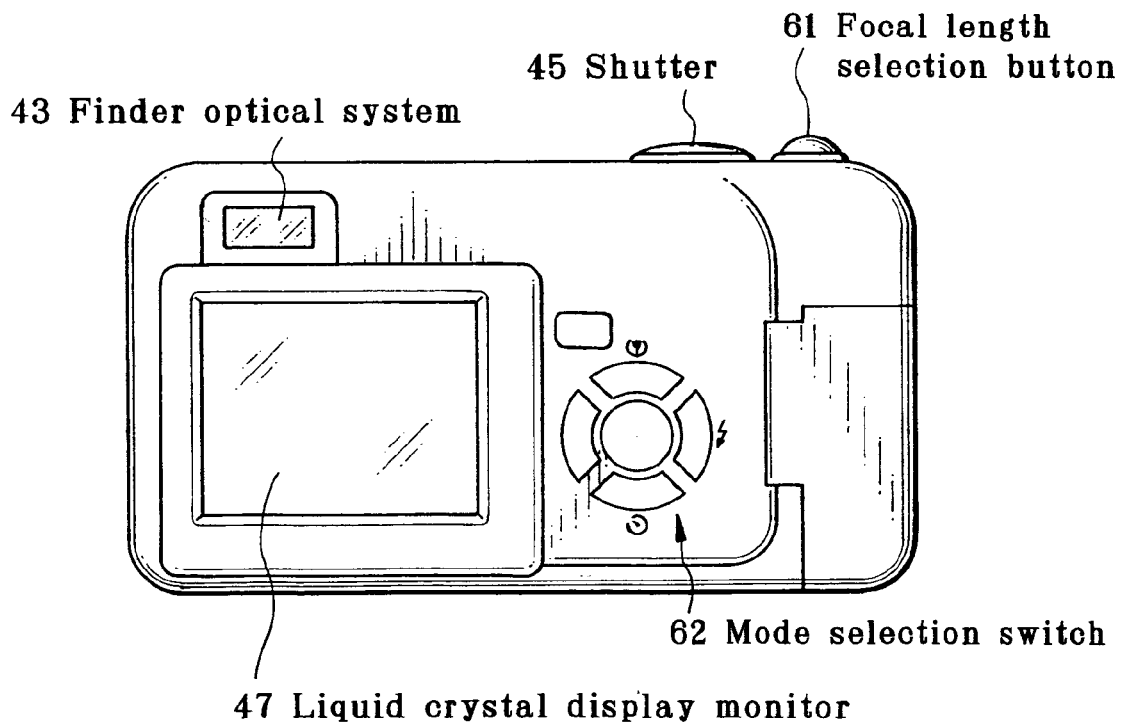
FIG. 20 is a rear perspective view of the digital camera of FIG. 19.
Figure 21:
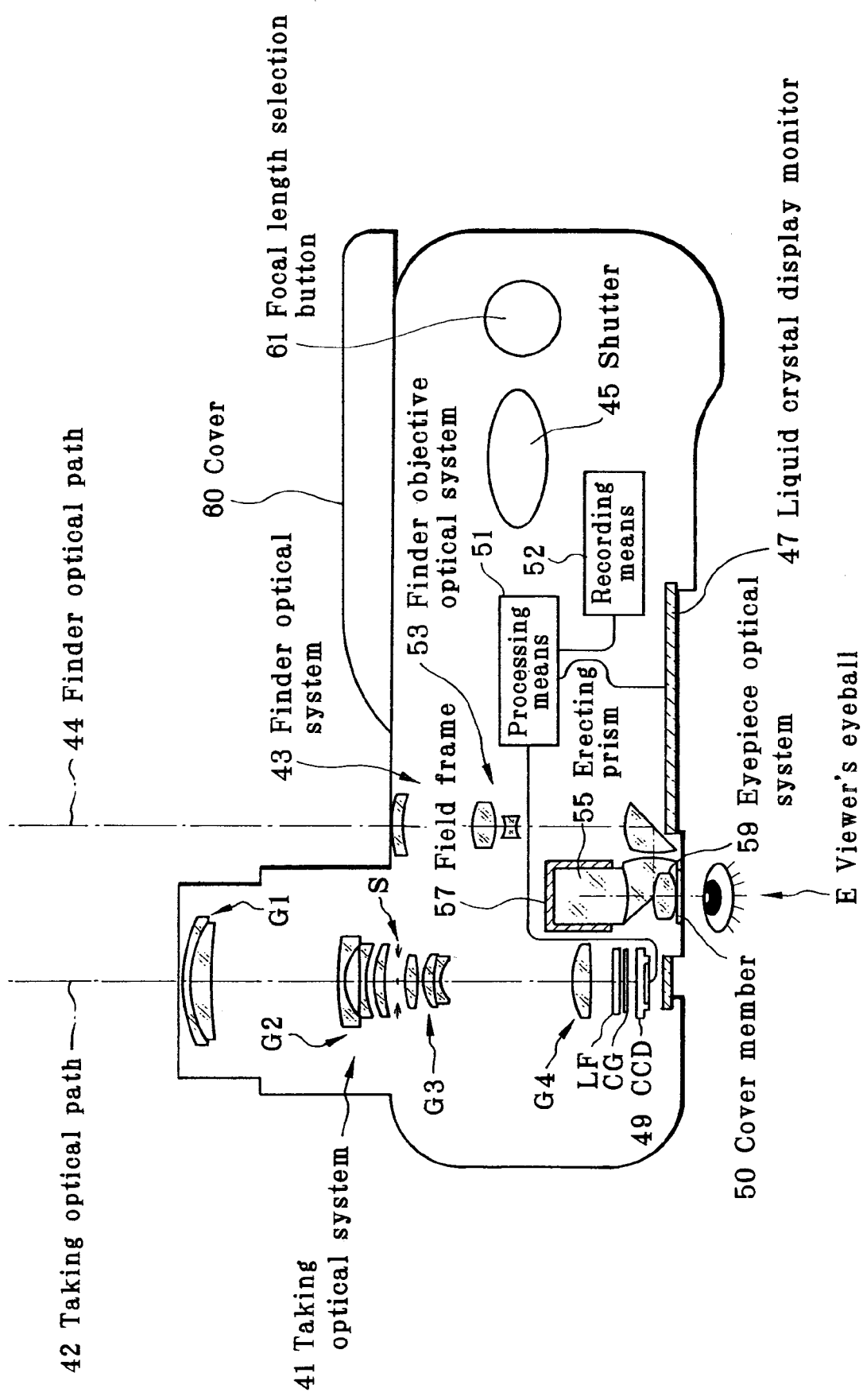
FIG. 21 is a sectional view of the digital camera of FIG. 19.

FIG. 19, FIG. 20 and FIG. 21 are illustrative in conception of a taking optical system 41 in a digital camera, in which the zoom lens system of the invention is incorporated. More specifically, FIG. 19 is a front perspective view of the appearance of a digital camera 40; FIG. 20 is a rear front view of the digital camera 40; and FIG. 21 is a schematic, perspective plan view of one construction of the digital camera 40. FIGS. 19 and 21 are illustrative of the taking optical system 41 with the lenses not received in a collapsible mount. Typically, the digital camera 40 comprises the taking optical system 41 having a taking optical path 42, a finder optical system 43 having a finder optical path 44, a shutter 45, a flash 46, a liquid crystal display monitor 47, a focal length variable button 61, a mode selection switch 62, and so on. When the lenses in the taking optical system 41 are received in the collapsible mount, a cover 60 is slid to cover the taking optical system 41, finder optical system 43 and flash 46. As the cover 60 is opened to set the camera 40 in a taking mode, it causes the lenses in the taking optical system 41 to be unfolded from within the collapsible mount as shown in FIG. 21. As the shutter 45 on the upper portion of the camera 40 is pressed down, taking occurs through the taking optical system 41, for instance, the zoom lens system of Example 1. An object image formed through the taking optical system 41 is then formed on the image pickup plane of CCD 49 via a low-pass filter LF with an IR cut coating applied on it and a cover glass CG. In turn, the object image received at CCD 49 appears as an electronic image on the liquid crystal display monitor 47 mounted on the camera back side via processing means 51 that could be connected with recording means 52 for recording the taken electronic image. It is here noted that the recording means 52 could be provided separately from the processing means 51, or it could be designed such that images are electronically recorded and written therein by means of floppy discs, memory cards, MOs or the like. This camera could be set up in the form of a silver-halide camera in which a silver-halide film is installed in place of CCD 45.

Further, there is a finder objective optical system 53 on the finder optical path 44. The finder objective optical system 53 comprises a zoom lens system comprising a plurality of lens groups (here three lens groups) and two prisms and having a focus variable in association with the zoom lens system that is the taking optical system 41. An object image formed through the finder objective optical system 53 is formed on a field frame 57 of an erecting prism 55 that is an image erection member. In the rear of the erecting prism 55 there is located an eyepiece optical system 59 for guiding an erected image to a viewer's eyeball E. It is here understood that a cover member 50 is located on the exit side of the eyepiece optical system 59.

The thus constructed digital camera 40 is improved in terms of performance and size, because the taking optical system 41 is of high performance and compactness with the lenses foldable down in the collapsible mount.

According to the invention as described at great length above, it is possible to provide a compact zoom lens that has an F-number decreased to about 2.8, a zoom ratio of as high as about 4 to 5 and an improved image formation capability, and an imaging system that incorporates the same.

The invention claimed is:

1. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies condition $$6.4 < L_W/f_W < 7.0 \quad (1)'$$

where $L_W$ is a total length of the zoom lens system at the wide-angle end, and $f_W$ is a focal length of the zoom lens system at the wide-angle end.

2. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system has a zoom ratio of 4 or higher and satisfies condition (2):

$$5.8 < f_1/f_W < 8.0 \quad (2)$$

where $f_W$ is a focal length of the zoom lens system at the wide-angle end, and $f_1$ is a focal length of the first lens group.

3. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; the third lens group comprises two positive lens elements and a negative lens element disposed on an image side of the two positive lens elements; and the zoom lens system satisfies condition (3):

$$2 < D_2/D_{3W} < 2.6 \quad (3)$$

where $D_{2W}$ is the space between the second lens group and the third lens group at the wide-angle end, and $D_{3W}$ is the space between the third lens group and the fourth lens group at the wide-angle end.

4. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies conditions (4)' and (5):

$$3.99 \leq (\beta_{2T}/\beta_{2W})*(\beta_{3T}/\beta_{3W})*(\beta_{4T}/\beta_{4W}) < 12 \quad (4)''$$

$$1.8 < D_{2W}/f_W < 2.8 \quad (5)$$

where $\beta_{2T}$, $\beta_{3T}$, and $\beta_{4T}$ is a magnification of the second lens group, the third lens group, and the fourth lens group, respectively, at the telephoto end; $\beta_{2W}$, $\beta_{3W}$, and $\beta_{4W}$ is a magnification of the second lens group, the third lens group, and the fourth lens group, respectively, at the wide-angle end; $f_W$ is a focal length of the zoom lens system at the wide-angle end; and $D_{2W}$ is the space between the second lens group and the third lens group at the wide-angle end.

5. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative meniscus lens element, a negative meniscus lens element or a piano-concave negative lens element and a positive meniscus lens element; and the zoom lens system satisfies conditions (4) and (6):

$$3 < (\beta_{2T}/\beta_{2W})*(\beta_{3T}/\beta_{3W})*(\beta_{4T}/\beta_{4W}) < 12 \quad (4)$$

$$1.1 < |f_2/f_W| < 1.8 \quad (6)$$

where $f_W$ is a focal length of the zoom lens system at the wide-angle end; $f_2$ is a focal length of the second lens group; $\beta_{2T}$, $\beta_{3T}$, and $\beta_{4T}$ is a magnification of the second lens group, the third lens group, and the fourth lens group, respectively, at the telephoto end; and $\beta_{2W}$, $\beta_{3W}$, and $\beta_{4W}$ is a magnification of the second lens group, the third lens group, and the fourth lens group, respectively, at the wide-angle end.

6. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; a vitreous material, of which the two negative lens elements in the second lens group are formed, has a refractive index of at least 1.81; and a vitreous material, of which the positive lens element in the second lens group is formed, has a refractive index of at least 1.9.

7. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies conditions (4) and (7):

$$3 < (\beta_{2T}/\beta_{2W})*(\beta_{3T}/\beta_{3W})*(\beta_{4T}/\beta_{4W}) < 12 \quad (4)$$

$$0.8 < (\beta_{2T}/\beta_{2W})/(\beta_{3T}/\beta_{3W}) < 1.1 \quad (7)$$

where $\beta_{2T}$, $\beta_{3T}$, and $\beta_{4T}$ is a magnification of the second lens group, the third lens group, and the fourth lens group, respectively, at the telephoto end; and $\beta_{2W}$, $\beta_{3W}$, and $\beta_{4W}$ is a magnification of the second lens group, the third lens group, and the fourth lens group, respectively, at the wide-angle end.

8. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of only two lens elements; the second lens group is composed of, in order from an object side thereof, a negative lens element, a negative lens element and a positive meniscus lens element that has an image side surface concave to an image plane side; and the zoom lens system satisfies condition (8)':

$$0.9 < \Delta_{T3G}/f_W \leq 1.38 \quad (8)'$$

where $f_W$ is a focal length of the zoom lens system at the wide-angle end, and AT3G is an amount of movement of the third lens group between the wide-angle end and the telephoto end.

9. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies condition (9)':

$$1.2 < f_3/f_W < 1.81 \quad (9)'$$

where $f_W$ is a focal length of the zoom lens system at the wide-angle end, and $f_3$ is a focal length of the third lens group.

10. The zoom lens system according to claim 9, wherein the third lens group is composed of two positive lens elements and one negative lens element.

11. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; the zoom lens system satisfies condition (9):

$$1.2 < f_3/f_W < 1.85 \quad (9)$$

where f is a focal length of the zoom lens system at the wide-angle end, and $f_3$ is a focal length of the third lens group; and the zoom lens system which satisfies condition (2):

$$5.8 < f_1/f_W < 8.0 \quad (2)$$

where $f_W$ is a focal length of the zoom lens system at the wide-angle end, and $f_1$ is a focal length of the first lens group.

12. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide: the first lens group is composed of at most two lens elements: the second lens group is composed of, in order from an object side thereof, a negative lens element, a negative lens element and a positive lens element: the zoom lens system satisfies condition (9):

$$1.2 < f_3/f_W < 1.85 \quad (9)$$

where $f_W$ is a focal length of the zoom lens system at the wide-angle end, and $f_3$ is a focal length of the third lens group: and the zoom lens system satisfies condition (3):

$$2 < D_{2W}/D_{3W} < 2.6 \quad (3)$$

where $D_{2W}$ is the space between the second lens group and the third lens group at the wide-angle end, and $D_{3W}$ is the space between the third lens group and the fourth lens group at the wide-angle end.

13. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide, the first lens group is composed of at most two lens elements; the second lens group is composed of, in order from an object side thereof, a negative lens element, a negative lens element and a positive lens element; the zoom lens system satisfies condition (9):

$$1.2 < f_3/f_W < 1.85 \quad (9)$$

where $f_W$ is a focal length of the zoom lens system at the wide-angle end, and $f_3$ is a focal length of the third lens group; and the zoom lens system satisfies conditions (4) and (5):

$$3 < (\beta_{2T}/\beta_{2W})*(\beta_{3T}/\beta_{3W})*(\beta_{4T}/\beta_{4W}) < 12 \quad (4)$$

$$1.8 < D_{2W}/f_W < 2.8 \quad (5)$$

where $\beta_{2T}$, $\beta_{3T}$, and $\beta_{4T}$ is a magnification of the second lens group, the third lens group, and the fourth lens group, respectively, at the telephoto end; $\beta_{2W}$, $\beta_{3W}$, and $\beta_{4W}$ is a magnification of the second lens group, the third lens group, and the fourth lens group, respectively, at the wide-angle end; $f_W$ is a focal length of the zoom lens system at the wide-angle end; and $D_{2W}$ is the space between the second lens group and the third lens group at the wide-angle end.

14. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; the zoom lens system satisfies condition (9):

$$1.2 < f_3/f_W < 1.85 \quad (9)$$

where $f_W$ is a focal length of the zoom lens system at the wide-angle end, and $f_3$ is a focal length of the third lens group; and the zoom lens system satisfies condition (10):

$$0.8 < \Delta_{T1G}/\Delta_{T3G} < 1.3 \quad (10)$$

where $\Delta_{T1G}$ is an amount of movement of the first lens group between the wide-angle end and the telephoto end, and $\Delta_{T3G}$ is an amount of movement of the third lens group between the wide-angle end and the telephoto end.

15. The zoom lens system according to claim 14, which satisfies condition (11):

$$-0.20 < \Delta_{S1G}/\Delta_{S3G} < 0.8 \quad (11)$$

where $\Delta_{S1G}$ is an amount of movement of the first lens group between the wide-angle end and an intermediate focal length state, and $\Delta_{S3G}$ is an amount of movement of the third lens group between the wide-angle end and an intermediate focal length state, provided that the intermediate focal length is represented by a focal length $f_S = \sqrt{(fW \cdot fT)}$ where $FW$ is a focal length of the zoom lens system at the wide-angle end and $f_T$ is a focal length of the zoom lens system at the telephoto end.

16. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies condition (9):

$$1.2 < f_3/f_W < 1.85 \quad (9)$$

where $f_W$ is a focal length of the zoom lens system at the wide-angle end, and $f_3$ is a focal length of the third lens group; wherein the second lens group is composed of, in order from an object side thereof, a negative meniscus lens element, a negative meniscus lens element or a plano-concave negative lens element and a positive meniscus lens, and the zoom lens system satisfies conditions (4) and (6):

$$3 < (\beta_{2T}/\beta_{2W})*(\beta_{3T}/\beta_{3W})*(\beta_{4T}/\beta_{4W}) < 12 \quad (4)$$

$$1.1 < |f_2/f_W| < 1.8 \quad (6)$$

where $f_W$ is a focal length of the zoom lens system at the wide-angle end; $f_2$ is a focal length of the second lens group; $\beta_{2T}$, $\beta_{3T}$, and $\beta_{4T}$ is a magnification of the second lens group, the third lens group, and the fourth lens group, respectively, at the telephoto end; and $\beta_{2W}$, $\beta_{3W}$, and $\beta_{4W}$ is a magnification of the second lens group, the third lens group, and the fourth lens group, respectively, at the wide-angle end.

17. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; and the zoom lens system satisfies condition (9):

$$1.2 < f_3/f_W < 1.85 \quad (9)$$

where $f_W$ is a focal length of the zoom lens system at the wide-angle end, and $f_3$ is a focal length of the third lens group; wherein a vitreous material, of which the two negative lens elements in the second lens group are formed, has a refractive index of at least 1.81, and a vitreous material, of which the positive lens element in the second lens group is formed, has a refractive index of at least 1.9.

18. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; the zoom lens system satisfies condition (9):

$$1.2 < f_3/f_W < 1.85 \quad (9)$$

where $f_W$ is a focal length of the zoom lens system at the wide-angle end, and $f_3$ is a focal length of the third lens group; and the zoom lens system satisfies condition (1):

$$6.4 < L_W/f_W < 7.4 \quad (1)$$

where $L_W$ is a total length of the zoom lens system at the wide-angle end, and $f_W$ is a focal length of the zoom lens system at the wide-angle end.

19. A zoom lens system, comprising, in order from an object side thereof, a first lens group having positive refracting power, a second lens group having negative refracting power, a third lens group having positive refracting power and a fourth lens group having positive refracting power, wherein, upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide; the first lens group is composed of at most two lens elements; the second lens group is composed of, in order from an object side thereof, a negative lens element, a negative lens element and a positive lens element; an aperture stop is interposed between the second lens group and the third lens group; and the zoom lens system satisfies condition (7):

$$0.8 < (\beta_{2T}/\beta_{2W})/(\beta_{3T}/\beta_{3W}) < 1.1 \quad (7)$$

where $\beta_{2T}$, and $\beta_{3T}$ is a magnification of the second lens group, and the third lens group, respectively, at the telephoto end; and $\beta_{2W}$, and $\beta_{3W}$ is a magnification of the second lens group, and the third lens group, respectively, at the wide-angle end.

20. The zoom lens system according to claim 19, wherein the third lens group is composed of two positive lens elements and one negative lens element.

21. The zoom lens system according to claim 19, which satisfies condition (2):

$$5.8 < f_1/f_W < 8.0 \quad (2)$$

where $f_W$ is a focal length of the zoom lens system at the wide-angle end, and $f_1$ is a focal length of the first lens group.

22. The zoom lens system according to claim 19, which satisfies condition (3):

$$2 < D_{2W}/D_{3W} < 2.6 \quad (3)$$

where $D_{2W}$ is the space between the second lens group and the third lens group at the wide-angle end, and $D_{3W}$ is the space between the third lens group and the fourth lens group at the wide-angle end.

23. The zoom lens system according to claim 19, which satisfies conditions (4) and (5):

$$3 < (\beta_{2T}/\beta_{2W}) * (\beta_{3T}/\beta_{3W}) * (\beta_{4T}/\beta_{4W}) < 12 \quad (4)$$

$$1.8 < D_{2W}/f_W < 2.8 \quad (5)$$

where $\beta_{2T}$, $\beta_{3T}$, and $\beta_{4T}$ is a magnification of the second lens group, the third lens group, and the fourth lens group, respectively, at the telephoto end; $\beta_{2W}$, $\beta_{3W}$, and $\beta_{4W}$ is a magnification of the second lens group, the third lens group, and the fourth lens group, respectively, at the wide-angle end; $f_W$ is a focal length of the zoom lens system at the wide-angle end; and $D_{2W}$ is the space between the second lens group and the third lens group at the wide-angle end.

24. The zoom lens system according to claim 19, wherein the second lens group is composed of, in order from an object side thereof, a negative meniscus lens element, a negative meniscus lens element or a piano-concave negative lens element and a positive meniscus lens, and the zoom lens system satisfies conditions (4) and (6):

$$3 < (\beta_{2T}/\beta_{2W}) * (\beta_{3T}/\beta_{3W}) * (\beta_{4T}/\beta_{4W}) < 12 \quad (4)$$

$$1.1 < |f_2/f_W| < 1.8 \quad (6)$$

where $f_W$ is a focal length of the zoom lens system at the wide-angle end; $f_2$ is a focal length of the second lens group; $\beta_{2T}$, $\beta_{3T}$, and $\beta_{4T}$ is a magnification of the second lens group, the third lens group, and the fourth lens group, respectively, at the telephoto end; and $\beta_{2W}$, $\beta_{3W}$, and $\beta_{4W}$ is a magnification of the second lens group, the third lens group, and the fourth lens group, respectively, at the wide-angle end.

25. The zoom lens system according to claim 19, wherein a vitreous material, of which the two negative lens elements in the second lens group are formed, has a refractive index of at least 1.81, and a vitreous material, of which the positive lens element in the second lens group is formed, has a refractive index of at least 1.9.

26. The zoom lens system according to claim 19, which satisfies condition (8):

$$0.9 < \Delta_{T3G}/f_W < 3 \quad (8)$$

where $F_W$ is a focal length of the zoom lens system at the wide-angle end, and $\Delta_{T3G}$ is an amount of movement of the third lens group between the wide-angle end and the telephoto end.

27. The zoom lens system according to claim 19, which satisfies condition (9):

$$1.2 < f_3/f_W < 1.85 \quad (9)$$

where $f_W$ is a focal length of the zoom lens system at the wide-angle end, and $f_3$ is a focal length of the third lens group.

28. The zoom lens system according to claim 19, which satisfies condition (1):

$$6.4 < L_W/f_W < 7.4 \quad (1)$$

where $L_W$ is a total length of the zoom lens system at the wide-angle end, and $f_W$ is a focal length of the zoom lens system at the wide-angle end.

29. A zoom lens system, comprising, in order from an object side thereof, a first lens group having positive refracting power, a second lens group having negative refracting power, a third lens group having positive refracting power and a fourth lens group having positive refracting power, wherein:

upon zooming, at least the first lens group, the second lens group and the third lens group move on an optical axis in such a way that, at a telephoto end with respect to a wide-angle end, a space between the first lens group and the second lens group becomes wide, a space between the second lens group and the third lens group becomes narrow and a space between the third lens group and the fourth lens group becomes wide;

the first lens group is composed of at most two lens elements;

the second lens group is composed of, in order from an object side thereof, a negative lens element, a negative lens element and a positive lens element, wherein said first negative lens element is a negative lens element having a large curvature on an image plane side, said second negative lens element is a negative meniscus lens element or a planoconcave negative lens element having a large curvature on an image plane side thereof, and said positive lens element is a positive lens element having a large curvature on an object side thereof; and the third lens group is composed of, in order from an object side thereof, a double-convex lens element, a positive meniscus lens element concave on an image plane side thereof and a negative meniscus lens element concave on an image plane side thereof, wherein said positive meniscus lens element and said negative meniscus lens element are cemented together into a cemented lens, and said double-convex lens element satisfies condition (12):

$$-6 < R_{31}/F_{31} < -1 \quad (12)$$

where $F_{31}$ is a radius of curvature of an object-side surface of the double-convex lens L31 near the optical axis, and $R_{31}$ a radius of curvature of an image plane-side surface of the double-convex lens L31 near the optical axis.

30. The zoom lens system according to claim 29, which satisfies condition (2):

$$5.8 < f_1/f_W < 8.0 \quad (2)$$

where $f_W$ is a focal length of the zoom lens system at the wide-angle end, and $f_1$ is a focal length of the first lens group.

31. The zoom lens system according to claim 29, which satisfies condition (3):

$$2 < D_{2W}/D_{3W} < 2.6 \quad (3)$$

where $D_{2W}$ is the space between the second lens group and the third lens group at the wide-angle end, and $D_{3W}$ is the space between the third lens group and the fourth lens group at the wide-angle end.

32. The zoom lens system according to claim 29, which satisfies conditions (4) and (5):

$$3.99 \leq (\beta_{2T}/\beta_{2W})*(\beta_{3T}/\beta_{3W})*(\beta_{4T}/\beta_{4W})<12 \quad (4)''$$

$$1.8<D_{2W}/f_W<2.8 \quad (5)$$

where $\beta_{2T}$, $\beta_{3T}$, and $\beta_{4T}$ is a magnification of the second lens group, the third lens group, and the fourth lens group, respectively, at the telephoto end; $\beta_{2W}$, $\beta_{3W}$, and $\beta_{4W}$ is a magnification of the second lens group, the third lens group, and the fourth lens group, respectively, at the wide-angle end; $f_W$ is a focal length of the zoom lens system at the wide-angle end; and $D_{2W}$ is the space between the second lens group and the third lens group at the wide-angle end.

33. The zoom lens system according to claim 29, wherein a vitreous material, of which the two negative lens elements in the second lens group are formed, has a refractive index of at least 1.81, and a vitreous material, of which the positive lens element in the second lens group is formed, has a refractive index of at least 1.9.

34. The zoom lens system according to claim 29, which satisfies condition (10):

$$0.8<\Delta_{T1G}/\Delta_{T3G}<1.3 \quad (10)$$

where $\Delta_{T1G}$ is an amount of movement of the first lens group between the wide-angle end and the telephoto end, and $\Delta_{T3G}$ is an amount of movement of the third lens group between the wide-angle end and the telephoto end.

35. The zoom lens system according to claim 34, which satisfies condition (11):

$$-0.20<\Delta_{S1G}/\Delta_{S3G}<0.8 \quad (11)$$

where $\Delta_{S1G}$ is an amount of movement of the first lens group between the wide-angle end and an intermediate focal length state, and $\Delta_{S3G}$ is an amount of movement of the third lens group between the wide-angle end and an intermediate focal length state, provided that the intermediate focal length is represented by a focal length $f_S=\sqrt{(f_W \cdot f_T)}$ where $f_W$ is a focal length of the zoom lens system at the wide-angle end and $f_T$ is a focal length of the zoom lens system at the telephoto end.

36. The zoom lens system according to claim 29, which satisfies conditions (4) and (6):

$$3<(\beta_{2T}/\beta_{2W})*(\beta_{3T}/\beta_{3W})*(\beta_{4T}/\beta_{4W})<12 \quad (4)$$

$$1.1<|f_2/f_W|<1.8 \quad (6)$$

where $f_W$ is a focal length of the zoom lens system at the wide-angle end; $f_2$ is a focal length of the second lens group; $\beta_{2T}$, $\beta_{3T}$, and $\Delta_{4T}$ is a magnification of the second lens group, the third lens group, and the fourth lens group, respectively, at the telephoto end; and $\beta_{2W}$, $\beta_{3W}$, and $\beta_{4W}$ is a magnification of the second lens group, the third lens group, and the fourth lens group, respectively, at the wide-angle end.

37. The zoom lens system according to claim 29, which satisfies condition (9):

$$1.2<f_3/f_W<1.85 \quad (9)$$

where $f_W$ is a focal length of the zoom lens system at the wide-angle end, and $f_3$ is a focal length of the third lens group.

38. The zoom lens system according to claim 29, which satisfies condition (1):

$$6.4<L_W/f_W<7.4 \quad (1)$$

where $L_W$ is a total length of the zoom lens system at the wide-angle end, and $f_W$ is a focal length of the zoom lens system at the wide-angle end.

39. An imaging system, comprising the zoom lens system according to any one of claims 1, 19 and 29, and an image pickup device located on an image side thereof.

* * * * *

UNITED STATES PATENT AND TRADEMARK OFFICE
CERTIFICATE OF CORRECTION

PATENT NO. : 7,283,310 B2
APPLICATION NO. : 11/114039
DATED : October 16, 2007
INVENTOR(S) : Kouki Hozumi et al.

It is certified that error appears in the above-identified patent and that said Letters Patent is hereby corrected as shown below:

Column 74, line 3, change "condition" to --condition (1)'--;

Column 75, line 5, change "of,in" to --of, in--;

Column 75, line 8, change "conditions (4)' and (5)"" to --conditions (4)" and (5)--;

Column 76, line 52, change "$\leq 1.38$" to --$\leq 1.83$--;

Column 76, line 55, change "AT3G" to --$\Delta_{T3G}$--;

Column 77, line 36, change "where fis" to --where fw is--;

Column 77, line 38, change "system which satisfies" to --system satisfies--;

Column 79, line 12, change "$f_{s=\sqrt{(fw \cdot fT)} \text{ where FW}}$" to -- $f_s = \sqrt{(fw \cdot fT)}$ where FW--;

Column 81, line 27, change "$\beta_w$," to --$\beta_{2w}$--;

Column 83, line 3, change "$3.99 \leq (\beta_{2T}/\beta_{2w})*(\beta_{3T}/\beta_{3w})*(\beta_{4T}/\beta_{4w}) < 12$     (4)''''" to --$3 < (\beta_{2T}/\beta_{2w})*(\beta_{3T}/\beta_{3w})*(\beta_{4T}/\beta_{4w}) < 12$     (4)--; and Column 84, line 13, change "$\Delta_{4T}$" to --$\beta_{4T}$--.

Signed and Sealed this

Twenty-fifth Day of November, 2008

JON W. DUDAS
*Director of the United States Patent and Trademark Office*